United States Patent [19]

Akashi et al.

[11] Patent Number: 4,576,063
[45] Date of Patent: Mar. 18, 1986

[54] TRANSMISSION MECHANISM WITH PARALLEL TRANSMISSION SYSTEMS INCLUDING ONE WAY CLUTCHES, ONE BEING LOCKABLE

[75] Inventors: Teruo Akashi; Hiroshi Ito; Shigemichi Yamada, all of Toyota, Japan

[73] Assignee: Toyota Jidosha Kabushiki Kaisha, Toyota, Japan

[21] Appl. No.: 465,762

[22] Filed: Feb. 11, 1983

[30] Foreign Application Priority Data

Feb. 27, 1982 [JP] Japan .................................. 57-31607
Jun. 22, 1982 [JP] Japan ................................ 57-107086
Jun. 22, 1982 [JP] Japan ................................ 57-107087

[51] Int. Cl.⁴ ............................................. F16H 3/10
[52] U.S. Cl. ...................................... 74/745; 74/331; 74/359
[58] Field of Search ............... 74/745, 330, 357, 358, 74/359, 362, 363, 368, 373, 374, 375, 325, 331; 192/48.92, 48.6

[56] References Cited

U.S. PATENT DOCUMENTS

| | | | |
|---|---|---|---|
| 2,466,318 | 4/1949 | Kohr | 74/330 |
| 2,792,714 | 5/1957 | Forster | 74/368 |
| 3,187,598 | 6/1965 | Hennessey | 74/368 |
| 3,769,857 | 11/1973 | Whateley | 74/330 X |

FOREIGN PATENT DOCUMENTS

| | | | |
|---|---|---|---|
| 1222139 | 6/1960 | France | 74/730 |
| 400221 | 5/1942 | Italy | 74/330 |
| 56-164265 | 12/1981 | Japan | 74/745 |
| 55-63040 | 12/1981 | Japan | 74/359 |
| 2064028 | 6/1981 | United Kingdom | 74/745 |
| 2069636 | 8/1981 | United Kingdom | 74/745 |
| 2069635 | 8/1981 | United Kingdom | 74/331 |
| 2070158 | 9/1981 | United Kingdom | 74/359 |
| 2095774 | 10/1982 | United Kingdom | 74/330 |
| 2095775 | 10/1982 | United Kingdom | 74/359 |

Primary Examiner—William F. Pate, III
Assistant Examiner—Dwight G. Diehl
Attorney, Agent, or Firm—Kenyon & Kenyon

[57] ABSTRACT

A power supplying member supplies rotational power in a certain rotational direction to a first member of the transmission, and a power receiving member takes out power from a second member. Several power transmission systems are provided between the first and the second member, which are selectively engageable so as to provide various speed stages between them. Each power transmission system has a clutching mechanism which either can be disconnected so as to freewheel in both rotational directions, or can be connected only in the one rotational direction which is required for transmission of power through that power transmission system, so as to function as a one way clutch. Thus shifting between the speed stages does not require delicate controlling of the clutching mechanisms. At least one of these clutching mechanisms can also be locked up so as to transmit rotational power in both rotational directions, and this enables engine braking to be made available, when the transmission is mounted in an automotive vehicle.

6 Claims, 20 Drawing Figures

FIG. 19

TRANSMISSION MECHANISM WITH PARALLEL TRANSMISSION SYSTEMS INCLUDING ONE WAY CLUTCHES, ONE BEING LOCKABLE

BACKGROUND OF THE INVENTION

The present invention relates to the field of transmission mechanisms for use in automatic gearboxes, and more particularly relates to such a transmission mechanism which provides various speed stages by use of several selectively engagable power transmission systems each of which is equipped with a clutching mechanism.

There is a known type of transmission mechanism for providing various speed stages between a first rotating member and a second rotating member, which comprises several power transmission systems, each of which can selectively be engaged to provide transmission of rotational power at its own particular speed ratio (or typically any selectable one of a plurality of ratios) between the first and second members, and each of which has a clutching mechanism which either can be connected so as to thus transmit rotational power or can be disconnected so as not thus to transmit rotational power. By appropriately controlling the engagement and disengagement of the various clutching mechanisms, and concurrently controlling the selection of the various speed ratios of the various power transmission systems, which may be done automatically by a transmission control system of a per se well known type so as to provide entirely automatic operation, it is therefore possible to automatically shift between a plurality of speed stages and to provide both powered and engine braking operation of the transmission as a whole.

However, this prior art type of transmission mechanism has suffered from the disadvantage that such a mode of operation requires close and accurate control of the timing of the engagement and disengagement of the various clutching mechanisms. If the engagement of one of the clutching mechanisms occurs somewhat too late after the disengagement of the previously engaged transmission mechanism, then for a certain intermediate period the engine associated with the transmission will race, especially during a power on shift as during acceleration upshifting of the transmission or during a kick down type downshift, and this can damage various elements of the transmission mechanism; and on the other hand if the engagement of one of the clutching mechanisms occurs somewhat too early before the disengagement of the previously engaged transmission mechanism is complete, then for a short time period very large torsional strains are liable to be put on various elements of the transmission, in consequence of such an attempt, effectively, to engage two different speed ratios at one time, and this also can damage various elements of the transmission mechanism. Such a thusly necessitated close control of the timing of the engagement and disengagement of the various clutching mechanisms has presented a severe disadvantage with respect to the realization of an automatic transmission incorporating such a transmission mechanism, because such close timing control is very difficult to ensure, especially after the transmission has been used for a long period of time and its operational time constants have altered with usage. For example, in the case of a hydraulic type transmission control system, changes in the viscosity of the hydraulic fluid and changes in the size of the various orifices of the control system can cause timing difficulties. Especially, good timing control is important in the case of a power on downshift of the transmission or a so called kick down, when the engine load is high, and snappy and accurate shifting of the speed stages is particularly important and difficult in such a case.

Another factor that is required to be taken account of in the design of a transmission mechanism for an automatic transmission is mountability in a vehicle. The friction engaging elements of a transmission such as the hydraulic clutches thereof are liable to be quite large in diameter, especially as compared with the diameters of the various gear wheels of the transmission, and especially in the case of a front engine rear wheel drive type of vehicle such a transmission mechanism as outlined above has presented the constructional difficulty that the amount of space available for mounting such large diameter clutching mechanisms has not been sufficient, since typically the rear end of an automatic transmission which utilizes such a transmission mechanism has been required to be housed under the floor of the passenger compartment of the vehicle, perhaps in a so called transmission tunnel thereof. On the other hand, in the case of a front engine front wheel drive type of vehicle such a transmission mechanism as outlined above has presented the constructional difficulty that the amount of axial space available for mounting the transmission has been very limited, which limits the axial length of the transmission as a whole.

Finally, it is almost a required characteristic of such a transmission mechanism that it should provide engine braking for the vehicle, at least in some of the speed stages thereof. Smooth starting off from rest of the vehicle, both forwards and backwards, are also very important, and it should not be necessary for unuly delicate control of the clutching mechanisms to be exerted in order to obtain this effect. Power loss in the transmission should be minimized. Further, within these above mentioned constraints, it is a general design objective of such an automatic transmission mechanism to be as light and compact as possible.

SUMMARY OF THE INVENTION

Accordingly, it is the primary object of the present invention to provide a transmission mechanism of the general sort described above, in which no particularly fine timing control of the clutching mechanisms is required in order to obtain proper shifting between speed stages.

It is a further object of the present invention to provide such a transmission mechanism, in which engine braking is available in at least some of the speed stages.

It is a further object of the present invention to provide such a transmission mechanism, in which downshifting during high engine load conditions is carried out snappily and accurately.

It is a further object of the present invention to provide such a transmission mechanism, in which power loss is minimized.

It is a further object of the present invention to provide such a transmission mechanism, in which the starting off from rest is made particularly smooth.

It is a further object of the present invention to provide such a transmission mechanism, in which the radially large elements do not present a mounting obstacle, when the transmission is to be mounted in a vehicle.

It is a further object of the present invention to provide such a transmission mechanism, which is well adapted to be fitted to a front engine rear wheel drive type vehicle.

It is a further object of the present invention to provide such a transmission mechanism, which is well adapted to be fitted to a front engine front wheel drive type vehicle.

It is yet a further object of the present invention to provide such a transmission mechanism, which is short in its axial length.

It is yet a further object of the present invention to provide such a transmission mechanism, which is light in weight.

It is yet a further object of the present invention to provide such a transmission mechanism, which is cheap to manufacture.

According to the present invention, these and other objects are accomplished by a transmission mechanism for a vehicle, for receiving input of rotational power from a power supplying member which rotates in a particular rotational direction and for outputting rotational power to a power receiving member, comprising: (a) a first member which is rotatably mounted and which receives supply of said rotational power from said power supplying member; (b) a second member which is rotatably mounted and which supplies rotational power to said power receiving member; (c) a plurality of selectively engageable power transmission systems for transmitting rotational power between said first member and said second member; (d) each one of said plurality of power transmission systems comprising a clutching mechanism which can be selectively controlled either to freewheel in both rotational directions and not to transmit power in either rotational direction or to provide direct transmission of rotational power in one rotational direction only and to freewheel in the other rotational direction, said one rotational direction being the one which is required for power transmission to be performed through said clutching mechanism, during the transmission of power from said power supplying member rotating in said particular rotational direction to said power receiving member via said one of said power transmission systems; (e) at least one of said clutching mechanisms being also selectively controllable so as to be locked up so as to transmit rotational power in both rotational directions.

According to such a structure, when shifting up from a lower speed stage to a higher speed stage, these speed stages typically being provided by different ones of the power transmission systems, it is only necessary to engage the clutching mechanism of the higher speed stage, without any need arising for simultaneously disengaging the clutching mechanism of the lower speed stage; it is only necessary for this clutching mechanism to be in its state in which it can free wheel. No difficulty will arise with relation to the transmission becoming locked up, because of the free wheeling capability of the lower speed stage. On the other hand, when shifting down from a higher speed stage to a lower speed stage, it will only be necessary to disengage the clutching mechanism associated with the higher speed stage, and then the free wheeling clutching mechanism associated with the lower speed stage will automatically take up the transmission of power, if and when required. Further, since one of the clutching mechanisms can be selectively locked up so as to transmit rotational power in both rotational directions, engine braking will be available in the speed stages which are made available by the power transmission system associated with this clutching mechanism, which conveniently may include the first and the reverse speed stages.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 19 is a schematic skeleton structural view, similar to FIGS. 1 through 18, showing a nineteenth preferred embodiment of the transmission mechanism which is similar to the seventeenth preferred embodiment, but which provides arrangements for a fifth and a sixth speed stage as well.

DESCRIPTION OF THE PREFERRED EMBODIMENTS

The present invention will now be described with reference to a number of preferred embodiments thereof, and with reference to the appended drawings.

THE FIRST PREFERRED EMBODIMENT

Figure 1:
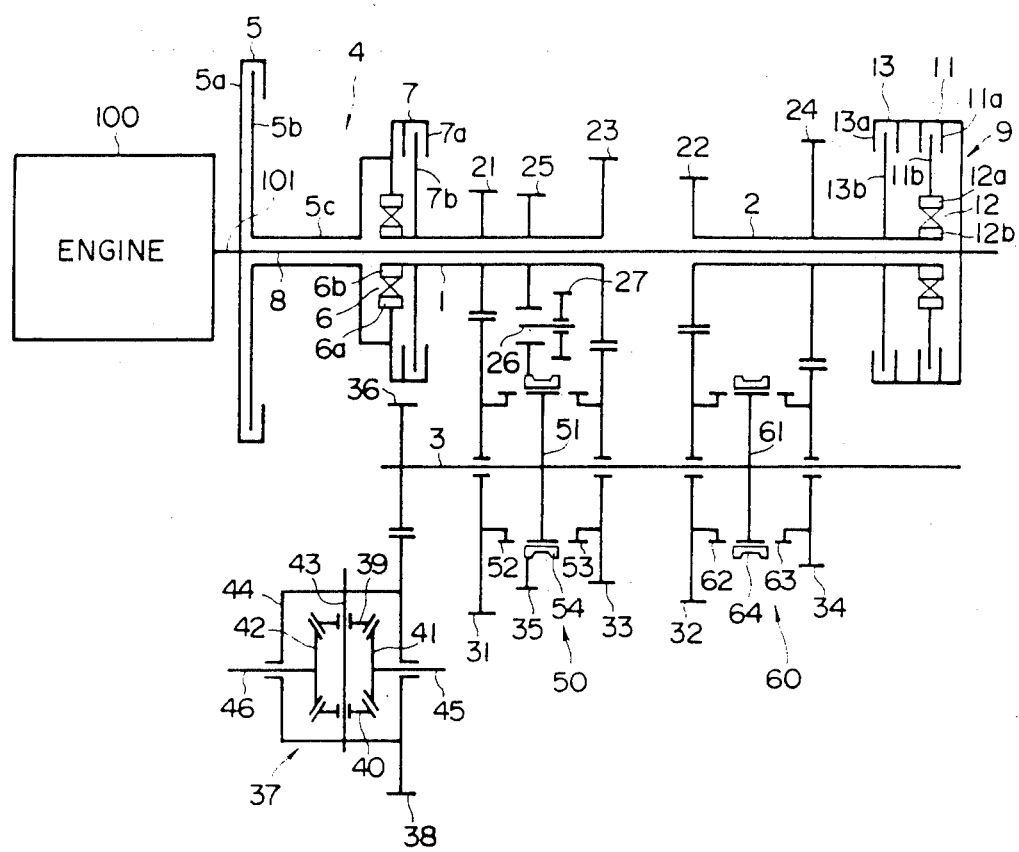
FIG. 1 is a schematic skeleton structural view of a transmission mechanism which is a first preferred embodiment of the transmission mechanism according to the present invention, also showing in schematic form an internal combustion engine and a differential device associated therewith, this first preferred embodiment incorporating two power transmission systems, and providing engine braking in all the speed stages thereof.

FIG. 1 is a schematic skeleton structural view of a transmission mechanism which is a first preferred embodiment of the transmission mechanism according to the present invention. In this figure, the reference numeral 100 denotes an internal combustion engine which is shown as a block, and 101 denotes the crankshaft of this engine 100, which is rotated thereby in one rotational direction only, hereinafter termed the predetermined rotational direction, so as to transmit output rotational power from said internal combustion engine 100. This crankshaft 101 is directly drivingly coupled to an intermediate shaft 8, which extends through the transmission mechanism.

A first hollow driving gear wheel shaft 1 is coaxially rotatably mounted on the intermediate shaft 8 on the left in the figure ("left", "right", "up", and "down" will be used in the sense of the relevant figure hereinafter), and a second hollow driving gear wheel shaft 2 is coaxially rotatably mounted on the intermediate shaft 8 on the right, axially displaced from and opposed to the first driving gear wheel shaft 1. Parallel with the first and second driving gear wheel shafts 1 and 2 and the intermediate shaft 8 and displaced therefrom there is provided a driven gear wheel shaft 3.

Between the crankshaft 101 and the first driving gear wheel shaft 1 there is provided a first clutching assembly 4. The function of this first clutching assembly 4 is that, according to selective control thereof exerted by a control system not shown in the drawing, between its rotational power input member and its rotational power output member, it can either; (a) provide freewheeling action in both rotational directions, not transmitting power in either rotational direction; or (b) provide direct transmission of rotational power in one rotational direction only, while it provides freewheeling action in the other rotational direction, said one rotational direction being the one which is required for power transmission to be performed through this first clutching assembly 4, to transmit power from the crankshaft 101, i.e., said predetermined rotational direction; or (c) provide direct transmission of rotational power in both rotational directions. This first clutching assembly 4 can operate in any one of these three operational modes.

The details of the construction of this first clutching assembly 4 are as follows. A first clutch 5 is provided, comprising a power input member 5a directly connected to a flywheel of the internal combustion engine 100 and thus directly rotationally connected to the crankshaft 101, and a power output member 5b rotationally connected to the left hand end of a hollow intermediate hollow shaft 5c (this shaft 5c may in fact simply be the hub portion of the power output member 5b) which is coaxially rotatably mounted on the intermediate shaft 8, to the left of the first driving gear wheel shaft 1. The right hand end of the intermediate hollow shaft 5c is rotationally connected to a power input member (outer race) 6a of a first one way clutch 6, a power output member (inner race) 6b of which is rotationally connected to the left hand end of the first driving gear wheel shaft 1; and said right hand end of the intermediate hollow shaft 5c is also rotationally connected to a power input member 7a of a second clutch 7, the power output member 7b of which is rotationally connected to the left hand end of the first driving gear wheel shaft 1. Thus, the first clutch 5 is connected in series with the parallel combination of the first one way clutch 6 and the second clutch 7, and this series combination is connected between the engine crankshaft 101 and the first driving gear shaft 1.

The more concrete construction of each of the clutches 5 and 7 is per se well known. They are engaged to transmit rotational power therethrough when an actuating hydraulic fluid pressure is supplied to their fluid actuators, and are disengaged to allow their two relatively rotatable members to rotate freely relative to one another. The clutch 5 may be a single plate dry clutch of the type conventionally used in manual transmissions. Also, the more concrete structure of the first one way clutch 6 is per se well known. Its input and output members are engaged so as to transmit rotational power between them when they are moved in one relative rotational direction and are disengaged from one another so as to allow for their free relative rotation in the other relative rotational direction. Therefore, their such constructions will not be further described herein.

Thus, the first clutching assembly 4 functions as follows. When the first clutch 5 and also the second clutch 7 are both engaged, the first clutching assembly 4 provides direct transmission of rotational power in both rotational directions. When the first clutch 5 is disengaged, irrespective of the engagement or disengagement condition of the second clutch 7, the first clutching assembly 4 provides freewheeling action in both rotational directions, not transmitting power in either rotational direction. When the first clutch 5 is engaged, but the second clutch 7 is disengaged, the first clutching assembly 4 provides direct transmission of rotational power in one rotational direction only, while it provides freewheeling action in the other rotational direction, said one rotational direction being the one which transmits power from the crankshaft 101 in said predetermined rotational direction towards a differential device 37 which will be discussed later.

This particular type of clutching assembly, consisting essentially of the series combination of a clutch and the parallel combination of a clutch and a one way clutch, with the above described three mode type function, will hereinafter be termed a series—parallel clutching assembly.

Between the intermediate shaft 8 and the second driving gear wheel shaft 2 there is provided a second clutching assembly 9. The function of this second clutching assembly 9 is also exactly the same type of three mode type function as that of the first clutching assembly 4. The details of the construction of this second clutching assembly 9 are, however, different from the construction of the first clutching assembly 4, and are as follows. A third clutch 11 is provided, comprising a power input member 11a rotationally connected to the intermediate shaft 8, and a power output member 11b rotationally connected to a power input member 12a of a second one way clutch 12, the power output member 12b of which is rotationally connected to the right hand end of the second driving gear wheel shaft 2.

Thus, the third clutch 11 is connected in series with the second one way clutch 12, and this series combination is connected between the intermediate shaft 8 and the second driving gear wheel shaft 2. Further, a fourth clutch 13 is provided, comprising a power input member 13a rotationally connected to the intermediate shaft 8, and a power output member 13b rotationally connected to the right hand end of the second driving gear wheel shaft 2. The more concrete constructions of the third clutch 11 and of the fourth clutch 13 are per se well known. Further, the second one way clutch 12 is also per se well known, and their more concrete constructions will not be further described herein. The function of the second one way clutch 12, similarly to that of the first one way clutch 6, is that, when its power input member 12a is rotating in the aforesaid predetermined rotational direction, its power input member 12b is constrained to rotate in said predetermined rotational direction at least as quickly.

Thus, the second clutching assembly 9 functions as follows. When the the fourth clutch 13 is engaged, the second clutching assembly 9 provides direct transmission of rotational power in both rotational directions. When the fourth clutch 13 is disengaged, when the third clutch 11 is disengaged the second clutching assembly 9 provides freewheeling action in both rotational directions, not transmitting power in either rotational direction. When the third clutch 11 is engaged, but the fourth clutch 13 is disengaged, the second clutching assembly 9 provides direct transmission of rotational power in one rotational direction only, while it provides freewheeling action in the other rotational direction, said one rotational direction being the one which transmits power from the crankshaft 101 towards the differential devic 37 in said predetermined rotational direction.

This particular type of clutching assembly, consisting essentially of the parallel combination of a clutch and the series combination of a clutch and a one way clutch, will hereinafter be termed a parallel—series clutching assembly.

On the driven gear wheel shaft 3 there are rotatably mounted, in order from the left to the right in FIG. 1, a first speed driven gear 31, a third speed driven gear 33, a second speed driven gear 32, and a fourth speed driven gear 34. On the first driving gear wheel shaft 1 there are fixedly mounted, in order from the left to the right in FIG. 1, a first speed driving gear 21, a reverse speed driving gear 25, and a third speed driving gear 23. On the second driving gear wheel shaft 2 there are fixedly mounted, in order from the left to the right in FIG. 1, a second speed driving gear 22 and a fourth speed driving gear 24. The first speed driving gear 21 is in constant mesh with the first speed driven gear 31; the second speed driving gear 22 is in constant mesh with the second speed driven gear 32; the third speed driving gear 23 is in constant mesh with the third speed driven gear 33; and the fourth speed driving gear 24 is in constant mesh with the fourth speed driven gear 34.

Between the first speed driven gear 31 and the third speed driven gear 33 on the driven gear wheel shaft 3 there is fitted a first/third synchronizer 50, which performs the function of synchronizing engagement of the first speed stage and of the third speed stage, as will be understood hereinafter. This first/third synchronizer 50 is of a per se well known sort, in fact being an inertia lock type Borg Warner synchromesh device. The first/third synchronizer 50 comprises a hub 51 which is fixedly mounted on the driven gear wheel shaft 3, a set of first speed stage splines 52 provided integrally with the first speed driven gear 31 and a set of third speed stage splines 53 provided integrally with the third speed driven gear 33, and a first/third synchronizer sleeve 54 which is engaged by splines over the hub 51 so that it is rotationally coupled to the driven gear wheel shaft 3 but is free to slide axially thereon, which is engageable to either the first speed stage splines 52 or the third speed stage splines 53, respectively according as to whether it is slid to the left or the right on said hub 51. The function of this first/third synchronizer 50 is to rotationally couple either the first speed driven gear 31 or the third speed driven gear 33 or neither of them to the driven gear wheel shaft 3. On the outside of the first/third synchronizer sleeve 54 there is formed a reverse speed driven gear 35, the action of which will be explained later, which is substantially coplanar with the reverse speed driving gear 25 on the first driving gear wheel shaft 1.

Between the second speed driven gear 32 and the fourth speed driven gear 34 on the driven gear wheel shaft 3 there is fitted a second/fourth synchronizer 60, which performs the function of synchronizing engagement of the second speed stage and of the fourth speed stage, as will be understood hereinafter. This second-/fourth synchronizer 60 is also of a per se well known sort, in fact also being an inertia lock type Borg Warner synchromesh device. The second/fourth synchronizer 60 comprises a hub 61 which is fixedly mounted on the driven gear wheel shaft 3, a set of second speed stage splines 62 provided integrally with the second speed driven gear 32 and a set of fourth speed stage splines 63 provided integrally with the fourth speed driven gear 34, and a second/fourth synchronizer sleeve 64 which is engaged by splines over the hub 61 so that it is rotationally coupled to the driven gear wheel shaft 3 but is free to slide axially thereon, which is engagable to either the second speed stage splines 62 or the fourth speed stage splines 63, respectively according as to whether it is slid to the left or the right on said hub 61. The function of this second/fourth synchronizer 60 is to rotationally couple either the second speed driven gear 32 or the fourth speed driven gear 32 or neither of them to the driven gear wheel shaft 3.

On the driven gear wheel shaft 3 there is also fixedly mounted a power output gear wheel 36, which is in constant mesh with a differential power input ring gear 38 of a differential gear mechanism 37, which is of a per se well known sort. The differential gear mechanism 37 comprises a bevel gear case 37a to which said differential power input ring gear 38 is fixed so as to rotate said differential bevel gear case, and perpendicular to the rotational axis of the differential bevel gear case there is fixed a bevel gear shaft 43, on which there are rotatably mounted a pair of differential bevel gears 39 and 40. Also supported rotatably by the casing of the differential gear mechanism 37 as coaxial with the rotational axis of the differential bevel gear case there are provided left and right vehicle half shafts or axles 45 and 46, to the inner ends of which there are fixed a differential bevel gears 41 and 42, respectively. These differential bevel gears 41 and 42 are each in constant mesh with both of the differential bevel gears 39 and 40. The operation of such a differential mechanism as this differential gear mechanism 37 is per se well known.

Finally, on a reverse idler gear shaft 26 which is supported as parallel to the first and second driving gear wheel shafts 1 and 2 and the driven gear wheel shaft 3 there is rotatably and slidably mounted a reverse idler gear 27. Arrangements of a per se well known sort, not shown in the figures, are provided for shifting this reverse idler gear 27 to and fro in the left and right directions on the reverse idler gear shaft 26; and, when the reverse idler gear 27 is in its most rightwards position on the reverse idler gear shaft 26, said reverse idler gear 27 does not mesh with any other wheels and is therefore free to rotate; but, when the reverse idler gear 27 is in its most leftwards position on the reverse idler gear shaft 26, said reverse idler gear 27 meshes with the reverse speed driving gear 25 and with the reverse speed driven gear 35 formed on the outside of the first/third synchronizer sleeve 54, so as to provide a reverse speed stage, as will be explained later.

Now the operation of the transmission mechanism shown in FIG. 1 will be explained. In this connection, it should be understood that selective engagement and disengagement of the first, second, third and fourth clutches 5, 7, 12, and 13, which may be performed according to selective supply or non supply of actuating hydraulic fluid pressure to pressure chambers thereof or in some other manner, according to circumstances, is suitably performed according to operational parameters of the vehicle comprising this transmission mechanism by a control system for the automatic transmission; and this control system will not be described herein with regard to its construction, because said control system does not directly form part of the present invention, and the functional explanation of its operation which will be given herein is sufficient for understanding of the principles of operation of the transmission mechanism according to the present invention. The movements towards and rightwards of the first/third synchronizer sleeve 54 of the first/third synchronizer 50, of the second/fourth synchronizer sleeve 64 of the second/fourth synchronizer 60, and of the reverse idler gear 27 on the reverse idler gear shaft 26, are also suitably selectively performed (using appropriate forks or the like of a per se well known sort) by this control system, according to operational parameters of the vehicle of which this gear transmission mechanism forms part, and this operation of said control system will also be functionally explained hereinafter, but also will not be constructionally explained, because the gist of the present invention relates to the first and second clutching assemblies 4 and 9, and not in the particular type of control system utilized for the automatic transmission. Various different control systems could be adapted to control this automatic transmission by one of ordinary skill in the transmission art, based upon the disclosure herein.

The engagement conditions of each of the first, second, third, and fourth clutches 5, 7, 11, and 13, the positions of the first/third synchronizer sleeve 54 of the first/third synchronizer 50 and of the second/fourth synchronizer sleeve 64 of the second/fourth synchronizer 60, the position of the reverse idler gear 27 on the reverse idler gear 27 on the reverse idler gear shaft 26, and the engaged or over running conditions of the first and second one way clutches 6 and 12, will be explained, during the engagement of each of the speed stages which can be provided by the transmission mechanism according to the first embodiment of the present invention explained above, i.e. during the engagement of the neutral speed stage, the first forward speed stage, the second forward speed stage, the third forward speed stage, the fourth forward speed stage, and the reverse speed stage; and also the sequences of shifting and of engagement and disengagement operations of these means which are employed in the various possible operations of shifting between these speed stages will be explained. This explanation will be made with reference to Table I, which is located at the end of this specification and before the claims appended thereto, and which is to be understood as incorporated into this specification at this point.

In Table I, there is shown, for each of the transmission speed stages that can be attained, the engagement conditions of the first, second, third and fourth clutches 5, 7, 11, and 13, the engagement or disengagement conditions of the first speed stage splines 52 and the third speed stage splines 53 to the first/third synchronizer sleeve 54 of the first/third synchronizer 50 and the engagement or disengagement conditions of the second speed stage splines 62 and the fourth speed stage splines 63 to the second/fourth synchronizer sleeve 64 of the second/fourth synchronizer 60, and the engaged or over running conditions of the first and second one way clutches 6 and 12, in this preferred embodiment. In this Table, the symbol "E" indicates that the corresponding mechanism, i.e. the corresponding clutch or spline and sleeve mechanism, is engaged, while and that this engagement is actually being used for transmission of rotational power; the symbol "D" indicates that the corresponding mechanism is disengaged; the symbol "e" indicates that the corresponding clutch or spline and sleeve mechanism is or may be engaged, but that this engagement is not actually currently utilized, since transmission of rotational power by the transmission is in any case ensured by the engagement of some other device which is provided in parallel with said clutch or spline and sleeve mechanism; the symbol "B", when used with relation to the clutches 7 and 13 (only), indicates that the corresponding one of these clutches 7 and 13 is to be engaged when engine braking is required, as for example when the accelerator pedal is released; the symbol "A" indicates that the corresponding one way clutch is engaged, when the internal combustion engine 100 is urging the automotive vehicle along the road, i.e. in engine drive state; and the symbol "O" indicates that the corresponding one way clutch is disengaged, when the internal combustion engine 100 is urging the automotive vehicle along the road, i.e. in engine drive state.

NEUTRAL SPEED STAGE

In the neutral speed stage, which is schematically illustrated in FIG. 1, the clutches 5, 7, 11, and 13 are all disengaged. At this time the second/fourth synchronizer sleeve 64 of the second/fourth synchronizer 60 is set to its intermediate position by the control system, and the first/third synchronizer sleeve 54 of the first/third synchronizer 50 may also be set to its intermediate position by the control system, or as a preparatory step to engaging first speed stage said first/third synchronizer sleeve 54 may be shifted to the left in FIG. 1 so as to engage with the splines 52 for first speed stage. Because the clutches 5, 7, 11, and 13 are none of them engaged, i.e. because the first and second clutching assemblies 4 and 9 are both in their completely disengaged states, neither one of the first and second driving gear shafts 1 and 2 is being driven by the internal combustion engine 100, but on the contrary both of them are free; and accordingly no rotational force is supplied to the driven gear shaft 3 or to the differential mechanism 37. Thus the gear transmission mechanism according to the first preferred embodiment of the present invention functions in its neutral speed stage.

SHIFTING FROM NEUTRAL TO THE FIRST SPEED STAGE

In order to shift from the neutral speed stage into the first speed stage and to start the vehicle off from rest, first, as a preparatory action as mentioned above, the first/third synchronizer sleeve 54 of the first/third synchronizer 50 is moved to its leftwardly displaced position by the above mentioned transmission control system, so as rotationally to couple the first speed driven gear wheel 31 with the driven gear wheel shaft 3. No drive is yet transmitted at this time, because the first clutch 5 is still disengaged. Next, the first clutch 5 is smoothly engaged, while keeping the second clutch 7, the third clutch 11, and the fourth clutch 13 still disengaged. At this time, rotational power is transmitted from the crankshaft 101 through the first clutch 5 and the first one way clutch 6 to the first driving gear wheel shaft 1; but no rotational power is transmitted to the second driving gear wheel shaft 2, because the third clutch 11 remains disengaged, and because also the fourth clutch 13 remains disengaged. From the first driving gear wheel shaft 1, this rotational power is transmitted via the first speed driving gear 21 to the first speed driven gear 31 in constant mesh therewith which transmits said rotation via the splines 52 and the sleeve 54 of the first/third synchronizer 50 engaged thereto to the driven gear wheel shaft 3, which rotates the power output gear wheel 36, thus transmitting output rotational power to the differential gear mechanism 37. Thus the vehicle is driven away from rest and operates in the first speed stage.

If, during running in the first speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to the one described above via this second clutch 7 from the differential mechanism 37 to the crankshaft 101 in order to provide engine braking, and otherwise during engine overrunning condition the first one way clutch 6 runs free or overruns, thus not providing any engine braking and allowing the vehicle to free wheel or coast.

During steady running in the first speed stage the second/fourth synchronizer sleeve 64 of the second/fourth synchronizer 60 is set to its intermediate position by said control system, so that neither the second speed driven gear wheel 32 nor the fourth speed driven gear wheel 34 is rotationally connected to the driven gear wheel shaft 3; however, as a preparatory action to engaging the second speed stage, in fact the second/fourth synchronizer sleeve 64 may be set to its leftwardly displaced position in FIG. 1 by the above mentioned transmission control system, so as rotationally to couple the second speed driven gear wheel 32 with the driven gear wheel shaft 3. This will cause no particular operational problem, because at this time the third clutch 11 and the fourth clutch 13 are still disengaged.

Thus the gear transmission mechanism according to the first preferred embodiment of the present invention functions in its first speed stage. By the way, the shifting from the first speed stage to the neutral speed state is accomplished simply by disengaging the first clutch 5

(and the second clutch 7 if it is engaged), and by returning the first/third synchronizer 50 and the second/fourth synchronizer 60 to their intermediate or disengaged positions, if either of them is not there yet.

Upshifting from First Speed Stage to Second Speed Stage

In order to shift up from the first speed stage into the second speed stage, first, as a preparatory action as mentioned above, the second/fourth synchronizer sleeve 64 of the second/fourth synchronizer 60 is moved to its leftwardly displaced position by the transmission control system, so as rotationally to couple the second speed driven gear wheel 32 with the driven gear wheel shaft 3. No drive is yet transmitted at this time, because the third clutch 11 (and of course the fourth clutch 13 also) is still disengaged. Further, also as a preparatory action, the second clutch 7 is disengaged, if in fact it was previously engaged. Next, in order to actually perform the upshift, which of course will be during an engine drive condition and not during an engine overrunning condition, the third clutch 11 is smoothly engaged, while keeping the second clutch 7 still disengaged. As will be shortly explained, it is not necessary yet at this time to disengage the first clutch 5, and hence no particular complicated mutual control of the first clutch 5 and the third clutch 11 is required for the upshifting; this is a particular good feature of the present invention.

As the third clutch 11 becomes engaged, rotational power starts to be transmitted from the crankshaft 101 through the third clutch 11 and the second one way clutch 12 to the second driving gear wheel shaft 2. From the second driving gear wheel shaft 2, this rotational power is transmitted via the second speed driving gear 22 to the second speed driven gear 32 engaged therewith which transmits said rotation via the splines 62 and the second/fourth synchronizer 60 engaged thereto to the driven gear wheel shaft 3, which rotates the power output gear wheel 36, thus transmitting output rotational power to the differential gear mechanism 37; and at this time automatically the first one way clutch 6 starts to run free or overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 is definitely disengaged before the third clutch 11 starts to be engaged to start the upshifting. Thus the vehicle comes to operate in the second speed stage. At a convenient time, during steady running in the second speed stage, the first/third synchronizer sleeve 54 of the first/third synchronizer 50 may be returned to the intermediate position, so as to stop the first one way clutch 6 free wheeling and so as to preserve the life of said first one way clutch 6; and also the first clutch 5 is disengaged; but this returning of the sleeve 54 is not actually urgent.

If, during running in the second speed stage, engine braking is currently required, for example when the accelerator pedal of the vehicle is released, then the fourth clutch 13 is engaged, while otherwise it is disengaged. If the fourth clutch 13 is engaged in engine overrunning condition, so as to bypass the action of the second one way clutch 12, rotational power can be transmitted in the reverse direction to the one described above via this fourth clutch 13 from the differential mechanism 37 to the crankshaft 101 in order to provide engine braking, and otherwise during engine overrunning condition the second one way clutch 12 runs free or overruns, thus not providing any engine braking and allowing the vehicle to free wheel or coast.

Further, during steady running in the second speed stage the synchronizer sleeve 54 of the first/third synchronizer 50 is set to its intermediate position by said control system, so that neither the first speed driven gear wheel 31 nor the third speed driven gear wheel 33 is rotationally connected to the driven gear wheel shaft 3; however, as a preparatory action to engaging the first speed stage or the third speed stage in fact the first/third synchronizer sleeve 54 may be set respectively to its leftwardly or its rightwardly displaced position by the above mentioned transmission control system, so as rotationally to couple, respectively, either the first speed driven gear wheel 31 or the third speed driven gear wheel 33 with the driven gear wheel shaft 3. Neither of these actions will cause any particular operational problem, because at this time the first clutch 5 is still disengaged; and in the case of a downshift to first speed stage in any case the first one way clutch 6 could operate to run free, even if the first clutch 5 were engaged.

Downshifting from Second Speed Stage to First Speed Stage

During steady running in the second speed stage the first/third synchronizer sleeve 54 of the first/third synchonizer 50 is kept at its intermediate position by said control system, so that neither the first speed driven gear wheel 31 nor the third speed driven gear wheel 33 is rotationally connected to the driven gear wheel shaft 3; however, as a preparatory action to engaging the first speed stage when downshifting thereto from the second speed stage, the first/third synchronizer 50 is set to its leftwardly displaced position by the transmission control system, so as rotationally to couple the first speed drive gear wheel 31 with the driven gear wheel shaft 3. This will cause no particular operational problem, because at this time the first clutch 5 is still disengaged. Next, also as a preparatory action, with of course the second clutch 7 disengaged, the first clutch 5 is engaged. As before, as explained above, this will cause the first one way clutch 6 to run free or overrun.

Next, in order to actually perform the downshift, which may either be during engine drive condition in the case of a kick down type downshift or may be in engine overrunning condition in the case of an engine braking desirable type downshift, simply the third clutch 11 is smoothly disengaged, and the fourth clutch 13 is disengaged if it is engaged, while keeping the second clutch 7 still disengaged. Since at this time the first clutch 5 is already engaged, hence no particular complicated mutual control of the first clutch 5 and the third clutch 11 is required for the downshifting; this is another particular good feature of the present invention.

As the third clutch 11 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the first speed driving gear 21 to the first speed driven gear 31 engaged therewith which transmits said rotation via the splines 52 and the first/third synchronizer 50 engaged thereto to the driven gear wheel shaft 3, which rotates the power output gear wheel 36, thus transmitting output rotational power to the differential gear mechanism 37, now at a gearing ratio appropriate to the first speed stage.

On the other hand, as the third clutch 11 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the first speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the first speed stage is a consequence of the provision of the bypass clutch 7, i.e. is a consequence of the capability of the first clutching assembly 4 to be locked up in both rotational directions, and is a particular good feature of the present invention.

Thus the vehicle comes to operate in the first speed stage. At a convenient time, during steady running in the first speed stage, the synchronizer sleeve 64 of the second/fourth synchronizer 60 may be returned to the intermediate position, so as to stop the third clutch 11 from slipping and so as to preserve the life of said third clutch 11.

Upshifting from Second Speed Stage to Third Speed Stage

In order to shift up from the second speed stage into the third speed stage, first, as a preparatory action as mentioned above, the synchronizer sleeve 54 of the first/third synchronizer 50 is moved to its rightwardly displaced position by the transmission control system, so as rotationally to couple the third speed driven gear wheel 33 with the driven gear wheel shaft 3. No drive is yet transmitted at this time, because the first clutch 5 is still disengaged. Next, in order to actually perform the upshift, which of course will be during engine drive condition and not during an engine overrunning condition, the first clutch 5 is smoothly engaged, while keeping the third clutch 11 still engaged, and after of course disengaging the fourth clutch 13 if it was engaged previously. It is not necessary yet at this time to disengage the third clutch 11, and hence no particular complicated mutual control of the first clutch 5 and the third clutch 11 is required for the upshifting; this is another particular good feature of the present invention. As the first clutch 5 becomes engaged, rotational power starts to be transmitted from the crankshaft 101 through the first clutch 5 and the first one way clutch 6 to the first driving gear wheel shaft 1. From the first driving gear wheel shaft 1, this rotational power is transmitted via the third speed driving gear 23 to the third speed driven gear 33 engaged therewith which transmits said rotation via the splines 53 and the first/third synchronizer 50 engaged thereto the driven gear wheel shaft 3, which rotates the power output gear wheel 36, thus transmitting output rotational power to the differential gear mechanism 37; and at this time automatically the second one way clutch 12 starts to run free or overrun, since as will be easily understood by one of ordinary skill in the transmission art based upon the foregoing explanation the rotational speed (in the predetermined rotational direction) of its power input member 12a now becomes less relative to the rotational speed of its power output member 12b. Accordingly no question of locking up of the transmission can occur. Thus the vehicle comes to operate in the third speed stage. At a convenient time, during steady running in the third speed stage, the synchronizer sleeve 64 of the second/fourth synchronizer 60 may be returned to the intermediate position, so as to stop the second one way clutch 12 free wheeling and so as to preserve the life of said second one way clutch 12; and also the third clutch 11 is disengaged.

During steady running in the third speed stage the synchronizer sleeve 64 of the second/fourth synchronizer 60 is set to its intermediate position by said control system, so that neither the second speed driven gear wheel 32 nor the fourth speed driven gear wheel 34 is rotationally connected to the driven gear wheel shaft 3; however, as a preparatory action to engaging the second speed stage or the fourth speed stage, respectively, in fact the second/fourth synchronizer sleeve 64 may be set to its leftwardly or its rightwardly displaced position in FIG. 1 by the above mentioned transmission control system, so as rotationally to couple, respectively, either the second speed driven gear wheel 32 or the fourth speed driven gear wheel 34 with the drive gear wheel shaft 3. Neither of these actions will cause any particular operational problem, because at this time the third clutch 11 (and of course the fourth clutch 13) is still disengaged; and in the case of a downshift to second speed stage in any case the second one way clutch 12 could operate to run free, even if the third clutch 11 were engaged.

If, during running in the third speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to the one described above via this second clutch 7 from the differential mechanism 37 to the crankshaft 101 of the internal combustion engine 100 in order to provide engine braking, and otherwise during engine overrunning condition the first one way clutch 6 runs free or overruns, thus not providing any engine braking and allowing the vehicle to free wheel or coast, in this third speed stage like in the first speed stage.

Downshifting from Third Speed Stage to Second Speed Stage

During steady running in the third speed stage the synchronizer sleeve 64 of the second/fourth synchronizer 60 is kept at its intermediate position by said control system, so that neither the second speed driven gear wheel 32 nor the fourth speed driven gear wheel 34 is rotationally connected to the driven gear wheel shaft 3; however, as a prepartory action to engaging the second speed stage when downshifting thereto from the third speed stage, the second/fourth synchronizer 60 is set to its leftwardly displaced position as seen in FIG. 1 by the transmission control system, so as rotationally to couple the second speed driven gear wheel 32 with the driven gear wheel shaft 3. This will cause no particular operational problem, because at this time the third clutch 11 is still disengaged, and of course so is the fourth clutch 13. Next, also as a preparatory action, the third clutch 11 is engaged. As before, as explained above, this will cause the second one way clutch 12 to run free or overrun.

Next, in order to actually perform the downshift, which may either be during engine drive condition in the case of a kick down type downshift or may be in engine overrunning condition in the case of a reducing road speed type downshift, simply the first clutch 5 is smoothly disengaged. Since at this time the third clutch 11 is already engaged, hence no particular complicated mutual control of the first clutch 5 and the third clutch 11 is required for the downshifting; this is another particular good feature of the present invention.

As the first clutch 5 becomes disengaged, if this is a case of a kick down type downshift, then the rotational speed of the internal combustion engine 100 will quickly increase to a rotational speed at which the second one way clutch 12 will stop running free, so that now rotational power starts to be transmitted from the crankshaft 101 through the third clutch 11 and the second one way clutch 12 to the second driving gear wheel shaft 2, and thence via the second speed driving gear 22 to the second speed driven gear 32 engaged therewith which transmits said rotation via the splines 62 and the second-/fourth synchronizer 60 engaged thereto to the drive gear wheel shaft 3, which rotates the power output gear wheel 36, thus transmitting output rotational power to the differential gear mechanism 37, now at a gearing ratio appropriate to the second speed stage.

On the other hand, as the first clutch 5 becomes disengaged, if this is not a case of a kick down type downshift, but is a case of a power off type downshift, then at this time automatically the second one way clutch 12 continues to run free or overrun, and the vehicle is allowed to free wheel or coast. As explained above, engine braking may be available, in this first preferred embodiment, in the second speed stage, by subsequently engaging the fourth clutch 13.

Thus the vehicle comes to operate in the second speed stage. At a convenient time, during steady running in the second speed stage, the synchronizer sleeve 54 of the first/third synchronizer 50 may be returned to the intermediate position, so as to stop the first clutch 5 from slipping and so as to preserve the life of said first clutch 5.

Upshifting from Third Speed Stage to Fourth Speed Stage

In order to shift up from the third speed stage into the fourth speed stage, first, as a preparatory action as mentioned above, the second/fourth synchronizer sleeve 64 of the second/fourth synchronizer 60 is moved to its rightwardly displaced position by the transmission control system, so as rotationally to couple the fourth speed driven gear wheel 34 with the driven gear wheel shaft 3. No drive is yet transmitted at this time, because the third clutch 11 (and of course the fourth clutch 13) is still disengaged. Further, also as a preparatory action, the second clutch 7 is disengaged, if in fact it was previously engaged. Next, in order to actually perform the upshift, which of course will be during engine drive condition and not during an engine overrunning condition, the third clutch 11 is smoothly engaged, while keeping the second clutch 7 still disengaged. As will be shortly explained, it is not necessary yet at this time to disengage the first clutch 5, and hence no particular complicated mutual control of the first clutch 5 and the third clutch 11 is required for the upshifting; this is yet another particular good feature of the present invention. As the third clutch 11 becomes engaged, rotational power starts to be transmitted from the crankshaft 101 of the engine 100 through the third clutch 11 and the second one way clutch 12 to the second driving gear wheel shaft 2. From the second driving gear wheel shaft 2, this rotational power is transmitted via the fourth speed driving gear 24 to the fourth speed driven gear 34 engaged therewith which transmits said rotation via the splines 63 and the second/fourth synchronizer 60 engaged thereto to the driven gear wheel shaft 3, which rotates the power output gear wheel 36, thus transmitting output rotational power to the differential gear mechanism 37; and at this time automatically the first one way clutch 6 starts to run free or overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 is definitely disengaged before the third clutch 11 starts to be engaged to start the upshifting. Thus the vehicle comes to operate in the fourth speed stage. At a convenient time, during steady running in the fourth speed stage, the first/third synchronizer sleeve 54 of the first/third synchronizer 50 may be returned to the intermediate position, so as to stop the first one way clutch 6 from free wheeling and so as to preserve the life of said first one way clutch 6; and also the first clutch 5 is disengaged.

If, during running in the fourth speed stage, engine braking is currently required, for example when the accelerator pedal of the vehicle is released, then the fourth clutch 13 is engaged, while otherwise it is disengaged. If the fourth clutch 13 is engaged in engine overrunning condition, so as to bypass the action of the second one way clutch 12, rotational power can be transmitted in the reverse direction to the one described above via this fourth clutch 13 from the differential mechanism 37 to the crankshaft 101 of the internal combustion engine 100 in order to provide engine braking, and otherwise during engine overrunning condition the second one way clutch 12 runs free or overruns, thus not providing any engine braking and allowing the vehicle to free wheel or coast.

Further, during steady running in the fourth speed stage the synchronizer sleeve 54 of the first/third synchronizer 50 is set to its intermediate position by said control system, so that neither the first speed driven gear wheel 31 nor the third speed driven gear wheel 33 is rotationally connected to the driven gear wheel shaft 3; however, as a preparatory action to engaging the third speed stage, in fact the first/third synchronizer sleeve 54 may be set to its rightwardly displaced position in FIG. 1 by the above mentioned transmission control system, so as rotationally to couple the third speed driven gear wheel 33 with the driven gear wheel shaft 3. This action will not cause any particular operational problem, because at this time the first clutch 5 is still disengaged; and in any case the first one way clutch 6 could operate to run free, even if the first clutch 5 were engaged.

Downshifting from Fourth Speed Stage to Third Speed Stage

During steady running in the fourth speed stage the first/third synchronizer sleeve 54 of the first/third synchronizer 50 is kept at its intermediate position by said control system, so that the third speed driven gear wheel 33 is not rotationally connected to the driven gear wheel shaft 3; however, as mentioned above as a preparatory action to engaging the third speed stage when downshifting thereto from the fourth speed stage, the first/third synchronizer 50 is set to its rightwardly displaced position by the transmission control system, so as rotationally to couple the third speed driven gear wheel 33 with the driven gear wheel shaft 3. This will cause no particular operational problem, because at this time the first clutch 5 is still disengaged. Next, also as a preparatory action, with of course the second clutch 7 disengaged, the first clutch 5 is engaged. As before, as explained above, this will cause the first one way clutch 6 to run free or overrun.

Next, in order to actually perform the downshift, which may either be during engine drive condition in the case of a kick down type downshift or may be in engine overrunning condition in the case of an engine braking desirable type downshift, simply the third clutch 11 is smoothly disengaged, while keeping the second clutch 7 still disengaged. Since at this time the first clutch 5 is already engaged, hence no particular complicated mutual control of the first clutch 5 and the third clutch 11 is required for the downshifting; this is yet another particular good feature of the present invention.

As the third clutch 11 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the third speed driving gear 23 to the third speed driven gear 33 engaged therewith which transmits said rotation via the splines 52 and the first/third synchronizer 50 engaged thereto to the driven gear wheel shaft 3, which rotates the power output gear wheel 36, thus transmitting output rotational power to the differential gear mechanism 37, now at a gearing ratio appropriate to the third speed stage.

On the other hand, as the third clutch 11 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the third speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the third speed stage is again a consequence of the provision of the bypass clutch 7, i.e. is a consequence of the capability of the first clutching assembly 4 to be locked up in both rotational directions, and is a particular good feature of the present invention.

Thus the vehicle comes to operate in the third speed stage. At a convenient time, during steady running in the third speed stage, the synchronizer sleeve 64 of the second/fourth synchronizer 60 may be returned to the intermediate position, so as to stop the second one way clutch 12 free wheeling and so as to preserve the life of said second one way clutch 12.

Reverse Speed Stage

In the reverse speed stage, the first/third synchronizer sleeve 54 of the first/third synchronizer 50 is set to its intermediate position by the above mentioned transmission control system, the second/fourth synchronizer sleeve 64 of the second/fourth synchronizer 60 is set to its intermediate position by said control system, and the the reverse idler gear 27 is shifted in the leftwards direction along the reverse idler gear shaft 26 by the abovementioned control system via a fork or the like of a per se well known sort, so that said reverse idler gear 27 engages both with the reverse driving gear 25 fixed on the first driving gear wheel shaft 1 and also with the reverse speed driven gear 35 formed on the outside of the first/third synchronizer sleeve 54. Further, the first clutch 5 and the second clutch 7 are engaged, while the third clutch 11 and the fourth clutch 13 are disengaged. Thus, the rotation of the crankshaft 101 is transmitted via the first clutch 5 and the second clutch 7 to the first driving gear shaft 1, and thence is transmitted via the reverse driving gear 25 and the reverse idler gear 27 and the reverse driven gear 35 to the driven gear wheel shaft 3, thus rotating this driven gear wheel shaft 3 and the power output gear wheel 36 mounted thereon in the reverse rotational sense to that rotational sense in which said members were rotated in all the other speed stages whose operation has been explained above, since one more gear wheel, the reverse idler gear 27, is involved in the rotational force transmission path. Thus reverse rotational driving power is transmitted to the differential gear mechanism 37. Thus the gear transmission mechanism according to the first preferred embodiment of the present invention functions in its reverse speed stage. The second clutch 7 is kept engaged at all times during this reverse speed stage operation, because engine braking is very important at this time, and in order to prolong the operational life of the first one way clutch 6.

Summary of the First Embodiment

According to this functioning of the first preferred embodiment, described above, during the engagement of any one of the speed stages, it is possible to prepare for the engagement of the next speed stage required, in other words to make preliminary preparations for the engagement of the next higher or the next lower speed stage. This is possible because alternate speed stages are provided by different ones of the power transmission systems between the crankshaft 101 of the internal combustion engine 100 and the driven gear wheel shaft 3, and thus the power transmission system relating to the next speed stage can be prepared for the subsequent engagement of that next speed stage (by shifting of the synchronizer sleeve relating thereto, in this first preferred embodiment) while still the current speed stage is being engaged; and after this preparation the actual shifting between speed stages can be performed by altering the engagement conditions of the first and second clutching assemblies 4 and 9. Further, because of the provision of the first and second one way clutches 6 and 12, i.e. because these first and second clutching assemblies 4 and 9 have the function of providing one way transmission of rotational power in a certain operational mode, it is not necessary to operate the clutching assemblies 4 and 9 together in any closely related fashion, and accordingly timing problems with regard to simultaneous operation of these clutching assemblies 4 and 9 do not arise. Thus, both in the case of an upshift and in the case of a power on downshift or a so called kick down type downshift, this change between speed stages is accomplished smartly and positively, as is desirable. Further, because of the provision of the operational mode, for both the first and second clutching assemblies 4 and 9, in this preferred embodiment, of transmission of rotational power in both rotational directions, i.e. because of the provision of the second clutch 7 which bypasses the first one way clutch 6 and of the fourth clutch 13 which bypasses the second one way clutch 12, thus, in the case of a power off downshift or an engine braking required type downshift, engine braking is made available in those speed stages of the transmission mechanism which are provided by the power transmission systems associated with those first and second clutching assemblies 4 and 9, i.e. in all of the first through the fourth speed stages. Thus, because in this first preferred embodiment both of the clutching assemblies are provided with such a bypass clutch, i.e. with such a two way power transmission operational mode, engine braking is made available in all the speed stages of the transmission mechanism.

The Second Preferred Embodiment

Figure 2:
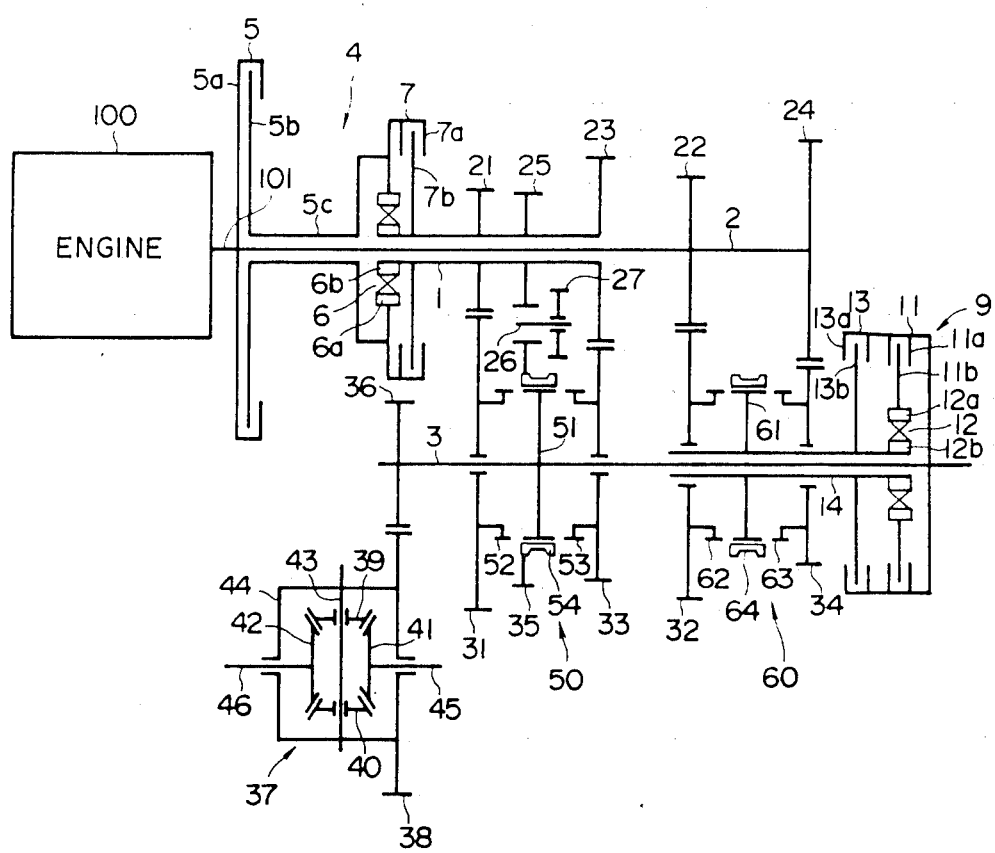
FIG. 2 is a schematic skeleton structural view, similar to FIG. 1, showing a second preferred embodiment which provides essentially the same function as the first preferred embodiment via a different construction.

FIG. 2 is a schematic skeleton structural view of a transmission mechanism which is a second preferred embodiment of the trasmission mechanism according to the present invention. In this figure, parts of the second preferred embodiment shown, which correspond to parts of the first preferred embodiment shown in FIG. 1, and which have the same functions, are designated by the same reference numerals and symbols as in that figure.

In this second preferred embodiment, the actual construction of the first and second clutching assemblies 4 and 9 is exactly the same, as in the case of the first preferred embodiment shown in FIG. 1. Thus in this second preferred embodiment, as in the first preferred embodiment, the first clutching assembly 4 is a series—parallel type three mode type clutching assembly, while the second clutching assembly 9 is a parallel—series type three mode type clutching assembly. Further, the method of operation of the first and second clutching assemblies 4 and 9 in order to provide the various speed stages of the transmission, is also the same, as is the overall method of operation of the transmission mechanism. Accordingly, in this second preferred embodiment, engine braking is also available in all the forward speed stages, by the selective operation of the first clutching assemby 4 and the second clutching assembly 9 to be locked up in both rotational directions. However, in this second preferred embodiment, the arrangement of the gear wheels and of the clutching assemblies is different.

In detail, the second driving gear wheel shaft 2 is directly coupled to the crankshaft 101 of the internal combustion engine 100, and no intermediate shaft such as the intermediate shaft 8 of the first preferred embodiment is provided; instead, the first driving gear wheel shaft 1 rotates directly on the second driving gear wheel shaft 2. However, on the (first) driven gear wheel shaft 3 there rotates a second driven gear wheel shaft 14, which is a hollow shaft. As before, the first and third speed driving gear wheels 21 and 23 and the reverse driving gear wheel 25 are fixedly mounted on the first driving gear wheel shaft 1, and the first speed driven gear wheel 31 and the third speed driven gear wheel 33 are rotatably mounted on the first driven gear wheel shaft 3, with the first/third synchronizer 50 provided between them and selectively rotatably coupling either or neither of these driven gear wheels to said first driven gear wheel shaft 3, as in the first embodiment shown in FIG. 1. Also, the arrangements in general relating to the reverse speed stage are the same as in the first preferred embodiment. However, in this second preferred embodiment, while as before the second speed driving gear wheel 22 and the fourth speed driving gear wheel 24 are fixedly mounted on the second driving gear wheel shaft 2, by contrast the second speed driven gear 32 and the fourth speed driven gear 34 are rotatably mounted on the second driven gear wheel shaft 14, and between them there is provided the second/fourth synchronizer 60, which is of a construction similar to that utilized in the first preferred embodiment, and which selectively rotatably couples either or neither of these driven gear wheels to said second driven gear wheel shaft 14.

Further, the first clutching assembly 4 is, as in the case of the first preferred embodiment, provided between the crankshaft 101 and the first driving gear wheel shaft 1 which functions for providing first and third speed stages, while on the other hand the second clutching assembly 9 is provided between the second driven gear wheel shaft 14 and the first driven gear wheel shaft 3 which is coaxial therewith. Thus, functionally, the operation is exactly the same as in the first preferred embodiment, since again the first clutching assembly 4 is provided in series in the rotational force transmission path of the first power transmission system comprising the first and third speed driving and driven gear wheels 21, 23, 31, and 33 and the first/third synchronizer 50 which can provide either the first or the third speed stage between the crankshaft 101 and the first driven gear wheel shaft 3, while again the second clutching assembly 9 is provided in series in the rotational force transmission path of the second power transmission system comprising the second and fourth speed driving and driven gear wheels 22, 24, 32, and 34 and the second/fourth synchronizer 60 which can provide either the second or the fourth speed stage between the crankshaft 101 and the first driven gear wheel shaft 3, and only the place in this rotational force transmission path of this second clutching assembly 9 is altered.

The functioning of this second preferred embodiment will not be outlined. In fact, based upon the discussions and explanations above, it will be clear to one of ordinary skill in the transmission art that there is no functional difference between the functioning of this second embodiment and the functioning of the first preferred embodiment shown in FIG. 1. In order to shift the transmission mechanism shown in FIG. 2 to its various speed stages, the engagement conditions of the various clutches and synchronizers and one way clutches shown in Table I will apply.

Since in this second preferred embodiment the second clutching assembly 9 is located at a different position in the transmission system, the external shape of the transmission casing will be distinctly different from the external shape of the casing of a transmission according to the first embodiment. Thus, this second embodiment may be more suitable for fitting to some particular patterns of automotive vehicle, in which fitting space may be particularly limited, according to circumstances.

THE THIRD PREFERRED EMBODIMENT

Figure 3:
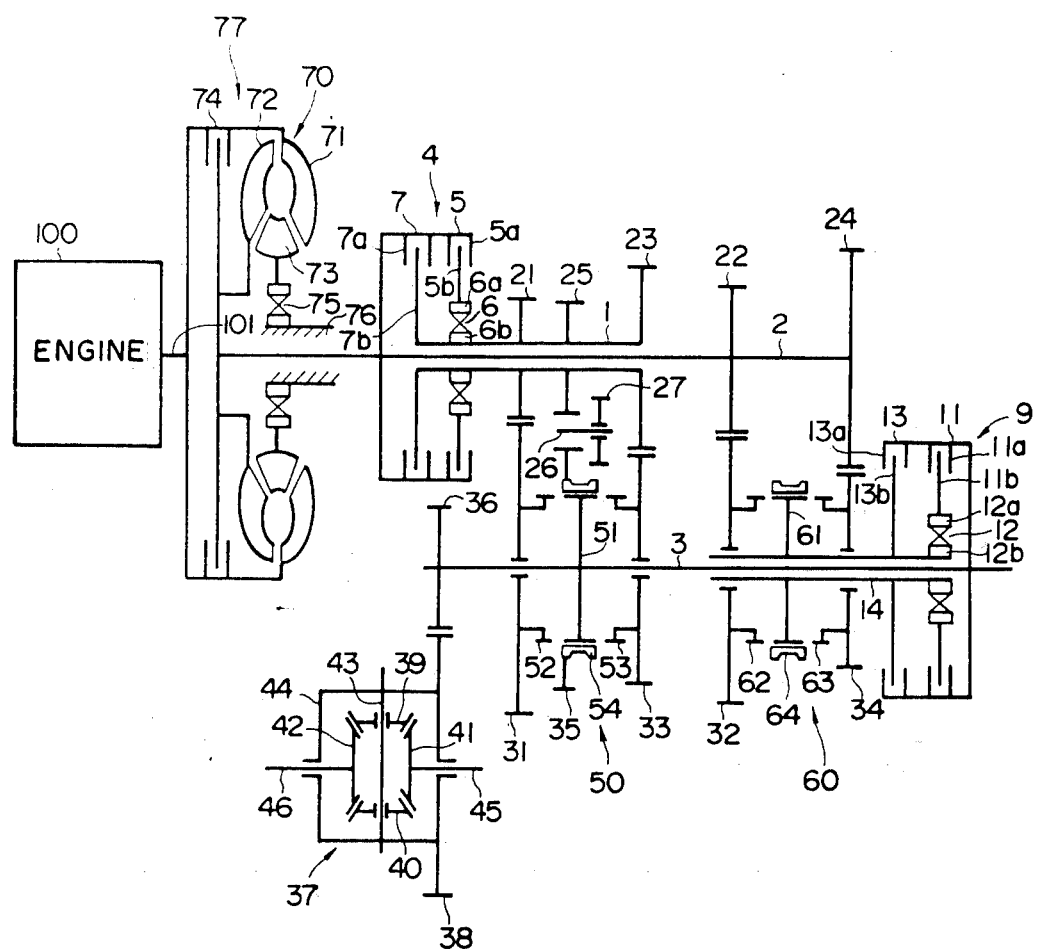
FIG. 3 is a schematic skeleton structural view, similar to FIG. 1 and FIG. 2, showing a third preferred embodiment which is similar to the first preferred embodiment, but additionally includes a torque converter for providing smooth starting off from rest.

FIG. 3 is a schematic skeleton structural view of a transmission mechanism which is a third preferred embodiment of the transmission mechanism according to the present invention. In this figure, parts of the third preferred embodiment shown, which correspond to parts of the first and second preferred embodiments shown in FIGS. 1 and 2, and which have the same functions, are designated by the same reference numerals and symbols in those figures.

In this third preferred embodiment, the construction of the first and second driving gear wheel shafts 1 and 2, of the first and second driven gear wheel shafts 3 and 14, and of the various gear wheels mounted thereon and cooperating therewith and of the synchronizers associated therewith, including the arrangements relating to the reverse speed stage, is identical to the corresponding construction in the second preferred embodiment shown in FIG. 2, and only the construction of the first clutching assembly 4 is different; this first clutching assembly is a parallel—series type clutching assembly, as used for the second clutching assembly 9. Further, in this third preferred embodiment there is included a fluid torque converter 70, which is connected between the crankshaft 101 of the internal combustion engine 100 and the second driving gear wheel shaft 2. Thus, again, in this third preferred embodiment, engine braking is available in all the four forward speed stages, by the selective operation of the first and second clutching assemblies 4 and 9 to be locked up in both rotational directions.

This torque converter 70 is of a per se well known type, and comprises an outer casing 77, which is rotationally coupled to the crankshaft 101 of the engine 100, and to which is rotationally coupled a pump impeller 71. A stator member 73 is mounted via a one way clutch 75 on a fixed member 76, and a turbine runner 72 is rotationally coupled to the left hand end of the second driving wheel shaft 2. A lock-up clutch 74, also of a per se well known type, is provided as selectively directly coupling the turbine runner 72 with the pump impeller 71, and thus directly coupling the second driving wheel shaft 2 with the torque converter casing 77 and the crankshaft 101. By per se well known circulation of hydraulic fluid around a fluid circulation path defined by the pump impeller 71, the turbine runner 72, and the stator member 73, in the general circulation fashion of a smoke ring, the turbine runner 72 and the pump impeller 71 are rotationally coupled together with a certain controlled amount of slippage therebetween, said slippage amount being greater at lower rotational speeds; and selectively this slippage can be entirely eliminated by selective operation of the lock-up clutch 74 to engage it.

In this third preferred embodiment, the lock-up clutch 74 is kept engaged when the transmission mechanism is functioning in the second, third, and fourth speed stages, and accordingly the functioning of this third preferred embodiment in these speed stages is exactly the same as the functioning of the second preferred embodiment. On the other hand, in the first speed stage and the reverse driving stage, the lock-up clutch 74 is not engaged, and thus the action of the torque converter 70, in a per se well known way, aids the smooth moving off from rest of the vehicle incorporating this transmission mechanism, both in the forward and in the reverse directions. This further contributes to eliminating the necessity of delicate operation of the clutches in the transmission mechanism, and particularly in this third preferred embodiment means that the clutches 5 and 7 do not require to be controlled particularly delicately.

The engagement conditions of the various clutches and synchronizers and one way clutches shown in Table I will apply, except that some modification should be made for the fact that the first clutching mechanism 4 is constructed, as explained above, as a parallel—series type of three mode type clutching mechanism, rather than as a series—parallel type of three mode type clutching mechanism as was the case in the first and second preferred embodiments. The necessary adjustments which require to be made to the engagement and disengagement conditions shown in Table I in order to obtain the four speed stages of the transmission mechanism shown in FIG. 3, and engine braking in the forward speed stages, will be apparent to one of ordinary skill in the art, based upon the explanations herein. Further, as mentioned above, the lock-up clutch 74 should be engaged in speed stages other than the first and the reverse speed stages: and this condition could be desirably also incorporated into Table I.

THE FOURTH PREFERRED EMBODIMENT

Figure 4:
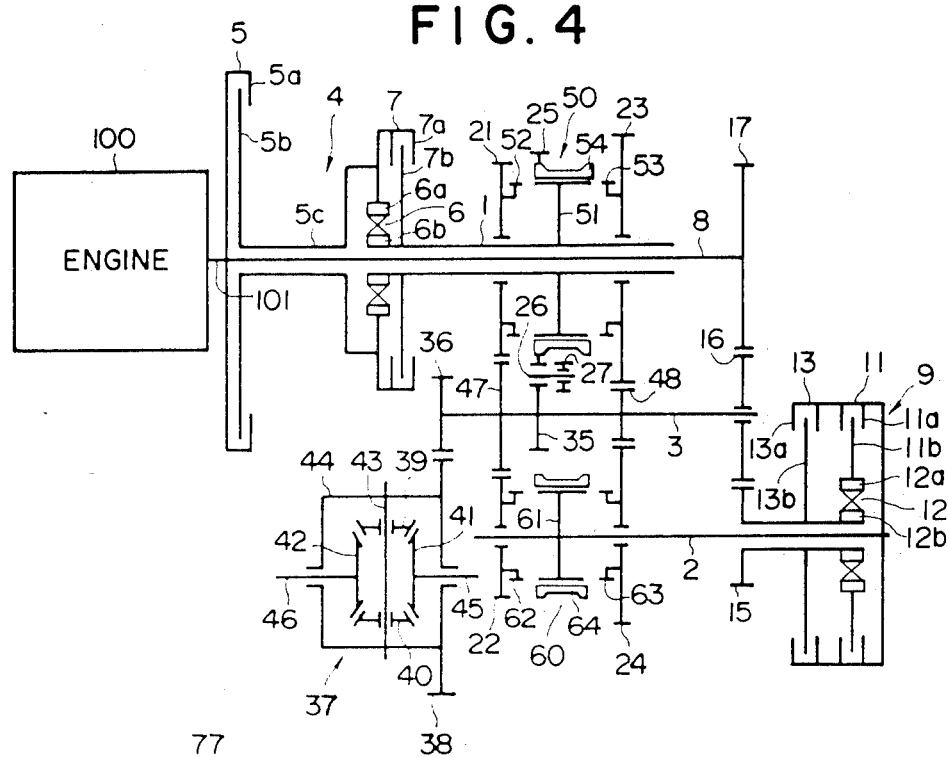
FIG. 4 is a schematic skeleton structural view, similar to FIGS. 1 through 3, showing a fourth preferred embodiment of the transmission mechanism which provides the same function as the first and second preferred embodiments via a substantially different construction which can be made more axially compact.

FIG. 4 is a schematic skeleton structural view of a transmission mechanism which is a fourth preferred embodiment of the transmission mechanism according to the present invention. In this figure, parts of the fourth preferred embodiment shown, which correspond to parts of the first through third preferred embodiments shown in FIGS. 1 through 3, and which have the same functions, are designated by the same reference numerals and symbols as in those figures.

In this fourth preferred embodiment, the actual construction of the first and second clutching assemblies 4 and 9 is exactly the same, as in the case of the first preferred embodiment shown in FIG. 1. Thus in this fourth preferred embodiment, as in the first preferred embodiment, the first clutching assembly 4 is a series—parallel type three mode type clutching assembly, while the second clutching assembly 9 is a parallel—series type three mode type clutching assembly. Further, the method of operation of the first and second clutching assemblies 4 and 9 in order to provide the various speed stages of the transmission, is also the same, as is the overall method of operation of the transmission mechanism. Accordingly, in this fourth preferred embodiment, engine braking is available in all the four forward speed stages, by the selective operation of the first clutching assembly 4 and the second clutching assembly 9 to be locked up in both rotational directions. However, in this fourth preferred embodiment, the arrangement of the gear wheels and of the clutching assemblies is different.

In detail, the first driving gear wheel shaft 1 is hollow, and is rotatably mounted on an intermediate shaft 8 which is directly coupled to the crankshaft 101 of the internal combustion engine 100, as in the case of the first preferred embodiment, but in this case the second driving gear wheel shaft 2 is not mounted on the intermediate shaft 8, but instead is provided as extending in parallel therewith and also parallel with the driven gear wheel shaft 3. This second driving gear wheel shaft 2 is driven from the intermediate shaft 8, via a first power transfer gear wheel 17 fixed to said intermediate shaft 8, which is meshed with a second power transfer gear wheel 16 rotationally mounted on the driven gear wheel shaft 3, which is in turn meshed with a third power transfer gear wheel 15, which is rotationally mounted on said second driving gear wheel shaft 2, and which is selectively rotationally engageable to the second driving gear wheel shaft 2 via the second clutching assembly 9, as will be explained shortly.

In contrast to the case in the first preferred embodiment, the first and third speed driving gear wheels 21 and 23 are not fixedly mounted on the first driving gear wheel shaft 1, and the first speed driven gear wheel 31 and the third speed driven gear wheel 33 are not rotatably mounted on the driven gear wheel shaft 3, with the first/third synchronizer 50 provided between them and selectively rotatably coupling either or neither of these driven gear wheels to said driven gear wheel shaft 3. Instead, a reversed and combined type arrangement is adopted, in which the first and third speed driving gear wheels 21 and 23 are rotatably mounted on the first driving gear wheel shaft 1, with the first/third synchronizer 50 provided between them and selectively rotatably coupling either or neither of these driving gear wheels to said first driving gear wheel shaft 1, and with a combination first/second speed driven gear wheel 47 constantly meshed with the first speed driving gear wheel 21 and a combination third/fourth speed driven gear wheel 48 constantly meshed with the third speed driving gear wheel 23, both these combination driven gear wheels being fixedly mounted on the driven gear wheel shaft 3. It will be easily understood by one of ordinary skill in the transmission art, based upon the above outline explanations, that this arrangement is functionally equivalent to the arrangement in FIG. 1 for the first preferred embodiment, although each may have its own particular constructional and operational advantages and disadvantages, according to circumstances. Also, the arrangements in general relating to the reverse speed stage are basically reversed as compared to those utilized in the first preferred embodiment; the reverse driving gear wheel 25 is provided on the sleeve 54 of the first/third synchronizer 50, and the reverse driven gear wheel 35 is provided as fixedly mounted on the driven gear wheel shaft 3. The operation of this reverse speed stage will be clear to one of ordinary skill in the transmission art.

Further, in this fourth preferred embodiment, a similarly reversed construction is adopted for the second power transmission system, which provides the second and fourth speed stages. In contrast to the case in the first preferred embodiment, the second and fourth speed driving gear wheels 22 and 24 are not fixedly mounted on the second driving gear wheel shaft 2, and no gear wheels such as the second speed driven gear wheel 32 and the fourth speed driven gear wheel 34 of the first preferred embodiment are rotatably mounted on the driven gear wheel shaft 3, with the second/fourth synchronizer 50 provided between them and selectively rotatably coupling either or neither of these driven gear wheels to said driven gear wheel shaft 3. Instead, a reversed and combined type arrangement is adopted, in which the second and fourth speed driving gear wheels 22 and 24 are rotatably mounted on the second driving gear wheel shaft 2, with the second/fourth synchronizer 60 provided between them and selectively rotatably coupling either or neither of these driving gear wheels to said second driving gear wheel shaft 2, and the same combination driven gear wheels as in the case of the first and the third speed stages, i.e. the combination first/second speed driven gear wheel 47 and the combination third/fourth speed driven gear wheel 48, are also constantly meshed therewith and are used for being driven in these two speed stages also, said combination driven gear wheels 47 and 48 as stated above being fixedly mounted on the driven gear wheel shaft 3 and being also respectively meshed with the first speed driving gear wheel 21 and with the second speed driving gear wheel 22. It will be easily understood that this arrangement is functionally equivalent to the arrangement in FIG. 1 for the first preferred embodiment.

Now, the first clutching assembly 4 is, as in the case of the first preferred embodiment, provided between the crankshaft 101 of the internal combustion engine 100 and the first driving gear wheel shaft 1 which functions for providing first and third speed stages, while on the other hand as mentioned above in this fourth preferred embodiment the second clutching assembly 9 is provided between the third power transfer gear wheel 15 and the second driving gear wheel shaft 2. Thus, functionally, the operation is exactly the same as in the first preferred embodiment, since again the first clutching assembly 4 is provided in series in the rotational force transmission path of the first power transmission system comprising the driving and driven gear wheels relating to the first and third speed stages 21, 23, 31, and 33 and the first/third synchronizer 50, which can provide either the first or the third speed stage between the crankshaft 101 and the driven gear wheel shaft 3, while again the second clutching assembly 9 is provided in series in the rotational force transmission path of the second power transmission system comprising the driving and driven gear wheels relating to the second and fourth speed stages 22, 24, 32, and 34 and the second/fourth synchronizer 60, which can provide either the second or the fourth speed stage between the crankshaft 101 and the driven gear wheel shaft 3, and only the point of location in this rotational force transmission path of this second clutching assembly 9 is altered.

No particular adjustments require to be made to the engagement and disengagement conditions for the various clutches and synchronizers and one way clutches shown in Table I in order to obtain the four speed stages of this fourth preferred embodiment, and its operation, essentially similar to the operation of the first preferred embodiment, will be apparent to one of ordinary skill in the art, based upon the explanations herein, without further discussion. It will also be apparent to a person of skill in the transmission art that the construction of this fourth preferred embodiment may be particularly beneficial with regard to reduction of the axial length of the transmission as a whole, since the number of axially separated wheels provided on each of the shafts 1, 2, and 3 is substantially reduced, and also the first/third speed synchronizer 50 and the second/fourth speed synchronizer 60 may be axially overlapped over one another, either partially or completely. These constructional details will not be explored in detail in this specification, but are very important for practical utilization of the transmission system according to the present invention.

THE FIFTH PREFERRED EMBODIMENT

Figure 5:
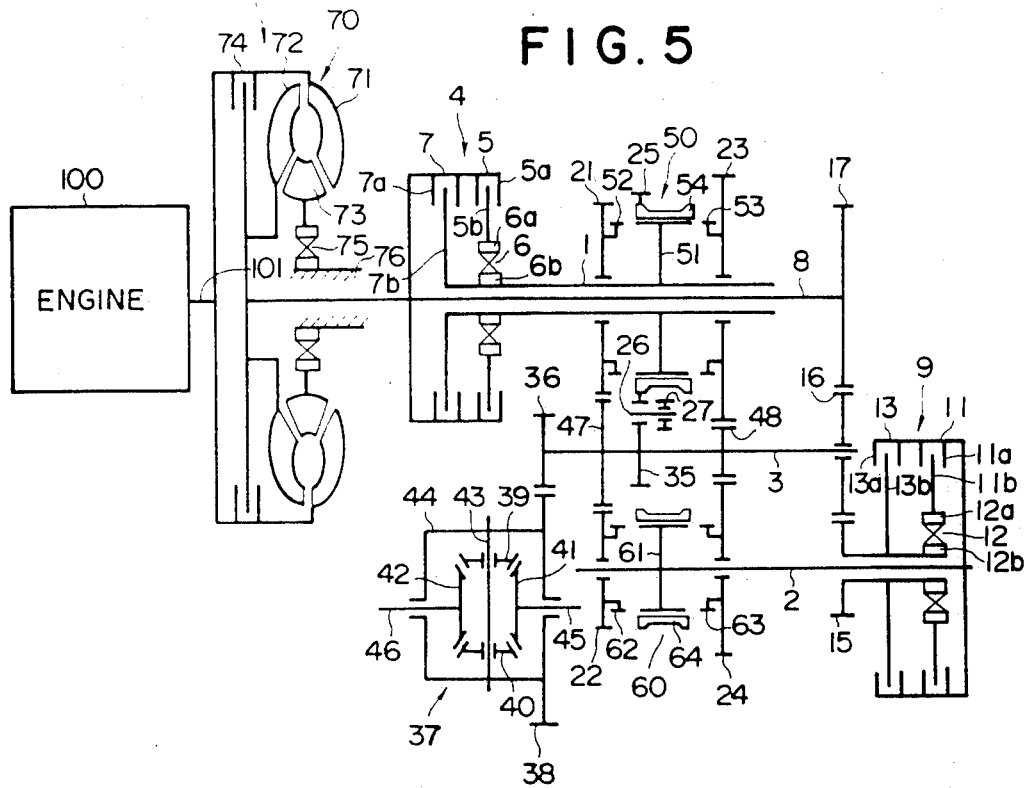
FIG. 5 is a schematic skeleton structural view, similar to FIGS. 1 through 4, showing a fifth preferred embodiment of the transmission mechanism which is similar to the fourth preferred embodiment, but additionally includes a torque converter for providing smooth starting off from rest.

FIG. 5 is a schematic skeleton structural view of a transmission mechanism which is a fifth preferred embodiment of the transmission mechanism according to the present invention. In this figure, parts of the fifth preferred embodiment shown, which correspond to parts of the first through fourth preferred embodiments shown in FIGS. 1 through 4, and which have the same functions, are designated by the same reference numerals and symbols as in those figures.

In this fifth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is identical to the corresponding construction in the fourth preferred embodiment shown in FIG. 4, and only the construction of the first clutching assembly 4 is different; this first clutching assembly is a parallel—series type clutching assembly, as used in the third preferred embodiment. Further, in this fifth preferred embodiment there is included a fluid torque converter 70, which is connected between the crankshaft 101 of the internal combustion engine 100 and the intermediate shaft 1, and which is of the same per se well known type including a lock-up clutch as in the third preferred embodiment shown in FIG. 3. In this fifth preferred embodiment, again, the lock-up clutch 74 is kept engaged in the second, third, and fourth speed stages, and accordingly the functioning of this fifth preferred embodiment in these speed stages is exactly the same as the functioning of the fourth preferred embodiment. On the other hand, in the first speed stage and the reverse driving stage, the lock-up clutch 74 is not engaged, and thus the action of the torque converter 70, in a per se well known way, aids the smooth moving off from rest of the vehicle incorporating this transmission mechanism, both in the forward and in the reverse directions, as in the case of the third preferred embodiment. This, as before, further contributes to eliminating the necessity of delicate operation of the clutches in the transmission mechanism, and particularly in this fifth preferred embodiment means that the clutches 5 and 7 do not require to be controlled particularly delicately.

The engagement conditions of the various clutches and synchronizers and one way clutches relating to the fourth preferred embodiment will apply, except that again some modification should be made for the fact that the first clutching mechanism 4 is constructed, as explained above, as a parallel—series type of three mode type clutching mechanism, rather than as a series—parallel type of three mode type clutching mechanism as was the case in the fourth preferred embodiment. The necessary adjustments which require to be made to the engagement and disengagement conditions of the various clutches and synchronizers and one way clutches described with respect to the fourth preferred embodiment in order to obtain the four speed stages of the transmission mechanism shown in FIG. 5, and in order to obtain engine braking in the forward speed stages, will be apparent to one of ordinary skill in the art, based upon the explanations herein. Further, as mentioned above, the lock-up clutch 74 should be engaged in all speed stages other than the first and the reverse speed stages.

THE SIXTH PREFERRED EMBODIMENT

Figure 6:
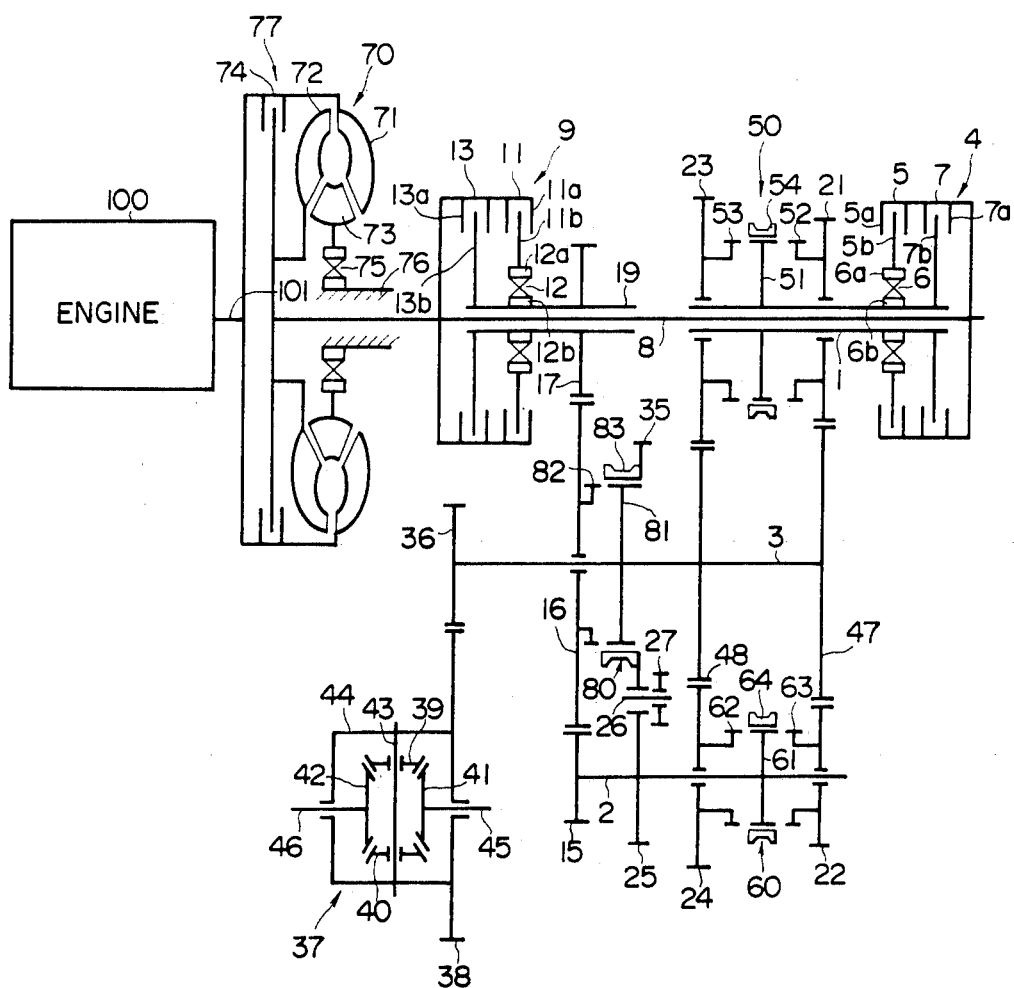
FIG. 6 is a schematic skeleton structural view, similar to FIGS. 1 through 5, showing a sixth preferred embodiment of the transmission mechanism which is similar to the fifth preferred embodiment, but which provides arrangements for a fifth speed stage as well.

FIG. 6 is a schematic skeleton structural view of a transmission mechanism which is a sixth preferred embodiment of the transmission mechanism according to the present invention. In this figure, parts of the sixthe preferred embodiment shown, which correspond to parts of the first through fifth preferred embodiments shown in FIGS. 1 through 5, and which have the same functions, are designated by the same reference numerals and symbols as in those figures.

In this sixth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is basically similar to the corresponding construction in the fifth preferred embodiment shown in FIG. 5, except for the following points. First, in FIG. 6 the general construction is shown in a fashion as reversed between left and right, as compared to FIG. 5. Next, rather than the first power transfer gear wheel 17 being directly connected to the intermediate shaft 8 and the third power transfer gear wheel 15 being selectively connectable to the second driving gear wheel shaft 2 in one rotational direction only via the second clutching assembly 9 as was the case in the fifth preferred embodiment shown in FIG. 5, this arrangement is reversed in this sixth preferred embodiment, so that the first power transfer gear wheel 17 is mounted on a hub member 19 of the second clutching assembly 9, and is selectively connectable to the intermediate shaft 8 in one rotational direction only via the second clutching assembly 9 and the third power transfer gear wheel 15 is directly connected to the second driving gear wheel shaft 2. It will be easily understood that these alterations do not affect the operation in first speed stage to fourth speed stage of the transmission mechanism or the combinations of engagement and disengagement of the various clutches and synchronizers and one way clutches in the various speed stages thereof, by comparison with the fifth preferred embodiment. The distinctive feature of this sixth preferred embodiment, however, is that the second power transfer gear wheel 16, rather than always rotating freely on the driven gear wheel shaft 3 as was the case in the sixth preferred embodiment, is selectively engageable to said driven gear wheel shaft 3 by a fifth speed synchronizer 80, which comprises a hub portion 81, a set of fifth speed splines 82 formed on said second power transfer gear wheel 16, and a sleeve 83 which can either be slid in the leftwards direction in the figure to engage said second power transfer gear wheel 16 to said driven gear wheel shaft 3, or can be slid in the rightwards direction to disengage said members from one another. Thereby a fifth speed stage may be attained, in which engine braking is of course available, since the power transmission path therefor passes through the second clutching assembly 9 which has its mode of transferring rotational power in both rotational directions. By the way, in this sixth preferred embodiment the reverse speed stage is provided by a reverse driving gear wheel 25 fixedly mounted on the second driving gear wheel shaft 2 and by a reverse driven gear 35 formed on the outside of the fifth speed synchronizer sleeve 83, and via a reverse idler gear 26 on a shaft 27 as before, and accordingly engine braking is again available in this reverse speed stage.

The engagement conditions of the various clutches and synchronizers and one way clutches relating to the fifth preferred embodiment will apply, with the addition of the operation of the synchronizer 80 for fifth speed stage. Details will be easily supplemented by one of ordinary skill in the art, based upon the disclosure herein.

THE SEVENTH PREFERRED EMBODIMENT

Figure 7:
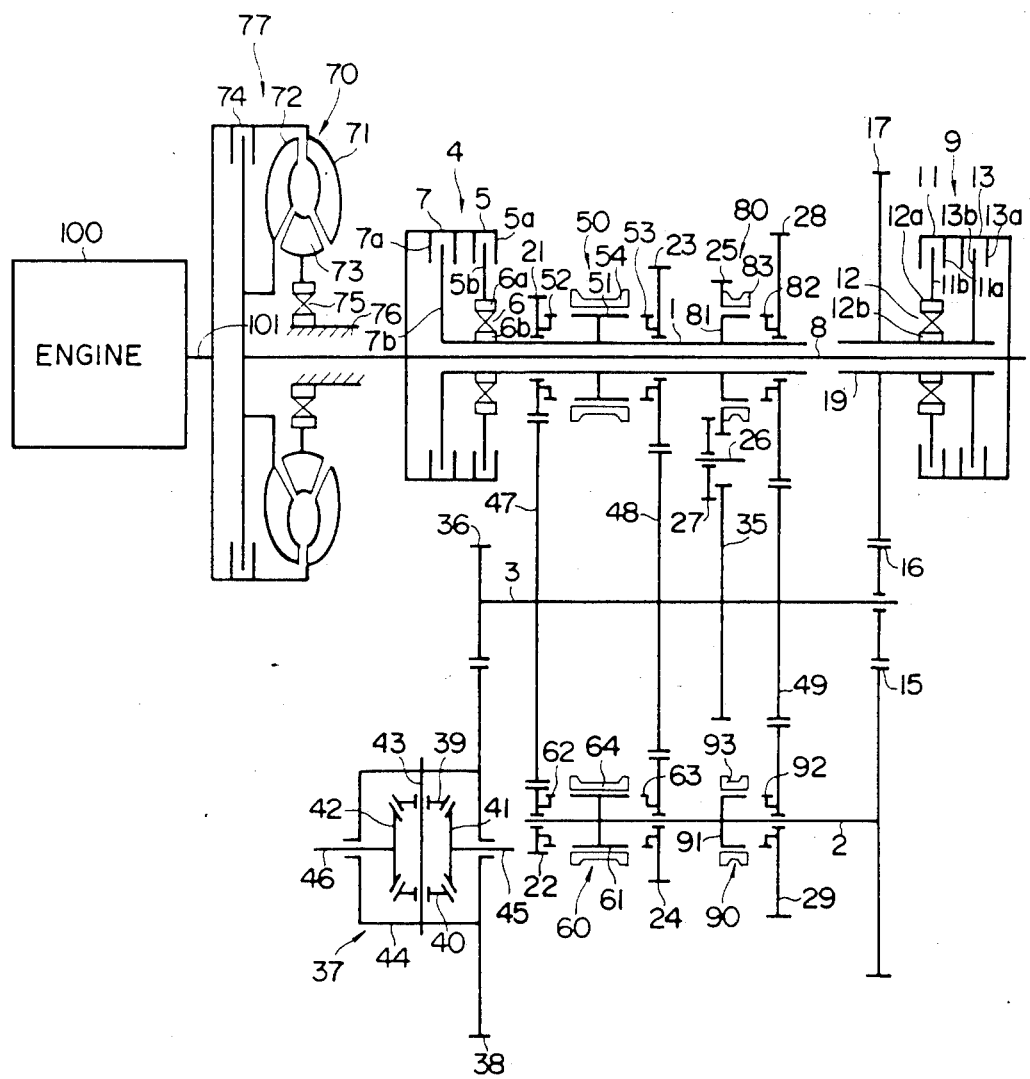
FIG. 7 is a schematic skeleton structural view, similar to FIGS. 1 through 6, showing a seventh preferred embodiment of the transmission mechanism which is similar to a fifth preferred embodiment, but which provides arrangements for a fifth and a sixth speed stage as well.

FIG. 7 is a schematic skeleton structural view of a transmission mechanism which is an seventh preferred embodiment of the transmission mechanism according to the present invention. In this figure, parts of the seventh preferred embodiment shown, which correspond to parts of the first through sixth preferred embodiments shown in FIGS. 1 through 6, and which have the same functions, are designated by the same reference numerals and symbols as in those figures.

In this seventh preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is basically similar to the corresponding construction in the sixth preferred embodiment shown in FIG. 6, except for the following points. First, in FIG. 7 the general construction is shown in a fashion as reversed between left and right, as compared to FIG. 6. The distinctive feature of this seventh preferred embodiment, however, is that the second power transfer gear wheel 16, rather than being selectively engageable to the driven gear wheel shaft 3 by any synchronizer like the fifth speed synchronizer 80 in the sixth preferred embodiment, always rotates freely on said driven gear wheel shaft 3 as was the case in the sixth preferred embodiment; a fifth speed driving gear wheel 28 is provided rotatably engaged on the first driving gear wheel shaft 1, being rotatably engagable thereto by a fifth speed synchronizer 80, which comprises a hub portion 81, a set of fifth speed splines 82 formed on said fifth speed driving gear wheel 28, and a sleeve 83 which can either be slid in the rightwards direction in the figure to engage said fifth speed driving gear wheel 28 to said first driving gear wheel shaft 1, or can be slid in the leftwards direction to disengage said members from one another; a sixth speed driving gear wheel 29 is provided rotatably engaged on the second driving gear wheel shaft 2, being rotatably engagable thereto by a sixth speed synchronizer 90, which comprises a hub portion 91, a set of sixth speed splines 92 formed on said sixth speed driving gear wheel 29, and a sleeve 93 which can either be slid in the rightwards direction in the figure to engage said sixth speed driving gear wheel 29 to said second driving gear wheel shaft 2, or can be slid in the leftwards direction to disengage said members from one another; and a fifth/sixth speed driven gear wheel 49 is provided as fixedly engaged on the driven gear wheel shaft 3, in constant mesh both with the fifth speed driving gear wheel 28 and with the sixth speed driving gear wheel 29. Thereby a fifth speed stage may be attained, in which engine braking is available, since the power transmission path therefor passes through the first clutching assembly 4 which has a mode of transferring rotational power in both rotational directions; and a sixth speed stage may be attained, in which engine braking is similarly also available, since the power transmission path therefor passes through the second clutching assembly 9 which also has its mode of transferring rotational power in both rotational directions. By the way, in this seventh preferred embodiment the reverse speed stage is provided by a reverse driving gear 25 formed on the outside of the fifth speed synchronizer sleeve 83, and by a reverse driven gear 35 fixedly mounted on the driven gear wheel shaft 3 and via a reverse idler gear 26 on a reverse idler shaft 27 as before, and accordingly engine braking is available in the reverse speed stage, in this embodiment.

The engagement conditions of the various clutches and synchronizers and one way clutches relating to the fifth preferred embodiment will apply, with the addition of the operation of the synchronizer 80 for fifth speed stage and the operation of the synchronizer 90 for sixth speed stage. Details will be easily supplemented by one of ordinary skill in the art, based upon the disclosure herein.

THE EIGHTH PREFERRED EMBODIMENT

Figure 8:
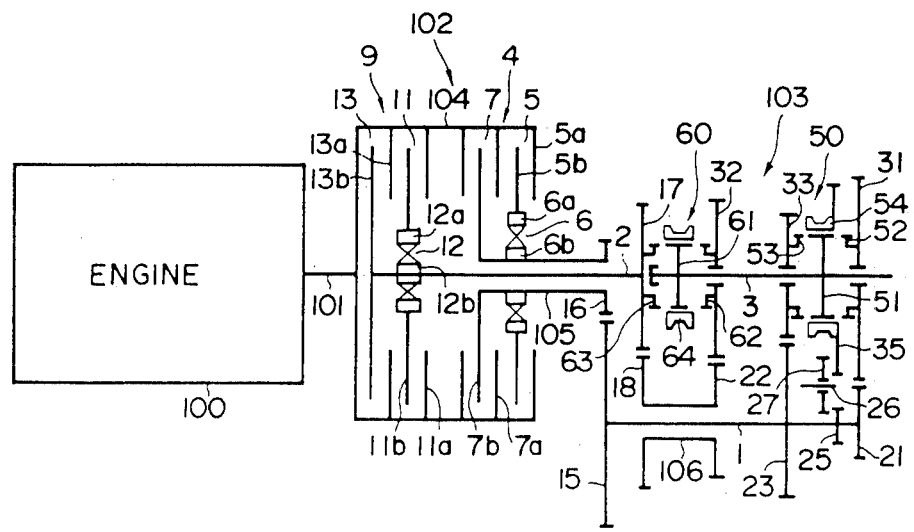
FIG. 8 is a schematic skeleton structural view, similar to FIGS. 1 through 7, showing an eighth preferred embodiment of the transmission mechanism in which two clutching mechanisms are concentrated at the engine end of the transmission and the power output shaft is coaxial with the power input shaft, and in which the fourth speed stage is a directly coupled speed stage.

FIG. 8 is a schematic skeleton structural view of a transmission mechanism which is an eighth preferred embodiment of the transmission mechanism according to the present invention. In this figure, parts of the eighth preferred embodiment shown, which correspond to parts of the first through seventh preferred embodiments shown in FIGS. 1 through 7, and which have the same functions, are designated by the same reference numerals and symbols as in those figures.

This eighth preferred embodiment will be described at some length, because it differs radically from all of the first seven preferred embodiments described above, and has particular merits of its own, especially with regard to its construction, though its structural elements such as on-off clutches, one way clutches, gears, and synchronizers are per se substantially the same as those in the previous embodiments. In this eighth preferred embodiment, all of the clutching devices, i.e. the first and second clutching assemblies 4 and 9, are concentrated together into one multiple clutching mechanism 102, and the crankshaft 101 of the internal combustion engine 100, which is again rotated thereby in the predetermined direction only, is directly drivingly coupled to an outer housing 104 of this multiple clutching mechanism 102. Two concentric power output shafts protrude from this multiple clutching mechanism 102 in the direction away from the internal combustion engine 100: a tubular power transfer shaft 105, and a second driving shaft 2, whose function is similar to that of the second driving gear wheel shaft 2 in the first through seventh embodiments described above, which passes along the central axial hole of the power transfer shaft 105 as coaxial therewith, and on which said power transfer shaft 105 is rotatably mounted. These power output shafts lead rotational power to a gear transmission mechanism 103, the detailed structure of which will be described shortly. Parallel with the coaxial second driving shaft 2 and the power transfer shaft 105 and displaced sideways therefrom there is provided a first driving gear wheel shaft 1, whose function is similar to that of the first driving gear wheel shaft 1 in the first through seventh embodiments described above; and coaxial with these two shafts and displaced axially therefrom there is provided a driven gear wheel shaft 3, with its left hand end directly opposing the right hand end of the second driving shaft 2 as will be explained in detail later.

The structure of the multiple clutching mechanism 102 is as follows. The left hand part of said multiple clutching mechanism 102 corresponds functionally to the second clutching assembly 9 of the first seven preferred embodiments, and the right hand part of said multiple clutching mechanism 102 corresponds functionally to the first clutching assembly 4 of the first seven preferred embodiments. Thus, both the left hand part and the right hand part of the multiple clutching mechanism 102, substantially independently, again can operate in any one of three operational modes, to either: (a) provide free wheeling action in both rotational directions, not transmitting power in either rotational direction; or (b) provide direct transmission of rotational power in one rotational direction only, while providing free wheeling action in the other rotational direction, said one rotational direction being said predetermined rotational direction to drive the vehicle by the engine; or (c) provide direct transmission of rotational power in both rotational directions.

In the right hand part of the multiple clutching mechanism 102, i.e. in the first clutching assembly 4, a first clutch 5 is provided, comprising a power input member 5a which is connected to the housing 104 of the multiple clutching mechanism 102 and which is thus rotationally connected to the crankshaft 101 of the engine 100, and a power output member 5b which is connected to the power input member 6a of a first one way clutch 6, the power output member 6b of which is rotationally connected to the left hand end of the hollow power transfer shaft 105 which is coaxially rotatably mounted on the second driving shaft 2. The housing 104 is also connected to a power input member 7a of a second clutch 7, the power output member 7b of which is rotationally connected to the hollow power transfer shaft 105. Thus, the second clutch 7 is connected in parallel with the series combination of the first one way clutch 6 and the first clutch 5, and this parallel combination is connected between the engine crankshaft 101 and the power transfer shaft 105. Again, the construction of each of the first and second clutches 5 and 7, and of the one way clutch 6, is per se well known. Thus, the first clutching assembly 4 functions as a parallel—series clutching assembly of the type described above with respect to previous preferred embodiments. Further, in the left hand part of the multiple clutching mechanism 102, i.e. in the second clutching assembly 9, a fourth clutch 13 is provided, comprising a power input member 13a which is connected to the housing 104 and which is thus rotationally connected to the crankshaft 101 of the engine 100, and a power output member 13b which is rotationally connected to the left hand end of the second driving shaft 2. The housing 104 is also connected to a power input member 11a of a third clutch 11, the power output member 11b of which is connected to the power input member 12a of a second one way clutch 12, the power output member 12b of which is rotationally connected to the second driving shaft 2; and thus, the fourth clutch 13 is connected in parallel with the series combination of the second one way clutch 12 and the third clutch 11, and this parallel combination is connected between the engine crankshaft 101 and the second driving shaft 2. Again, the construction of each of the third and fourth clutches 11 and 13, and of the one way clutch 12, is per se well known. Thus, the second clutching assembly 9 also functions as a parallel—series clutching assembly.

The handedness of each of the one way clutches 6 and 12 is as in the previously described preferred embodiments, so that, when its power input member is rotating in the aforesaid predetermined rotational direction, its power output member is constrained to rotate in said predetermined rotational direction at least as quickly.

On the driven gear wheel shaft 3 there are rotatably mounted, in order from right to left, a first speed driven gear 31, a third speed driven gear 33, and a second speed driven gear 32. On the first driving gear wheel shaft 1 there are fixedly mounted, in order from right to left, a first speed driving gear 21, a reverse speed driving gear 25, and a third speed driving gear 23, and a first power transfer gear wheel 15. On the right hand end of the power transfer shaft 105 there is fixedly mounted a second power transfer gear wheel 16, which is constantly meshed with this first power transfer gear wheel 15, and accordingly the first driving gear wheel shaft 1 is constantly driven from this power transfer shaft 105. On the right hand end of the second driving shaft 2 there is fixedly mounted a third power transfer gear wheel 17, and this is constantly meshed with a fourth power transfer gear wheel 18, which is mounted on the left hand end of a hollow shaft 106 which is rotatably mounted on the first driving gear wheel shaft 1. On the right hand end of this hollow shaft 106 there is mounted a second speed driving gear 22. The first speed driving gear 21 is in constant mesh with the first speed driven gear 31; the second speed driving gear 22 is in constant mesh with the second speed driven gear 32; and the third speed driving gear 23 is in constant mesh with the third speed driven gear 33. No gear wheels are provided for the fourth speed stage in this eighth preferred embodiment.

Between the first speed driven gear 31 and the third speed driven gear 33 on the driven gear wheel shaft 3 there is fitted a first/third synchronizer 50, which performs the function of synchronizing engagement of the first speed stage and of the third speed stage. This first/third synchronizer 50 is similar to the previously described synchronizers in the other preferred embodiments, and comprises a hub 51 which is fixedly mounted on the driven gear wheel shaft 3, a set of first speed stage splines 52 provided integrally with the first speed driven gear 31 and a set of third speed stage splines 53 provided integrally with the third speed driven gear 33, and a first/third synchronizer sleeve 54 which is engaged by splines over the hub 51 so that it is rotationally coupled to the driven gear wheel shaft 3 but is free to slide axially thereon, which is engagable to either the first speed stage splines 52 or the third speed stage splines 53, respectively according as to whether it is slid to right or left on said hub 51. The function of this first/third synchronizer 50 is to rotationally couple either the first speed driven gear 31 or the third speed driven gear 33 or neither of them to the driven gear wheel shaft 3, according as its sleeve 54 respectively is shifted to its rightmost position, is shifted to its leftmost position, or is shifted to an intermediate or middle position. On the outside of the first/third synchronizer sleeve 54 there is formed a reverse speed driven gear 35, the action of which will be explained later, which is substantially coplanar with the reverse speed driving gear 25 on the first driving gear wheel shaft 1.

On the driven gear wheel shaft 3, between the second speed driven gear 32 and the left hand end of said driven gear wheel shaft 3 which opposes the right hand end of the second driving shaft 2, there is fitted a second-/fourth synchronizer 60, which performs the function of synchronizing engagement of the second speed stage and of the fourth speed stage. This second/fourth synchronizer 60 is also of a per se well known sort, and comprises a hub 61 which is fixedly mounted on the driven gear wheel shaft 3, a set of second speed stage splines 62 provided integrally with the second speed driven gear 32 and a set of fourth speed stage splines 63 provided on said right hand end of said second driving shaft 2, in fact integrally with the third power transfer gear wheel 17 in this embodiment, and a second/fourth synchronizer sleeve 64 which is engaged by splines over the hub 61 so that it is rotationally coupled to the driven gear wheel shaft 3 but is free to slide axially thereon, which is engagable to either the second speed stage splines 62 or the fourth speed stage splines 63, respectively according as to whether it is slid to right or left on said hub 61. The function of this second/fourth synchronizer 60 is to rotationally couple either the second speed driven gear 32 or the second driving shaft 2 or neither of them to the driven gear wheel shaft 3, according as its second/fourth synchronizer sleeve 64 respectively is shifted to its rightmost position, is shifted to its leftmost position, or is shifted to an intermediate or middle position.

The right hand end of the driven gear wheel shaft 3 is prolonged, although this is not explicitly shown, so as to provide a rotational power take off for the transmission mechanism shown, as for instance to a differential device of a vehicle.

Finally, on a reverse idler gear shaft 26 which is supported as parallel to the first driving gear wheel shaft 1 and the driven gear wheel shaft 3 there is rotatably and slidably mounted a reverse idler gear 27. Arrangements of a per se well known sort, not shown in the figures, are provided for shifting this reverse idler gear 27 to and fro in the left and right directions on the reverse idler gear shaft 26; and, when the reverse idler gear 27 is in its most rightwards position on the reverse idler gear shaft 26, said reverse idler gear 27 does not mesh with any other gear wheels and is therefore free to rotate; but, when the reverse idler gear 27 is in its most leftwards position on the reverse idler gear shaft 26, said reverse idler gear 27 meshes with the reverse speed driving gear 25 and with the reverse speed driven gear 35 formed on the outside of the first/third synchronizer sleeve 54, so as to provide a reverse speed stage.

For each of the transmission speed stages that can be attained, the engagement conditions of the first, second, third and fourth clutches 5, 7, 11, and 13, the engagement or disengagement conditions of the first speed stage splines 52 and the third speed stage splines 53 to the first/third synchronizer sleeve 54 of the first/third synchronizer 50 and the engagement or disengagement conditions of the second speed stage splines 62 and the fourth speed stage splines 63 to the second/fourth synchronizer sleeve 64 of the second/fourth synchronizer 60, and the engaged or over running conditions of the first and second one way clutches 6 and 12, in this eighth preferred embodiment, are the same as those in the first preferred embodiment and as shown in Table I.

The operation of the transmission shown in FIG. 8 will be clear to one of ordinary skill in the transmission art, by combined reference to FIG. 8 and Table I in the light of the descriptions of operations made with respect to the transmission mechanism shown in FIG. 1.

This eighth preferred embodiment has the following particular constructional advantages.

First, the clutching assemblies 4 and 9 are both located between the gear transmission mechanism 103 and the internal combustion engine 100. This is important because the diameters of the first through fourth clutches 5, 7, 11, and 13 may be required to be considerably large; and in particular may be required to be large compared to the diameters of the various gear wheels of the gear transmission mechanism 103. Now, in the case of a front engined rear wheel drive vehicle, where the transmission is typically mounted under the firewall or bulkhead separating the engine room from the passenger compartment thereof, typically there is considerable space available at the front end of the transmission where it is attached to the engine, but very little space available at the rear end of the transmission where it is attached to the propeller shaft. In such a construction, therefore, it is particularly beneficial for the various clutching elements, which as explained above are the elements of particularly large diameter, to be concentrated together at the front end of the transmission, as in the shown eighth preferred embodiment; this is extremely helpful for fitting the transmission in place without causing any undesirable hump in the transmission tunnel formed along the floor of the vehicle, and without any such constraint occurring as that the entire transmission should be forced to be mounted forward of the bulkhead, for example. Accordingly, this eighth preferred embodiment has particularly good mountability.

Also the axis of the driven gear wheel shaft 3, which in this construction is the power output shaft of the transmission, is the same as the axis of the multiple clutching mechanism 102 and of the crankshaft 101 of the internal combustion engine 100. This again improves the mountability of the transmission to a front engine rear wheel drive type vehicle. Further, the fourth speed stage of the transmission is thereby enabled to be a directly driven speed stage, in which no gear wheels are being subjected to wear; this greatly improves the service life and the reliability of the transmission as a whole.

THE NINTH PREFERRED EMBODIMENT

Figure 9:
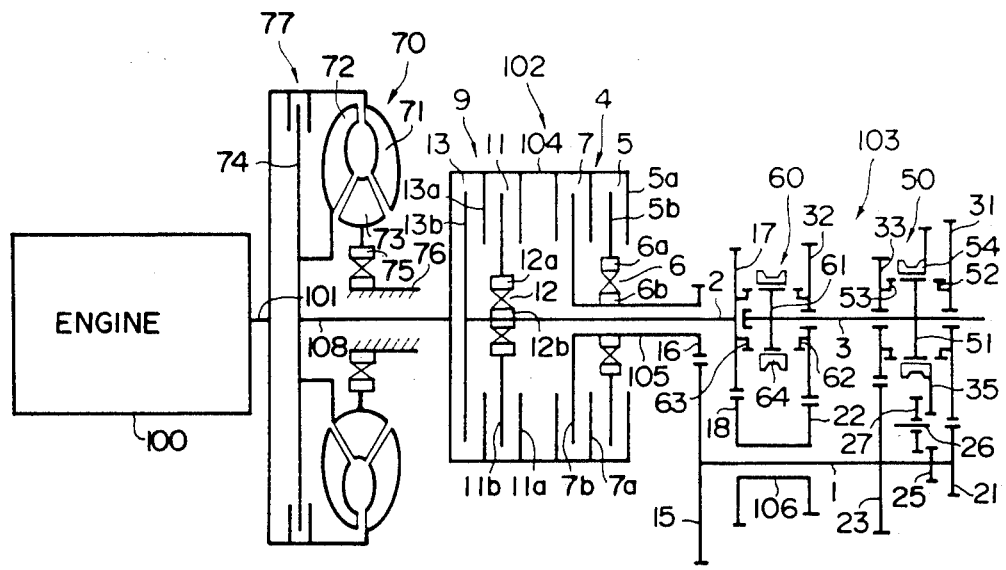
FIG. 9 is a schematic skeleton structural view, similar to FIGS. 1 through 8, showing a ninth preferred embodiment of the transmission mechanism which is similar to the eighth preferred embodiment, but additionally includes a torque converter for providing smooth starting off from rest.

FIG. 9 is a schematic skeleton structural view of a transmission mechanism which is a ninth preferred embodiment of the transmission mechanical according to the present invention. In this figure, parts of the ninth preferred embodiment shown, which correspond to parts of the first through eighth preferred embodiments shown in FIGS. 1 through 8, and which have the same functions, are designated by the same reference numerals and symbols as in those figures.

In this ninth preferred embodiment, the construction of the multiple clutching mechanism 102 including the first and second clutching assemblies 4 and 9, and of the first driving gear wheel shaft 1, the second driving shaft 2, the driven gear wheel shaft 3, and the various gear wheels mounted thereon and cooperating therewith and the synchronizers associated therewith, including the arrangements relating to the reverse speed stage, is identical to the corresponding construction in the eighth preferred embodiment shown in FIG. 8. However, in this ninth preferred embodiment, there is further additionally included a fluid torque converter 70, which is connected between the crankshaft 101 of the internal combustion engine 100 and a power transfer shaft 108 which is rotationally connected to the casing 104 of the multiple clutching mechanism 102.

This torque converter 70 is again of a per se well known type, and comprises an outer casing 77, which is rotationally coupled to the crankshaft 101 of the engine 100, and to which is rotationally coupled a pump impeller 71. A stator member 73 is mounted via a one way clutch 75 on a fixed member 76, and a turbine runner 72 is rotationally coupled to the left hand end in the figure of the power transfer shaft 108. A direct clutch, also of a per se well known type, is provided as selectively directly coupling the turbine runner 72 with the pump impeller 71, and thus the power transfer shaft 108 with the torque converter casing 77 and the crankshaft 101. By per se well known circulation of hydraulic fluid around a fluid circulation path defined by the pump impeller 71, the turbine runner 72, and the stator member 73, in the general circulation fashion of a smoke ring, the turbine runner 72 and the pump impeller 71 are rotationally coupled together with a certain controlled amount of slippage therebetween, said slippage amount being greater at lower rotational speeds; and selectively this slippage can be entirely eliminated by selective operation of the direct clutch 74 to engage it.

In this ninth preferred embodiment, the direct engagement clutch 74 is kept engaged in the second, third, and fourth speed stages, and accordingly the functioning of this ninth preferred embodiment in these speed stages is exactly the same as the functioning of the eighth preferred embodiment. On the other hand, in the first speed stage and the reverse driving stage, the direct clutch 74 is not engaged, and thus the action of the torque converter 70, in a per se well known way, aids the smooth moving off from rest of the vehicle incorporating this transmission mechanism, both in the forward and in the reverse directions. This further contributes to eliminating the necessity of delicate operation of the clutches in the transmission mechanism, and particularly in this eighth preferred embodiment means that the clutches 5 and 7 do not require to be controlled particularly delicately.

The engagement conditions of the various clutches and synchronizers and one way clutches shown in Table I will apply. Further, as mentioned above, the direct engagement clutch 74 should be engaged in speed stages other than the first and the reverse speed stages: and this condition could be desirably also incorporated into the modified Table I.

THE TENTH PREFERRED EMBODIMENT

Figure 10:
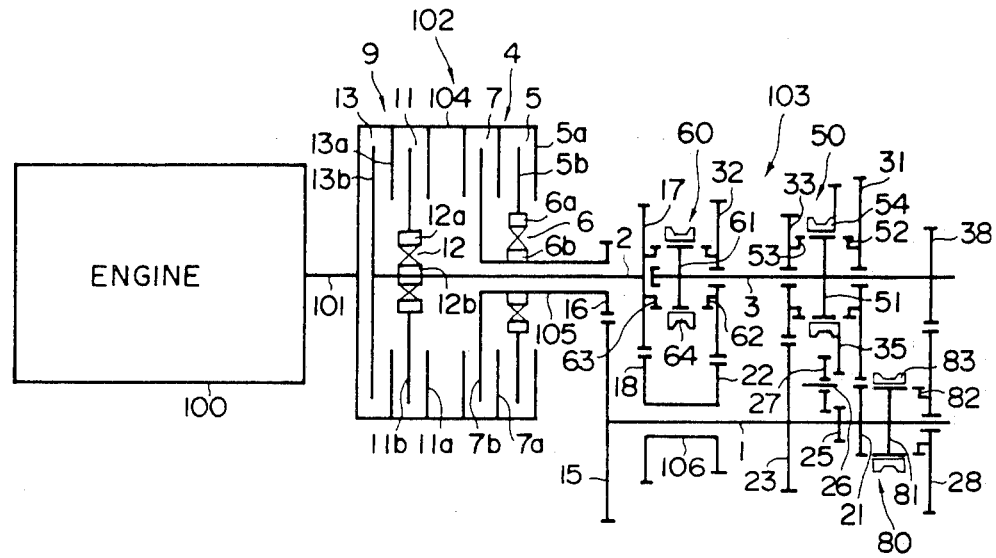
FIG. 10 is a schematic skeleton structural view, similar to FIGS. 1 through 9, showing a tenth preferred embodiment of the transmission mechanism which is similar to the eighth preferred embodiment, but which provides arrangements for a fifth speed stage as well.

FIG. 10 is a schematic skeleton structural view of a transmission mechanism which is a tenth preferred embodiment of the transmission mechanism according to the present invention. In this figure, parts of the tenth preferred embodiment shown, which correspond to parts of the first through ninth preferred embodiments shown in FIGS. 1 through 9, and which have the same functions, are designated by the same reference numerals and symbols as in those figures.

In this tenth preferred embodiment, the construction of the multiple clutching mechanism 102 including the first and second clutching assemblies 4 and 9, and of the first driving gear wheel shaft 1, the second driving shaft 2, the driven gear wheel shaft 3, and the various gear wheels mounted thereon and cooperating therewith and the synchronizers associated therewith, including the arrangements relating to the reverse speed stage, is identical to the corresponding construction in the eighth preferred embodiment shown in FIG. 8; except that, in this tenth preferred embodiment, there are further additionally included a fifth speed driving gear wheel 28, provided as rotatably engaged on the first driving gear wheel shaft 1, being rotatably engageable thereto by a fifth speed synchronizer 80, which comprises a hub portion 81, a set of fifth speed splines 82 formed on said fifth speed driving gear wheel 28, and a sleeve 83 which can either be slid in the rightwards direction in the figure to engage said fifth speed driving gear wheel 28 to said first driving gear wheel shaft 1, or can be slid in the leftwards direction to disengage said members from one another; and a fifth speed driven gear wheel 38 is provided as fixedly mounted on the driven gear wheel shaft 3, in constant mesh with the fifth speed driving gear wheel 28. Thereby a fifth speed stage may be attained, by such selective engagement of the fifth speed synchronizer 80 to provide power transmission at a gearing ratio appropriate to the fifth speed stage between the first driving gear wheel shaft 1 and the driven gear wheel shaft 3 via the driving and driven fifth speed stage gear wheels 28 and 38, in which engine braking is available, since the power transmission path therefor passes through the first clutching assembly 4 which has a mode of transferring rotational power in both rotational directions. The engagement conditions of the various clutches and synchronizers and one way clutches relating to the eighth preferred embodiment will apply, with the addition of the operation of the synchronizer 80 for fifth speed stage. Details will be easily supplemented by one of ordinary skill in the art, based upon the disclosure herein.

THE ELEVENTH PREFERRED EMBODIMENT

Figure 11:
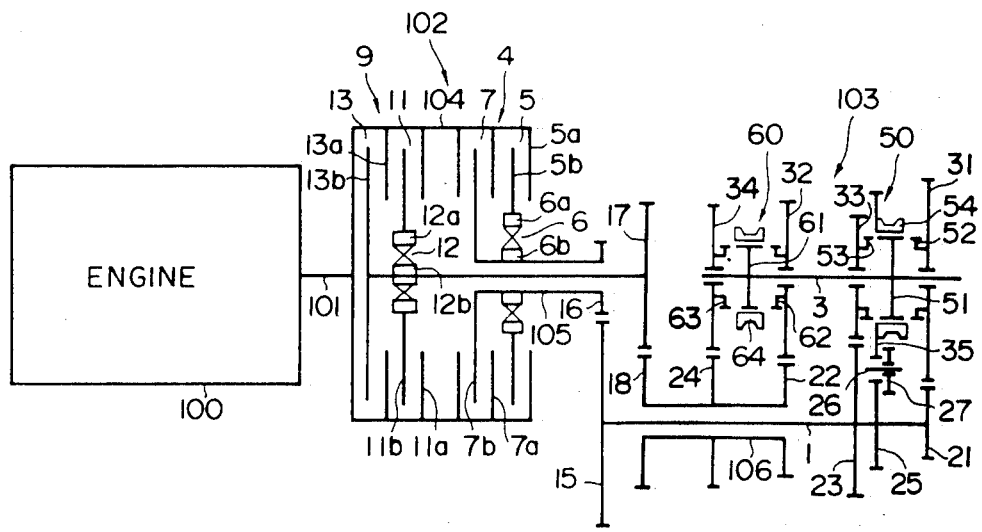
FIG. 11 is a schematic skeleton structural view, similar to FIGS. 1 through 10, showing an eleventh preferred embodiment of the transmission mechanism which is similar to the eighth preferred embodiment, but in which the fourth speed stage is an indirect speed stage.

FIG. 11 is a schematic skeleton structural view of a transmission mechanism which is an eleventh preferred embodiment of the transmission mechanism according to the present invention. In this figure, parts of the eleventh preferred embodiment shown, which correspond to parts of the first through tenth preferred embodiments shown in FIGS. 1 through 10, and which have the same functions, are designated by the same reference numerals and symbols as in those figures.

In this eleventh preferred embodiment, the construction of the multiple clutching mechanism 102 including the first and second clutching assemblies 4 and 9, and of the first driving gear wheel shaft 1, the second driving shaft 2, the driven gear wheel shaft 3, and the various gear wheels mounted thereon and cooperating therewith and the synchronizers associated therewith, including the arrangements relating to the reverse speed stage, is the same as the corresponding construction in the eighth preferred embodiment shown in FIG. 8, except that, in this eleventh preferred embodiment, the right hand end of the second driving shaft 2 and the left hand end of the power output shaft 3 are not selectively rotationally connected by the second/fourth synchronizer 60 in order to provide a directly connected fourth speed stage; instead, there are provided two driving gear wheels fixedly mounted on the hollow shaft 106: the second speed driving gear wheel 22 and a fourth speed driving gear wheel 24, which are respectively constantly meshed with the second speed driven gear wheel 32 and with a fourth speed driven gear wheel 34, both of which are rotatably mounted on the driven gear wheel shaft 3, and between which there is fitted a second/fourth synchronizer 60, which performs the function of synchronizing engagement of the second speed stage and of the fourth speed stage. This second/fourth synchronizer 60 is similar to the previously described synchronizers in the other preferred embodiments, and comprises a hub 61 which is fixedly mounted on the driven gear wheel shaft 3, a set of second speed stage splines 62 provided integrally with the second speed driven gear 32 and a set of fourth speed stage splines 63 provided integrally with the fourth speed driven gear 34, and a second/fourth synchronizer sleeve 64 which is engaged by splines over the hub 61 so that it is rotationally coupled to the driven gear wheel shaft 3 but is free to slide axially thereon, which is engagable to either the second speed stage splines 62 or the fourth speed stage splines 63, respectively according as to whether it is slid to the right or the left on said hub 61. The function of this second/fourth synchronizer 60 is to rotationally couple either the second speed driven gear 32 or the fourth speed driven gear 34 or neither of them to the driven gear wheel shaft 3, according as its sleeve 64 respectively is shifted to its rightmost position, is shifted to its leftmost position, or is shifted to an intermediate or middle position.

In this eleventh preferred embodiment, the functioning is exactly the same as the functioning of the eighth preferred embodiment, except for the fourth speed stage, which is also an indirect speed stage in this embodiment, and the rotational force transmission path of which will be clear to one skilled in the art, based upon the disclosure above. The speed ratio of this fourth speed stage, in this eleventh preferred embodiment, can therefore be chosen according to any desirable criteria. The engagement conditions of the various clutches and synchronizers and one way clutches shown in Table I will apply.

THE TWELFTH PREFERRED EMBODIMENT

Figure 12:
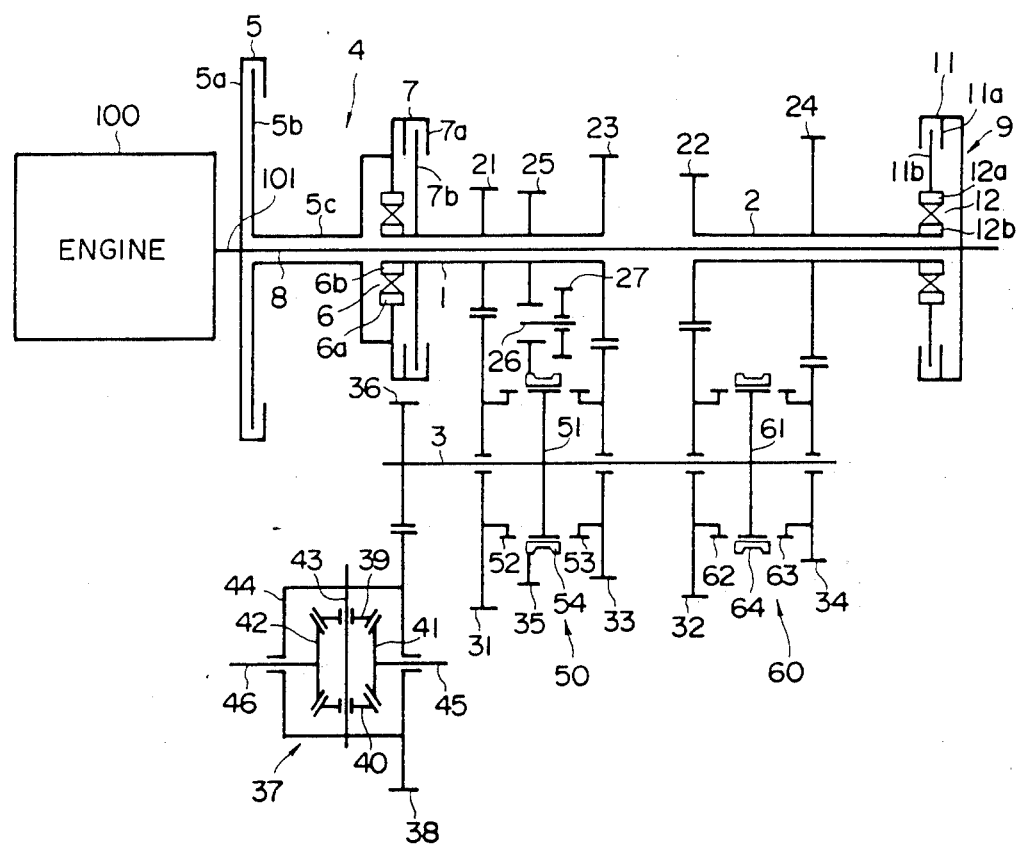
FIG. 12 is a schematic skeleton structural view, similar to FIGS. 1 through 11, showing a twelfth preferred embodiment of the transmission mechanism which is similar to the first preferred embodiment, but in which engine braking is only available in the first and third speed stages.

FIG. 12 is a schematic skeleton structural view of a transmission mechanism which is a twelfth preferred embodiment of the transmission mechanism according to the present invention. In this figure, parts of the twelfth preferred embodiment shown, which correspond to parts of the first through eleventh preferred embodiments shown in FIGS. 1 through 11, and which have the same functions, are designated by the same reference numerals and symbols as in those figures.

In this twelfth preferred embodiment, the construction of the first and second driving gear wheel shafts 1 and 2, of the intermediate shaft 8, and of the driven gear wheel shaft 3, and of the various gear wheels mounted thereon and cooperating therewith and of the synchronizers associated therewith, including the arrangements relating to the reverse speed stage, is identical to the corresponding construction in the first preferred embodiment shown in FIG. 1, and the construction and function of the first clutching assembly 4 as a three mode type clutching assembly which can be selectively locked up to provide transmission of rotational power in both rotational directions are also exactly the same; only the construction of the second clutching assembly 9 is different.

The function of this second clutching assembly 9, in this twelfth preferred embodiment, is that, according to selective control thereof exerted by the aforementioned control system not shown in the drawing, it can either: (a) provide freewheeling action in both rotational directions, not transmitting power in either rotational direction; or (b) provide direct transmission of rotational power in one rotational direction only, while it provides freewheeling action in the other rotational direction, said one rotational direction, again and similarly to the function of the first clutching assembly 4, being said predetermined rotational direction to drive the vehicle from the engine. On the other hand, this second clutching assembly 9 has no capability to provide direct transmission of rotational power in both rotational directions, i.e. cannot be locked up. Thus, in this twelfth preferred embodiment, this second clutching assembly 9 can operate in any one of two operational modes, in contrast to the first clutching assembly 4 which can operate in any one of three operational modes as explained above, and in contrast to all the clutching assemblies of the first through eleventh preferred embodiments; and, in the following, this function will be termed the two mode type function.

The details of the construction of this two mode type second clutching assembly 9 are as follows. A third clutch 11 is provided, comprising a power input member 11a which is rotationally connected to the intermediate shaft 8, and a power output member 11b which is rotationally connected to a power input member 12a of a second one way clutch 12, the power output member 12b of which is rotationally connected to the right hand end of the second driving gear wheel shaft 2. Thus, the third clutch 11 is connected in series with the one way clutch 12, and this series combination is connected between the intermediate shaft 8 and the second driving gear shaft 2.

The construction of the third clutch 11 is per se well known. For example, again, this third clutch 11 may be a so called wet multiplate clutch, like the first and second clutches 5 and 7 described above, or may be of some other per se well known type.

The second one way clutch 12 is per se well known, and its construction will not be further described herein. The function of this second one way clutch 12 is that, when its power input member 12a is rotating in the aforesaid predetermined rotational direction, its power output member 12b is constrained to rotate in said predetermined rotational direction at least as quickly. Conversely, said second one way clutch 12 can only transmit rotational power from its power output member 12b to its power input member 12a to decrease the rotational speed of said power input member 12a, if and only if its power output member 12b is attempting to rotate slower than its power input member 12a, to the extent needed to bring the signed rotational speeds of said power input member 12a and said power output member 12b to be equal.

This particular type of clutching assembly, consisting essentially of the series combination of a clutch and a one way clutch, with the above described two mode type function, will hereinafter be termed a series clutching assembly. It will be understood that in the second clutching assembly 9 of this twelfth preferred embodiment, as compared to the second clutching assembly 9 of the first preferred embodiment, simply the bypass clutch 13 has been omitted.

With regard to the operation of the transmission mechanism shown in FIG. 12, it should be understood that selective engagement and disengagement of the first, second, and third clutches 5, 7, and 11, which are substantially the same as the first, second, and third clutches 5, 7, and 11 in the first through the eleventh preferred embodiments—particularly those in the first embodiment—is suitably performed just in the same manner as in the previous embodiments according to operational parameters of the vehicle comprising this transmission mechanism by a control system for the automatic transmission of which the shown transmission mechanism according to the twelfth preferred embodiment of the present invention forms part. In fact it will be clear to one of ordinary skill in the transmission art, based upon the explanations above, that in a similar manner to the operation of the first through eleventh preferred embodiments described above, with this twelfth preferred embodiment, it is possible to prepare for the engagement of the next speed stage required, in other words the engagement of the next higher or the next lower speed stage. This is again possible because alternate speed stages are provided by different ones of the power transmission systems between the crankshaft 101 of the internal combustion engine 100 and the driven gear wheel shaft 3, and thus the power transmission system relating to the next speed stage can be prepared for the engagement of that next speed stage while still the current speed stage is engaged; and after this preparation the actual shifting between speed stages can be performed by altering the engagement conditions of the clutching assemblies 4 and 9. Further, becuase of the provision of the one way clutches 6 and 12, i.e. because these clutching devices 4 and 9 have the function of providing one way transmission of rotational power in a certain operational mode, it is not necessary to operate the clutching assemblies 4 and 9 together in any closely related fashion, and accordingly timing problems with regard to simultaneous operation of these clutching devices 4 and 9 do not arise. However, both in the case of an upshift and in the case of a power on downshift or a so called kick down type downshift, this change between speed stages is accomplished smartly and positively, as is desirable.

In this twelfth preferred embodiment, because of the provision of the operational mode, for the first clutching assembly 4, of transmission of rotational power in both rotational direction, i.e. because of the provision of the clutch 7 which bypasses the one way clutch 6, in the case of a power off downshift or an engine braking required type downshift, engine braking is made available in those speed stages of the transmission mechanism which are provided by the power transmission system associated with this first clutching device 4, i.e. in first and third speed stages. However, because no locking up capability is provided for the second clutching mechanism 9, engine braking is not available in the second and fourth speeds; however, this may not present any particular disadvantage, depending upon circumstances. Further, because in this twelfth preferred embodiment only one of the clutching assemblies is provided with such a bypass clutch, i.e. with such a two way power transmission operational mode, this reduces the size, weight, and cost of the transmission mechanism, as compared with what they would be if all of the clutching assemblies were provided with such a function.

The Table I given earlier with respect to the functioning of the first preferred embodiment may be applied to the operation of this twelfth preferred embodiment, also, with suitable alterations made to allow for the fact that the second clutching assembly 9, in this twelfth preferred embodiment, has no function of being locked up. The necessary adjustments which require to be made to the engagement and disengagement conditions shown in Table I in order to obtain the four speed stages, and engine braking in the first and third speed stages, will be apparent to one of ordinary skill in the art, based upon the explanations herein.

THE THIRTEENTH PREFERRED EMBODIMENT

Figure 13:
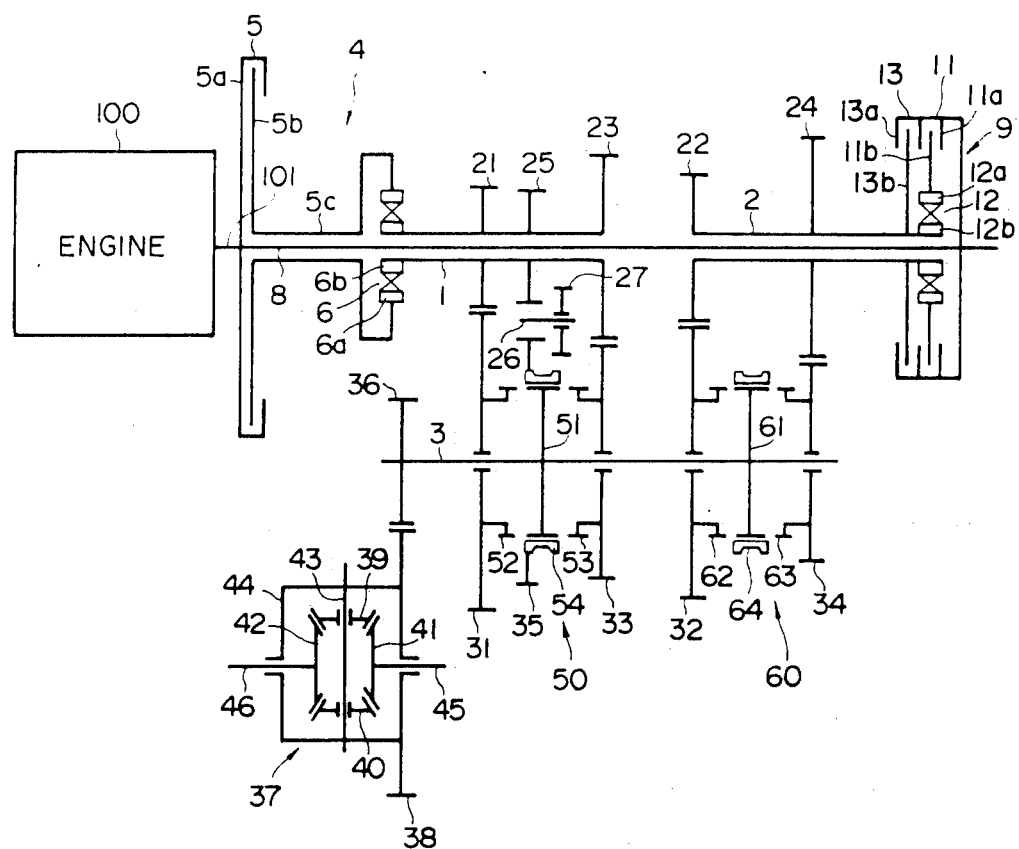
FIG. 13 is a schematic skeleton structural view, similar to FIGS. 1 through 12, showing a thirteenth preferred embodiment of the transmission mechanism which is similar to the first preferred embodiment, but in which engine braking is only available in the second and fourth speed stages.

FIG. 13 is a schematic skeleton structural view of a transmission mechanism which is a thirteenth preferred embodiment of the transmission mechanism according to the present invention. In this figure, parts of the thirteenth preferred embodiment shown, which correspond to parts of the first through twelfth preferred embodiments shown in FIGS. 1 through 12, and which have the same functions, are designated by the same reference numerals and symbols as in those figures.

In this thirteenth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is identical to the corresponding construction in the twelfth preferred embodiment shown in FIG. 12; only the constructions of the first and second clutching assemblies 4 and 9 are different. Further, the method of operation of these altered clutching assemblies 4 and 9 is also somewhat different, as is the overall method of operation of the transmission mechanism.

The first clutching assembly 4 is, similarly to the second clutching assembly 9 in the twelfth preferred embodiment, constructed as a two mode type clutching assembly, which can either free wheel in both rotational directions or can transmit rotational power in one rotational direction only while freewheeling in the other rotational direction, but which cannot be locked up so as to transmit power in both rotational directions. The details of the construction of this two mode type first clutching assembly 4 are that: a first clutch 5 is provided, comprising a power input member 5a which is a housing directly connected to the flywheel of the internal combustion engine 100, and a power output member 5b which is rotationally connected to the left hand end of an intermediate hollow shaft 5c (this shaft 5c may again simply be the hub portion of the power output member 5b) which is coaxially rotatably mounted on the intermediate shaft 8, to the left of the first driving gear wheel shaft 1. The right hand end of the intermediate hollow shaft 5c is rotationally connected to a power input member 6a of a first one way clutch 6, the power output member 6b of which is rotationally connected to the left hand end in the figure of the first driving gear wheel shaft 1. Thus, the first clutch 5 is connected in series with the first one way clutch 6, and this series combination is connected between the engine crankshaft 101 and the first driving gear wheel shaft 1. The constructions of the first clutch 5 and of the first one way clutch 6 are per se well known, as in the twelfth preferred embodiment, and will not be further described herein. Similarly to the twelfth preferred embodiment, the function of this first one way clutch 6 is that, when its power input member 6a is rotating in the aforesaid predetermined rotational direction, its power input member 6b is constrained to rotate in said predetermined rotational direction at least as quickly. Accordingly, in this thirteenth preferred embodiment, the first clutching assembly 4 is a series clutching assembly, like the second clutching assembly 9 of the twelfth preferred embodiment, and has the same two mode type function, in which, when the first clutch 5 is disengaged, as for example by non supply of hydraulic fluid pressure to a pressure chamber thereof, then it provides freewheeling action in both rotational directions, not transmitting power in either rotational direction; and in which, when the first clutch 5 is engaged, as for example by supply of hydraulic fluid pressure to a pressure chamber thereof, then it provides direct transmission of rotational power in one rotational direction only, while it provides freewheeling action in the other rotational direction, said one rotational direction being said predetermined rotational direction to drive the vehicle from the engine.

Between the intermediate shaft 8 and the second driving gear wheel shaft 2 there is provided the second clutching assembly 9, which, in this thirteenth preferred embodiment of the present invention, is a three mode type clutching assembly of the previously described parallel—series type, which can operate in any one of three operational modes, in contrast to the second clutching assembly 9 of the twelfth preferred embodiment which could only operate in any one of two operational modes as explained above. The details of the construction of this two mode type second clutching assembly 9 are as in, for example, the first preferred embodiment, and will not be particularly discussed herein.

Now, the functioning of this thirteenth preferred embodiment will be outlined. In fact, based upon the discussions and explanations above, it will be clear to one of ordinary skill in the transmission art that the functional difference between the functioning of this thirteenth preferred embodiment and the functioning of the twelfth preferred embodiment shown in FIG. 12 is only that, whereas engine braking was available in the first and third speed stages only in the case of the twelfth preferred embodiment, by the selective operation of the first clutching assembly 4 to be locked up in both rotational directions, and was not available in the second and fourth speed stages because the second clutching assembly 9 could not be locked up, by contrast in this thirteenth preferred embodiment engine braking is available in the second and fourth speed stages only, by the selective operation of the second clutching assembly 9 to be locked up in both rotational directions, and is not available in the first and third speed stages because the first clutching assembly 4 cannot be locked up. In this connection, in order to shift the transmission mechanism shown in FIG. 13 to its various speed stages, the engagement conditions of the various clutches and synchronizers and one way clutches shown in Table I, amended as explained above so as to apply to the twelfth preferred embodiment, will apply, except that some modification should be made for (a) the fact that engine braking operation is available as explained above in the second and fourth speed stages, rather than the first and third speed stages; and (b) the fact that the second clutching mechanism 9 is constructed, as explained above, as a parallel—series type of three mode type clutching mechanism, rather than as a series—parallel type of three mode type clutching mechanism as was the case for the first clutching mechanism 4 in the twelfth preferred embodiment. The necessary adjustments which require to be made to the engagement and disengagement conditions shown in Table I in order to obtain the four speed stages, and engine braking in the second and fourth speed stages, will be apparent to one of ordinary skill in the art, based upon the explanations herein.

THE FOURTEENTH PREFERRED EMBODIMENT

Figure 14:
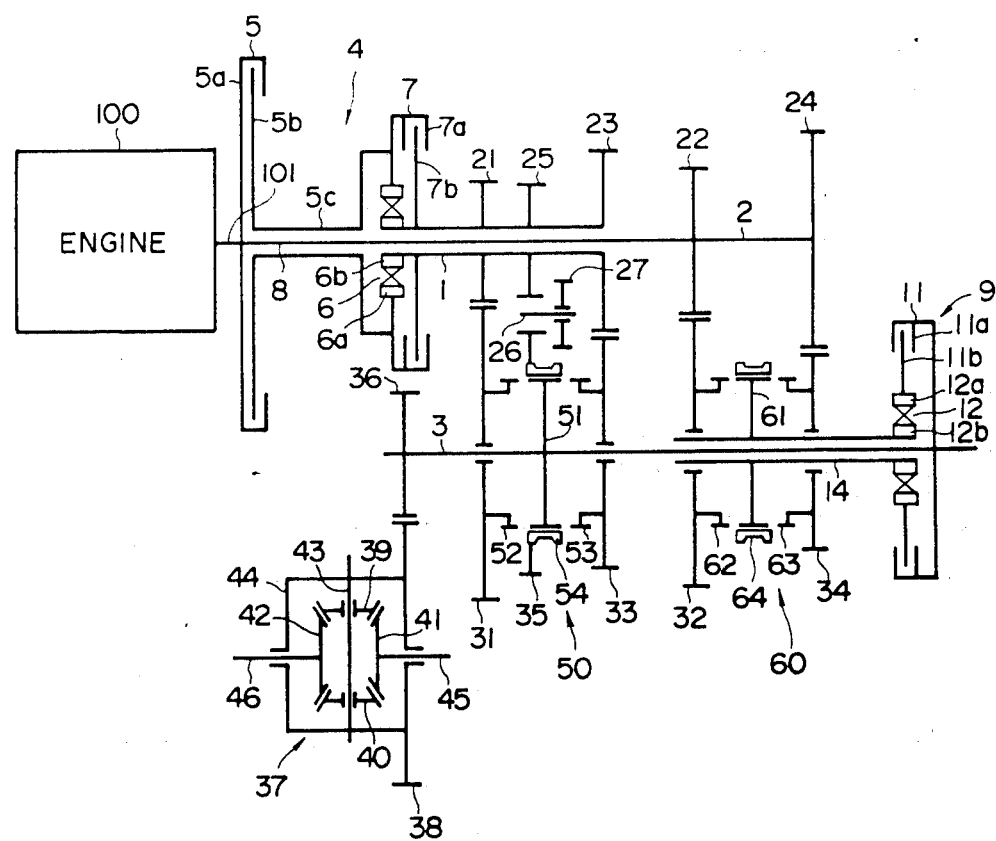
FIG. 14 is a schematic skeleton structural view, similar to FIGS. 1 through 13, showing a fourteenth preferred embodiment of the transmission mechanism which provides essentially the same function as the twelfth preferred embodiment via a different construction.

FIG. 14 is a schematic skeleton structural view of a transmission mechanism which is fourteenth preferred embodiment of the transmission mechanism according to the present invention. In this figure, parts of the fourteenth preferred embodiment shown, which correspond to parts of the first through thirteenth preferred embodiments shown in FIGS. 1 through 13, and which have the same functions, are designated by the same reference numerals and symbols as in those figures.

In this fourteenth preferred embodiment, the actual construction of the first and second clutching assemblies 4 and 9 is exactly the same, as in the case of the twelfth preferred embodiment shown in FIG. 12. Thus in this fourteenth preferred embodiment, as in the twelfth preferred embodiment, the first clutching assembly 4 is a series—parallel type three mode type clutching assembly, while the second clutching assembly 9 is a series type two mode type clutching assembly. Further, the method of operation of the first and second clutching assemblies 4 and 9 in order to provide the various speed stages of the transmission, is also the same, as is the overall method of operation of the transmission mechanism. Accordingly, in this fourteenth preferred embodiment, engine braking is available in first and third speed stages, by the selective operation of the first clutching assembly 4 to be locked up in both rotational directions, and is not available in second and fourth speed stages, because the second clutching assembly 9 cannot be so locked up. Further, although in this fourteenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the second preferred embodiment shown in FIG. 2 from the first preferred embodiment shown in FIG. 1. Therefore, it will be clear to one of ordinary skill in the transmission art that this fourteenth preferred embodiment operates in the same manner as the twelfth preferred embodiment, just as the second preferred embodiment operates in the same manner as the first preferred embodiment. Therefore, no further detailed description of the fourteenth embodiment will be required.

THE FIFTEENTH PREFERRED EMBODIMENT

Figure 15:
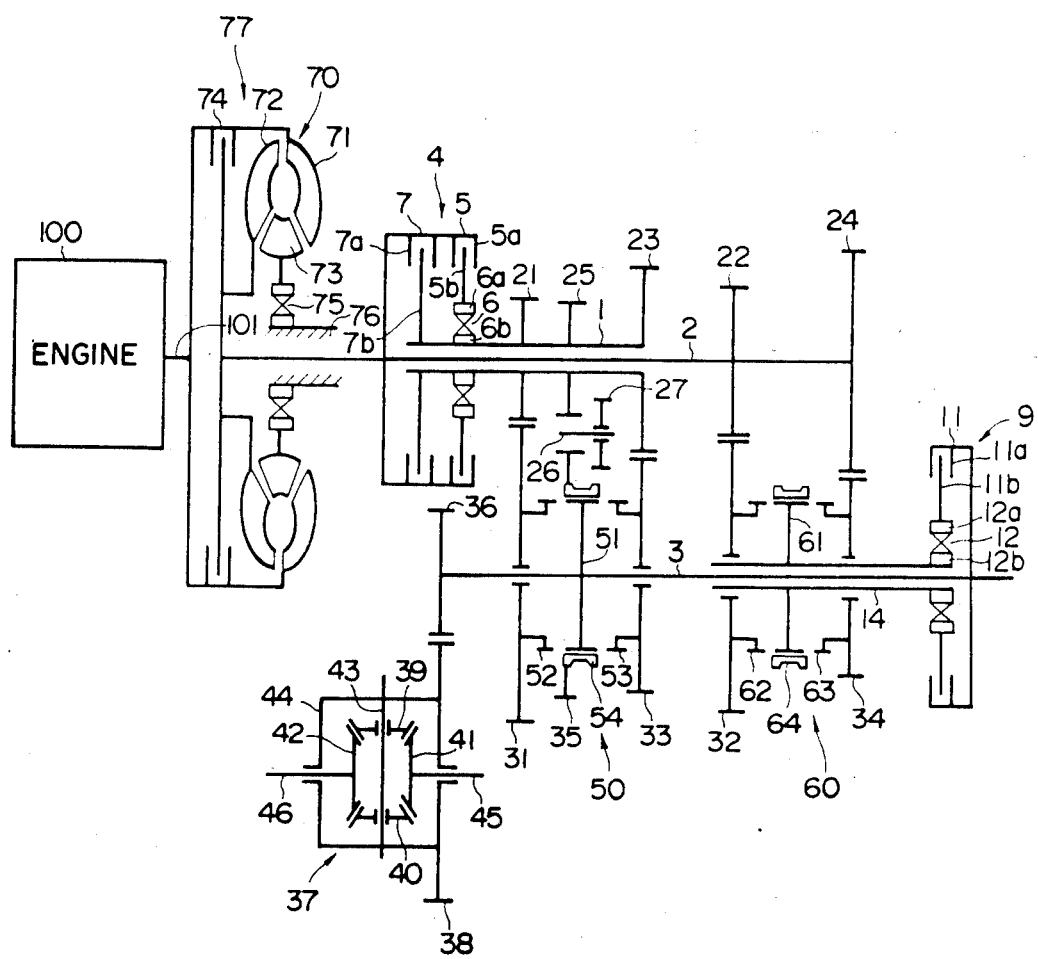
FIG. 15 is a schematic skeleton structural view, similar to FIGS. 1 through 14, showing a fifteenth preferred embodiment of the transmission mechanism which is similar to the fourteenth preferred embodiment, but additionally includes a torque converter for providing smooth starting off from rest.

FIG. 15 is a schematic skeleton structural view of a transmission mechanism which is a fifteenth preferred embodiment of the transmission mechanism according to the present invention. In this figure, parts of the fifteenth preferred embodiment shown, which correspond to parts of the first through fourteenth preferred embodiments shown in FIGS. 1 through 14, and which have the same functions, are designated by the same reference numerals and symbols as in those figures.

In this fifteenth preferred embodiment, the construction of the first and second driving gear wheel shafts 1 and 2, of the first and second driven gear wheel shafts 3 and 14, and of the various gear wheels mounted thereon and cooperating therewith and of the synchronizers associated therewith, including the arrangements relating to the reverse speed stage, is identical to the corresponding construction in the fourteenth preferred embodiment shown in FIG. 14, and only the construction of the first clutching assembly 4 is different; this first clutching assembly is a parallel—series type clutching assembly, as used in (for example) the thirteenth preferred embodiment. Further, in this fifteenth preferred embodiment there is included a fluid torque converter 70, which is connected between the crankshaft 101 of the internal combustion engine 100 and the second driving gear wheel shaft 2.

It will be understood by one of ordinary skill in the transmission art, based upon the foregoing explanations, that, although in this fifteenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the third preferred embodiment shown in FIG. 3 from the first preferred embodiment shown in FIG. 1. Therefore, it will be clear to one of ordinary skill in the transmission art that the difference between the manner in which this fifteenth preferred embodiment operates and the manner in which the twelfth preferred embodiment operates is just the same, as the difference between the manner in which the third preferred embodiment operates and the manner in which the first preferred embodiment operates. Therefore, no further detailed description of the fifteenth embodiment will be required.

THE SIXTEENTH PREFERRED EMBODIMENT

Figure 16:
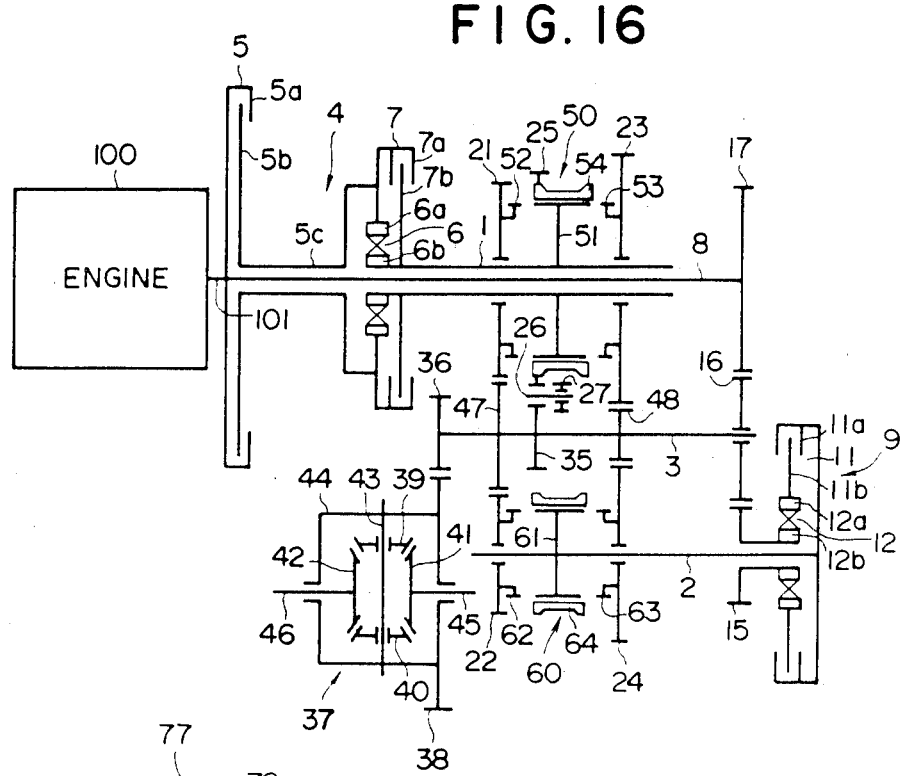
FIG. 16 is a schematic skeleton structural view, similar to FIGS. 1 through 15, showing a sixteenth preferred embodiment of the transmission mechanism which provides essentially the same function as the fifteenth preferred embodiment via a different construction.

FIG. 16 is a schematic skeleton structural view of a transmission mechanism which is a sixteenth preferred embodiment of the transmission mechanism according to the present invention. In this figure, parts of the sixteenth preferred embodiment shown, which correspond to parts of the first through fifteenth preferred embodiments shown in FIGS. 1 through 15, and which have the same functions, are designated by the same reference numerals and symbols as in those figures.

In this sixteenth preferred embodiment, the actual construction of the first and second clutching assemblies 4 and 9 is exactly the same, as in the case of the twelfth preferred embodiment shown in FIG. 12. Thus in this sixteenth preferred embodiment, as in the twelfth preferred embodiment, the first clutching assembly 4 is a series—parallel type three mode type clutching assembly, while the second clutching assembly 9 is a series type two mode type clutching assembly. However, the arrangement of the gear wheels and the driving and driven shafts and of the clutching assemblies is different from that in the twelfth preferred embodiment shown in FIG. 12.

It will be understood by one of ordinary skill in the transmission art, based upon the foregoing explanations, that, although in this sixteenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the fourth preferred embodiment shown in FIG. 4 from the first preferred embodiment shown in FIG. 1. Therefore, it will be clear to one of ordinary skill in the transmission art that the difference between the manner in which this sixteenth preferred embodiment operates and the manner in which the twelfth preferred embodiment operates is just the same, as the difference between the manner in which the fourth preferred embodiment operates and the manner in which the first preferred embodiment operates. Therefore, no further detailed description of the sixteenth embodiment will be required.

THE SEVENTEENTH PREFERRED EMBODIMENT

Figure 17:
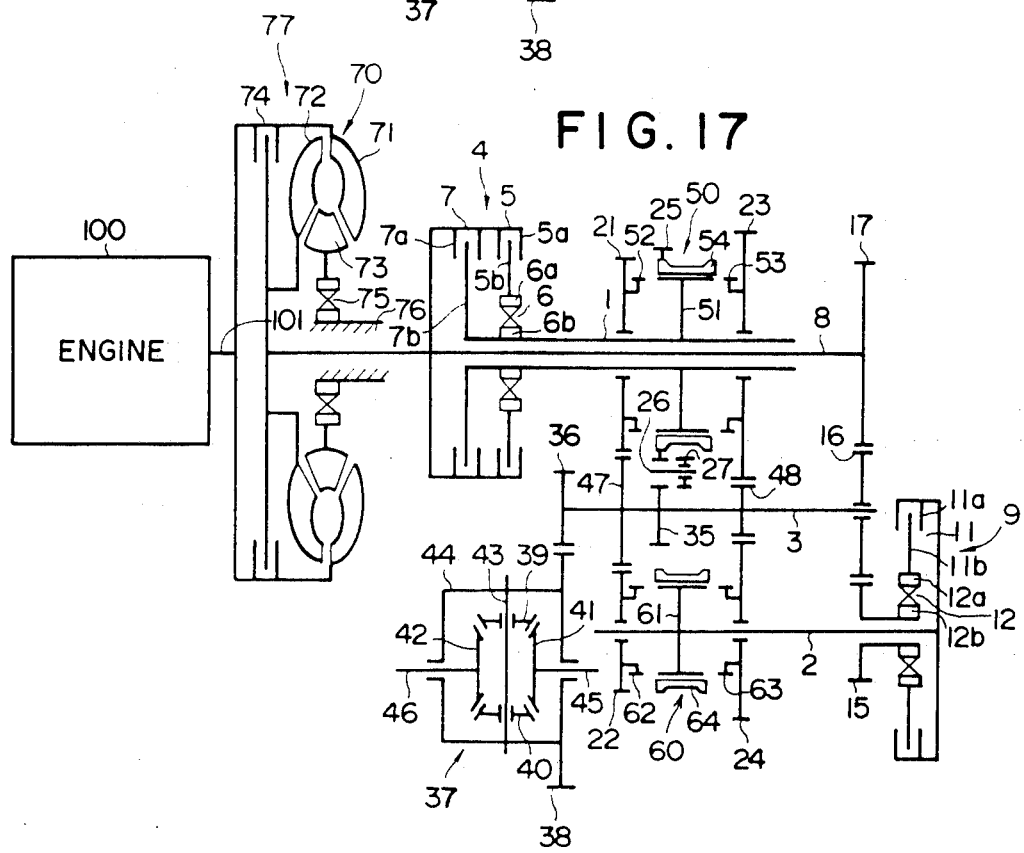
FIG. 17 is a schematic skeleton structural view, similar to FIGS. 1 through 16, showing a seventeenth preferred embodiment of the transmission mechanism which is similar to the sixteenth preferred embodiment, but additionally includes a torque converter for providing smooth starting off from rest.

FIG. 17 is a schematic skeleton structural view of a transmission mechanism which is a seventeenth preferred embodiment of the transmission mechanism according to the present invention. In this figure, parts of the seventeenth preferred embodiment shown, which correspond to parts of the first through sixteenth preferred embodiments shown in FIGS. 1 through 16, and which have the same functions, are designated by the same reference numerals and symbols as in those figures.

In this seventeenth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is identical to the corresponding construction in the sixteenth preferred embodiment shown in FIG. 16, and only the construction of the first clutching assembly 4 is different; this first clutching assembly is a parallel—series type clutching assembly, as used in (for example) the thirteenth preferred embodiment. Further, in this seventeenth preferred embodiment there is included a fluid torque converter 70, which is connected between the crankshaft 101 of the internal combustion engine 100 and the intermediate shaft 1, and which is of the same per se well known type including a direct clutch as in the fifteenth preferred embodiment shown in FIG. 15.

It will be understood by one of ordinary skill in the transmission art, based upon the foregoing explanations, that, although in this seventeenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the fifth preferred embodiment shown in FIG. 5 from the first preferred embodiment shown in FIG. 1. Therefore, it will be clear to one of ordinary skill in the transmission art that the difference between the manner in which this seventeenth preferred embodiment operates and the manner in which the twelfth preferred embodiment operates is just the same, as the difference between the manner in which the fifth preferred embodiment operates and the manner in which the first preferred embodiment operates. Therefore, no further detailed description of the seventeenth embodiment will be required.

THE EIGHTEENTH PREFERRED EMBODIMENT

Figure 18:
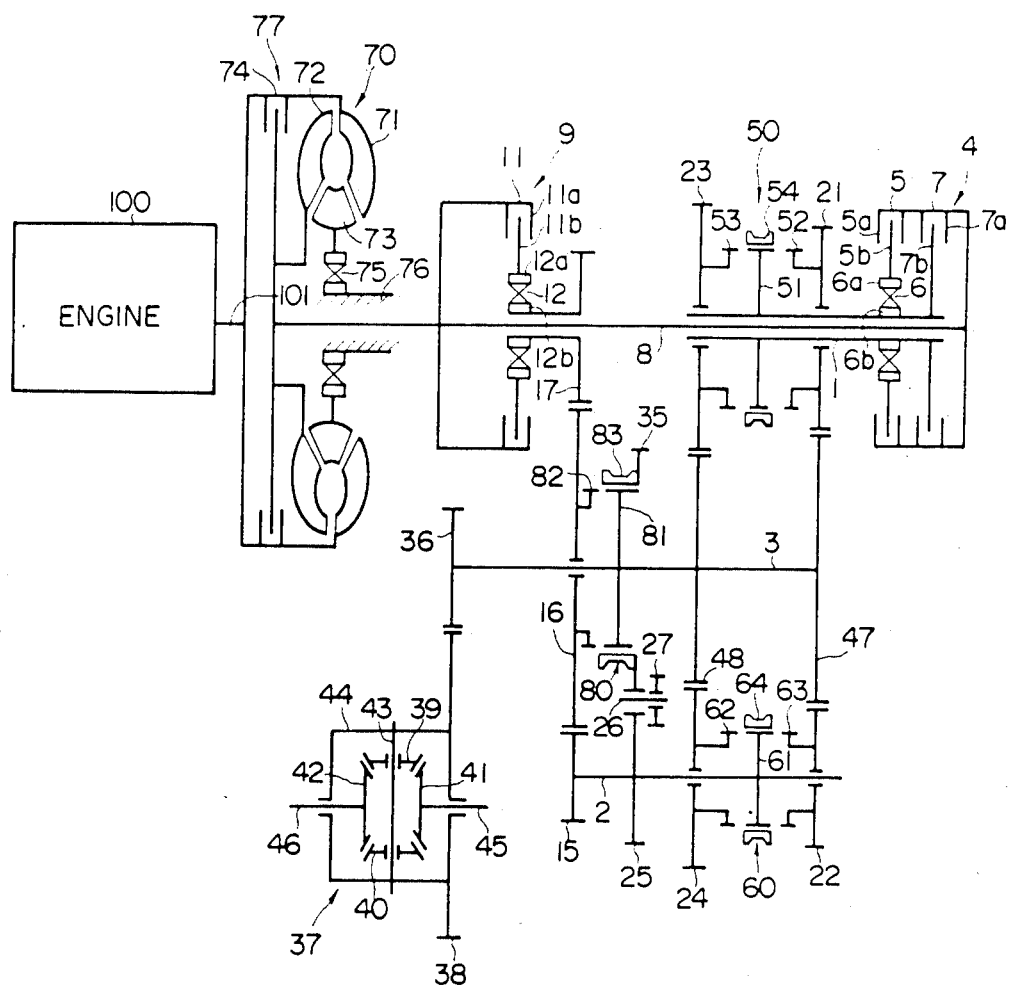
FIG. 18 is a schematic skeleton structural view, similar to FIGS. 1 through 17, showing an eighteenth preferred embodiment of the transmission mechanism which is similar to the seventeenth preferred embodiment, but which provides arrangements for a fifth speed stage as well.

FIG. 18 is a schematic skeleton structural view of a transmission mechanism which is an eighteenth preferred embodiment of the transmission mechanism according to the present invention. In this figure, parts of the eighteenth preferred embodiment shown, which correspond to parts of the first through seventeenth preferred embodiments shown in FIGS. 1 through 17, and which have the same functions, are designated by the same reference numerals and symbols as in those figures.

In this eighteenth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is basically similar to the corresponding construction in the seventeenth preferred embodiment shown in FIG. 17, except for structural points which correspond to the differences between the sixth preferred embodiment of the present invention shown in FIG. 6 and the fifth preferred embodiment shown in FIG. 5.

Thus, it will be understood by one of ordinary skill in the transmission art, based upon the foregoing explanations, that, although in this eighteenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the sixth preferred embodiment shown in FIG. 6 from the first preferred embodiment shown in FIG. 1. Therefore, it will be clear to one of ordinary skill in the transmission art that the difference between the manner in which this eighteenth preferred embodiment operates and the manner in which the twelfth preferred embodiment operates is just the same, as the difference between the manner in which the sixth preferred embodiment operates and the manner in which the first preferred embodiment operates. Therefore, no further detailed description of the eighteenth embodiment will be required.

THE NINETEENTH PREFERRED EMBODIMENT

FIG. 19 is a schematic skeleton structural view of a transmission mechanism which is an nineteenth preferred embodiment of the transmission mechanism according to the present invention. In this figure, parts of the nineteenth preferred embodiment shown, which correspond to parts of the first through eighteenth preferred embodiments shown in FIGS. 1 through 18, and which have the same functions, are designated by the same reference numerals and symbols as in those figures.

In this nineteenth preferred embodiment, the construction of the first and second driving gear wheel shafts 1 and 2, of the driven gear wheel shaft 3, and of the various gear wheels mounted thereon and cooperating therewith and of the synchronizers associated therewith, including the arrangements relating to the reverse speed stage, is basically similar to the corresponding construction in the eighteenth preferred embodiment shown in FIG. 18, except for structural points which correspond to the differences between the seventh preferred embodiment of the present invention shown in FIG. 7 and the sixth preferred embodiment shown in FIG. 6.

Thus, it will be understood by one of ordinary skill in the transmission art, based upon the foregoing explanations, that, although in this nineteenth preferred embodiment the arrangement of the gear wheels and of the clutching assemblies is different from that in the twelfth preferred embodiment shown in FIG. 12, the difference or its modification from the twelfth preferred embodiment is just the same as the difference or modification of the seventh preferred embodiment shown in FIG. 7 from the first preferred embodiment shown in FIG. 1. Therefore, it will be clear to one of ordinary skill in the transmission art that the difference between the manner in which this nineteenth preferred embodiment operates and the manner in which the twelfth preferred embodiment operates is just the same, as the difference between the manner in which the seventh preferred embodiment operates and the manner in which the first preferred embodiment operates. Therefore, no further detailed description of the nineteenth embodiment will be required.

THE TWENTIETH PREFERRED EMBODIMENT

Figure 20:
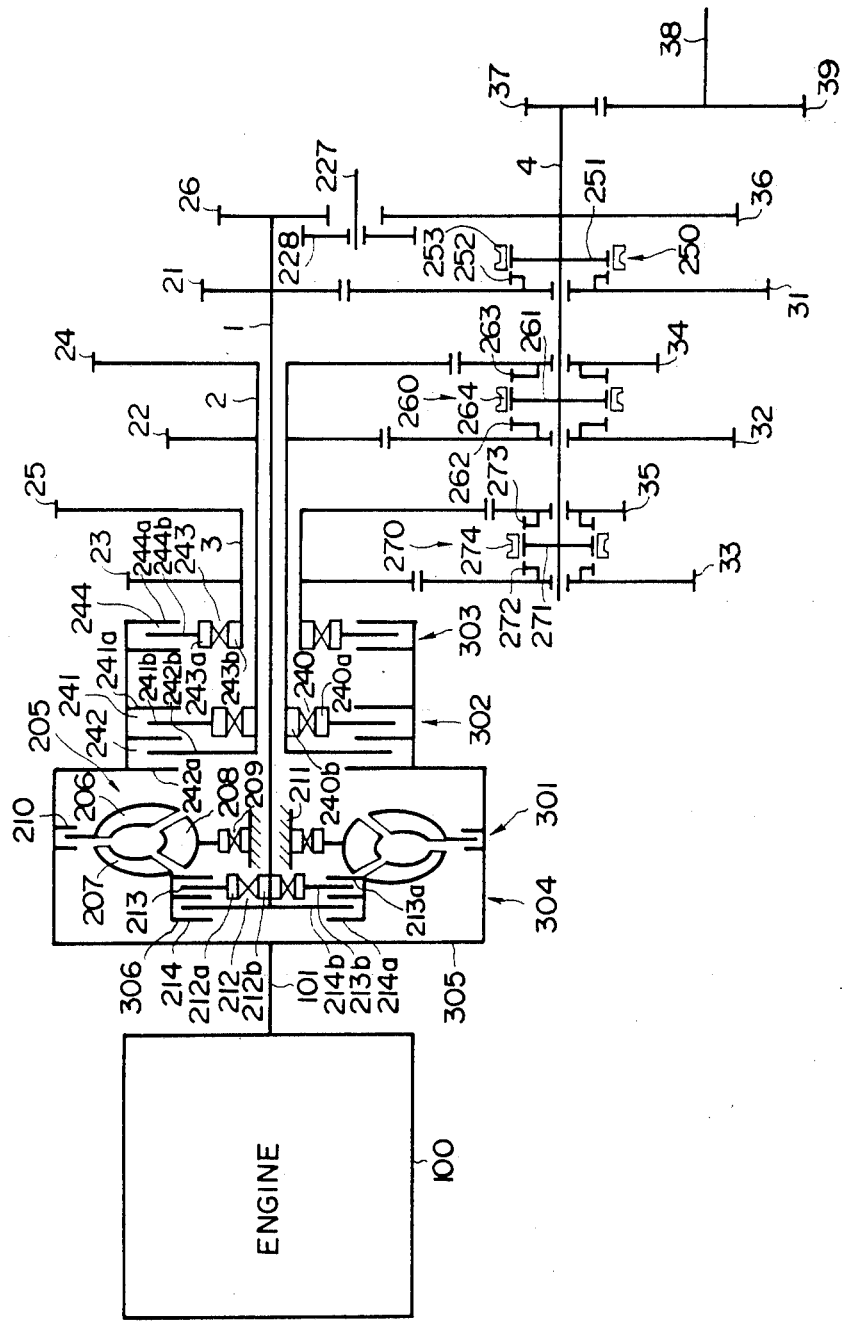
FIG. 20 is a schematic skeleton structural view, similar to FIGS. 1 through 19, showing a twentieth preferred embodiment of the transmission mechanism according to the present invention and an internal combustion engine and a differential device associated therewith, this twentieth preferred embodiment being radically different in concept from the other nineteen preferred embodiments, and incorporating three power transmission systems rather than two.

FIG. 20 is a schematic skeleton structural view of a transmission mechanism which is a twentieth and last preferred embodiment of the transmission mechanism according to the present invention. In this figure, and in the following description, except for the internal combustion engine 100 and its crankshaft 101, completely different reference numerals are used from the reference numerals used in the above descriptions of the first nineteen preferred embodiments, because the correspondence between parts of this twentieth preferred embodiment and parts of the other preferred embodiments is rather intricate, and is not exact or convenient for the use of the same reference numerals.

This twentieth preferred embodiment will be described at some length, because it differs radically from all of the first nineteen preferred embodiments described above, and has particular merits of its own, especially with regard to its construction. In this twentieth preferred embodiment, there are provided three driving gear wheel shafts, rather than two as in all of the previsouly described nineteen embodiments, which are all coaxial; and according to this there are provided three clutching assemblies, one of which are of the previously described three mode type parallel—series type, while one is of the two mode type series type, and one of which is of a type incorporating a fluid torque converter as will be explained shortly.

Now, in detail, in this twentieth preferred embodiment, all of the first, second, and third clutching assemblies, which are designated by the reference numerals 301, 302, and 303 respectively, are concentrated together into one multiple clutching mechanism 304, and the crankshaft 101 of the internal combustion engine 100, which is again rotated thereby in the predetermined direction only, is directly drivingly coupled to an outer housing 305 of this multiple clutching mechanism 304. Three coaxial power output shafts protrude from this multiple clutching mechanism 304 in the direction away from the internal combustion engine 100: a first driving gear wheel shaft 201, a tubular second driving gear wheel shaft 202 rotatably mounted on said first driving gear wheel shaft 201, out from the right hand end of which said first driving gear wheel shaft 201 protrudes to a certain extent, and a third tubular driving gear wheel shaft 203 rotatably mounted on said second driving gear wheel shaft 202, out from the right hand end of which said first and second driving gear wheel shafts 201 and 202 protrude to a certain extent. Parallel with the coaxial first, second, and third driving gear wheel shafts 1, 2, and 3 and displaced sideways therefrom there is provided a driven gear wheel shaft 204.

The structure of the multiple clutching mechanism 304 is as follows. The left hand part of said multiple clutching mechanism 304, i.e. the part closest to the internal combustion engine 100, constitutes said first clutching assembly 301; the middle part of said multiple clutching mechanism 304 constitutes said second clutching assembly 302; and the right hand part of said multiple clutching mechanism 304, i.e. the part farthest from the internal combustion engine 100, constitutes said third clutching assembly 303. As will be seen later, the second clutching assembly 302 can operate in any one of three operational modes, to either: (a) provide free wheeling action in both rotational directions, not transmitting power in either rotational direction; or (b) provide direct transmission of rotational power in one rotational direction only, while providing free wheeling action in the other rotational direction, said one rotational direction being said predetermined rotational direction; or (c) provide direct transmission of rotational power in both rotational directions. On the other hand, the third clutching assembly 303 can only operate in any one of two operational modes, to either: (a) provide free wheeling action in both rotational directions, not transmitting power in either rotational direction; or (b) provide direct transmission of rotational power in one rotational direction only, while providing free wheeling action in the other rotational direction, said one rotational direction being said predetermined rotational direction. Thus the third clutching assembly 303 has no function to be locked up. Further, the first clutching assembly 301 has a rather more complex function, being a series combination of a one way clutch, a torque converter, and a three mode type clutching assembly like the second clutching assembly 302, as will now be explained.

In the left hand part of the multiple clutching mechanism 304, i.e. in the first clutching assembly 301, a fluid torque converter 205 is provided. This torque converter 205 is again of a per se well known type, and comprises a pump impeller 206 which is rotationally coupled to the outer casing 305 of the multiple clutching assembly 301 via a first clutch 210, a stator member 208 which is mounted via a one way clutch 209 on a fixed member 211, and a turbine runner 207 which is rotationally coupled to a clutch casing 306 of the first clutching assembly 301. When the pump impeller 206 is being rotated via the first clutch 210 by the engine 100, by per se well known circulation of hydraulic fluid around a fluid circulation path defined by the pump impeller 206, the turbine runner 207, and the stator member 208, in the general circulation fashion of a smoke ring, the turbine runner 207 and the pump impeller 206 are rotationally coupled together with a certain controlled amount of slippage therebetween, said slippage amount being greater at lower rotational speeds.

Within the clutch casing 306 a second clutch 213 is provided, comprising a power input member 213a which is connected to the clutch casing 306 and a power output member 213b which is rotationally connected to the power input member 212a of a first one way clutch 212, the power output member 212b of which is rotationally connected to the left hand end of the first driving gear wheel shaft 201. The clutch casing 306 is also connected to a power input member 214a of a third clutch 214, the power output member 214b of which is also connected to the left hand end of the first driving gear wheel shaft 201. Thus, the third clutch 214 is connected in parallel with the series combination of the first one way clutch 212 and the second clutch 213, and this parallel combination is connected between the torque converter 205 and the first driving gear wheel shaft 201. Again, the construction of each of the first, second, and third clutches 210, 213, and 214, and of the one way clutch 212, is per se well known. Thus, the first clutching assembly 301 functions as a series combination of a clutch, a torque converter, and a parallel—series clutching assembly of the type described above with respect to previous preferred embodiments.

Further, in the central part of the multiple clutching mechanism 304, i.e. in the second clutching assembly 302, a fourth clutch 241 is provided, comprising a power input member 241a which is connected to the housing 305 of the multiple clutching mechanism 304 and which is thus directly rotationally connected to the crankshaft 101 of the engine 100 (without the torque converter 205 being interposed therebetween), and a power output member 241b which is rotationally connected to a power input member 240a of a second one way clutch 240, the power output member 240b of which is rotationally connected to the left hand end of the second driving gear wheel shaft 202. The housing 305 of the multiple clutching mechanism 304 is also connected to a power input member 242a of a fifth clutch 242, the power output member 242b of which is also rotationally connected to the left hand end of the second driving gear wheel shaft 202. Thus, the fifth clutch 242 is connected in parallel with the series combination of the second one way clutch 240 and the fourth clutch 241, and this parallel combination is connected between the engine crankshaft 101 and the second driving gear wheel shaft 202. Again, the construction of each of the fourth and fifth clutches 241 and 242, and of the second one way clutch 240, is per se well known. Thus, the second clutching assembly 302 functions as a simple parallel—series clutching assembly of the sort previously described, without any extra functions such as are available in the first clutching assembly 301.

Finally, in the right hand part of the multiple clutching mechanism 304, i.e. in the third clutching assembly 303, a sixth clutch 244 is provided, comprising a power input member 244a which is connected to the housing 305 of the multiple clutching mechanism 304 and which is thus directly rotationally connected to the crankshaft 101 of the engine 100 (without the torque converter 205 being interposed therebetween), and a power output member 244b which is rotationally connected to a power input member 243a of a third one way clutch 243, the power output member 243b of which is rotationally connected to the left hand end of the third driving gear wheel shaft 203. No bypass clutch is provided for this series combination, in this twentieth preferred embodiment. Thus, the series combination of the third one way clutch 243 and the sixth clutch 244 is connected between the engine crankshaft 101 and the third driving gear wheel shaft 203. Again, the construction of the third one way clutch 243 and the sixth clutch 244 is per se well known. Thus, the third clutching assembly 303 functions as a simple series clutching assembly of the two operational mode type previously described, and has no function of being able to be locked up to transmit rotational power in both rotational directions.

The handedness of each of the one way clutches 212, 240, and 243 is as in the previously described preferred embodiments, so that, when its power input member is rotating in the aforesaid predetermined rotational direction, its power output member is constrained to rotate in said predetermined rotational direction at least as quickly.

On the driven gear wheel shaft 204 there are rotatably mounted, in order from left to right, a third speed driven gear 233, a fifth speed driven gear 235, a second speed driven gear 232, a fourth speed driven gear 234, and a first speed driven gear 231; and to the right of these there are fixedly mounted in order a reverse speed driven gear 236 and a power output gear wheel 237, which is constantly meshed with a power transfer gear wheel 239 mounted on a power output shaft 238, the right hand end of which is prolonged, although this is not explicitly shown, so as to provide a rotational power take off for the transmission mechanism shown, as for instance to a differential device of a vehicle.

On the first driving gear wheel shaft 201 there are fixedly mounted, in order from left to right, a first speed driving gear 221 and a reverse speed driving gear 226. On the second driving gear wheel shaft 202 there are fixedly mounted, in order from left to right, a second speed driving gear 224 and a fourth speed driving gear 224. On the third driving gear wheel shaft 203 there are fixedly mounted, in order from left to right, a third speed driving gear 223 and a fifth speed driving gear 225. The first speed driving gear 221 is in constant mesh with the first speed driven gear 231; the second speed driving gear 222 is in constant mesh with the second speed driven gear 232; the third speed driving gear 223 is in constant mesh with the third speed driven gear 233; the fourth speed driving gear 224 is in constant mesh with the fourth speed driven gear 234; and the fifth speed driving gear 225 is in constant mesh with the fifth speed driven gear 235. Finally, on a reverse idler gear shaft 227 which is supported as parallel to the driving gear wheel shafts 201 through 203 and the driven gear wheel shaft 204 there is rotatably and slidably mounted a reverse idler gear 228. Arrangements of a per se well known sort, not shown, are provided for shifting this reverse idler gear 228 to and fro in the left and right directions on the reverse idler gear shaft 227; and, when the reverse idler gear 228 is in its most leftwards position on the reverse idler gear shaft 227, said reverse idler gear 228 does not mesh with any other gear wheels and is therefore free to rotate; but, when the reverse idler gear 228 is in its most rightwards position on the reverse idler gear shaft 227, said reverse idler gear 228 meshes with the reverse speed driving gear 226 and with the reverse speed driven gear 236, so as to provide a reverse speed stage, as will be explained later.

Between the first speed driven gear 231 and the fixed reverse speed driven gear 236 on the driven gear wheel shaft 204 there is fitted a first speed synchronizer 250, which performs the function of synchronizing engagement of the first speed stage. This first speed synchronizer 250 is of a per se well known sort, and comprises a hub 251 which is fixedly mounted on the driven gear wheel shaft 204, a set of first speed stage splines 252 provided integrally with the first speed driven gear 231, and a synchronizer sleeve 253 which is engaged by splines over the hub 251 so that it is rotationally coupled to the driven gear wheel shaft 204 but is free to slide axially thereon, which is either engagable to or disengagable from the first speed stage splines 252, respectively according as to whether it is slid to the left or the right on said hub 251 as seen in FIG. 20. The function of this first speed synchronizer 250 is to selectively rotationally couple the first speed driven gear 231 to the driven gear wheel shaft 204, or not, according as to whether its sleeve 253 respectively is shifted leftwards or rightwards.

On the driven gear wheel shaft 204, between the second speed driven gear 232 and the fourth speed driven gear wheel 234, there is fitted a second/fourth synchronizer 260, which performs the function of synchronizing engagement of the second speed stage and of the fourth speed stage. This second/fourth synchronizer 260 is also of a per se well known sort, and comprises a hub 261 which is fixedly mounted on the driven gear wheel shaft 204, a set of second speed stage splines 262 provided integrally with the second speed driven gear 232 and a set of fourth speed stage splines 263 provided integrally with the fourth speed driven gear 234, and a second/fourth synchronizer sleeve 264 which is engaged by splines over the hub 261 so that it is rotationally coupled to the driven gear wheel shaft 204 but is free to slide axially thereon, which is engagable to either the second speed stage splines 262 or the fourth speed stage splines 263, respectively according as to whether it is slid to the left or the right on said hub 261. The function of this second/fourth synchronizer 260 is to rotationally couple either the second speed driven gear 232 or the fourth speed driven gear 234 or neither of them to the driven gear wheel shaft 204, according as its sleeve 264 respectively is shifted leftwards or rightwards or to an intermediate position.

On the driven gear wheel shaft 204, between the third speed driven gear 233 and the fifth speed driven gear wheel 235, there is fitted a third/fifth synchronizer 270, which performs the function of synchronizing engagement of the third speed stage and of the fifth speed stage. This third/fifth synchronizer 270 is also of a per se well known sort, and comprises a hub 271 which is fixedly mounted on the driven gear wheel shaft 204, a set of third speed stage splines 272 provided integrally with the third speed driven gear 233 and a set of fifth speed stage splines 273 provided integrally with the fifth speed driven gear 235, and a third/fifth synchronizer sleeve 274 which is engaged by splines over the hub 271 so that it is rotationally coupled to the driven gear wheel shaft 204 but is free to slide axially thereon, which is engagable to either the third speed stage splines 272 or the fifth speed stage splines 273, respectively according as to whether it is slid to the left or the right on said hub 271. The function of this third/fifth synchronizer 270 is to rotationally couple either the third speed driven gear 233 or the fifth speed driven gear 235 or neither of them to the driven gear wheel shaft 204, according as its sleeve 274 respectively is shifted leftwards or rightwards or to an intermediate position.

Now the operation of the transmission mechanism shown in FIG. 20 will be explained. In this connection, it should be understood that selective engagement and disengagement of the first, second, third, fourth, fifth, and sixth clutches 210, 213, 214, 241, 242, and 244, which may be performed according to selective supply or non supply of actuating hydraulic fluid pressure to pressure chambers thereof or in some other manner, according to circumstances, is suitably performed according to operational parameters of the vehicle comprising this transmission mechanism by a control system for the automatic transmission; and this control system will not be described herein with regard to its construction, because said control system does not directly form part of the present invention, and the functional explanation of its operation which will be given herein is sufficient for understanding of the principles of operation of the transmission mechanism according to the present invention. The movements leftwards and rightwards in FIG. 20 of the first speed synchronizer sleeve 253 of the first speed synchronizer 250, of the second/fourth synchronizer sleeve 264 of the second/fourth synchronizer 260, of the third/fifth synchronizer sleeve 274 of the third/fifth synchronizer 270, and of the reverse idler gear 228 on the reverse idler gear shaft 227, are also suitably selectively performed, using appropriate forks or the like of a per se well known sort, by this control system.

The engagement conditions of each of the first, second, third, fourth, fifth, and sixth clutches 210, 213, 214, 241, 242, and 244, the positions of the first speed synchronizer sleeve 253 of the first/third synchronizer 250 and of the second/fourth synchronizer sleeve 264 of the second/fourth synchronizer 260 and of the third/fifth synchronizer sleeve 274 of the third/fifth synchronizer 270 as respectively engaged or disengaged to the first through fifth speed splines 252, 262, 263, 272, and 273, the position of the reverse idler gear 228 on the reverse idler gear shaft 227, and the engaged or over running conditions of the first and second one way clutches 240 and 243, will now be explained, during the engagement of each of the speed stages which can be provided by the transmission mechanism according to the twentieth preferred embodiment of the present invention explained above, i.e. during the engagement of the neutral speed stage, the first forward speed stage, the second forward speed stage, the third forward speed stage, the fourth forward speed stage, the fifth forward speed stage, and the reverse speed stage; and also the sequences of shifting and of engagement and disengagement operations of these means which are employed in the various possible operations of shifting between these speed stages will be explained. This explanation will be made with reference to Table II, which is located at the end of this specification and before the claims appended thereto, and which is to be understood as incorporated into this specification at this point.

In Table II, there are shown, for each of the transmission speed stages that can be attained, the engagement conditions of the first, second, third, fourth, fifth, and sixth clutches 210, 213, 214, 241, 242, and 244, the engagement or disengagement conditions of the first speed stage splines 252 to the first speed synchronizer sleeve 253 of the first speed synchronizer 250 and the engagement or disengagement conditions of the second speed stage splines 262 and the fourth speed stage splines 263 to the second/fourth synchronizer sleeve 264 of the second/fourth synchronizer 260 and the engagement or disengagement conditions of the third speed stage splines 272 and the fifth speed stage splines 273 to the third/fifth synchronizer sleeve 274 of the third/fifth synchronizer 270, and the engaged or over running conditions of the first, second, and third one way clutches 212, 240, and 243, in this twentieth preferred embodiment. In this Table, the symbol "E" indicated that the corresponding mechanism, i.e. the corresponding clutch or spline and sleeve mechanism, is engaged, while and that this engagement is actually being used for transmission of rotational power; the symbol "D" indicates that the corresponding mechanism is disengaged; the symbol "e" indicates that the corresponding clutch or spline and sleeve mechanism is or may be engaged, but that this engagement is not actually currently utilized, since transmission of rotational power by the transmission is in any case ensured by the engagement of some other device which is provided in parallel with said clutch or spline and sleeve mechanism; the symbol "B", when used with relation to the third and fifth clutches 214 and 242 (only) indicates that the corresponding one of these clutches 214 and 242 is to be engaged when engine braking is required, as for example when the accelerator pedal is released; the symbol "A" indicates that the corresponding one way clutch is engaged, when the internal combustion engine 100 is urging the automotive vehicle along the road, i.e. in engine drive state; and the symbol "O" indicates that the corresponding one way clutch is disengaged, when the internal combustion engine 100 is urging the automotive vehicle along the road, i.e. in engine drive state.

Neutral Speed Stage

In the neutral speed stage, which is schematically illustrated in FIG. 20, the clutches 210, 213, 214, 241, 242, and 244 are all disengaged. At this time the second/fourth synchronizer sleeve 264 of the second/fourth synchronizer 260 is set to its intermediate position by the control system and the third/fifth synchronizer sleeve 274 of the third/fifth synchronizer 270 is set to its intermediate position by the control system, and further the first speed synchronizer sleeve 253 of the first speed synchronizer 250 may also be set to its intermediate position by the control system, or as a preparatory step to engaging first speed stage said first speed synchronizer sleeve 253 may be shifted to the left in FIG. 20 so as to engage with the splines 252 for first speed stage and also the first clutch 210 may be engaged. Because the clutches 213, 214, 241, 242, and 244 are none of them engaged, i.e. because the first, second, and third clutching assemblies 301, 302, and 303 are all in their completely disengaged states, none of the first through the third driving gear wheel shafts 201 through 203 is being driven by the internal combustion engine 100, but on the contrary all three of them are free; and accordingly no rotational force is supplied to the driven gear wheel shaft 204. Thus the gear transmission mechanism according to the twentieth preferred embodiment of the present invention functions in its neutral speed stage.

Shifting from Neutral to the First Speed Stage

In order to shift from the neutral speed stage into the first speed stage and to start the vehicle off from rest, first, as a preparatory action as mentioned above, the synchronizer sleeve 253 of the first speed synchronizer 250 is moved to its leftwardly displaced position by the above mentioned transmission control system, so as rotationally to couple the first speed driven gear wheel 231 with the driven gear wheel shaft 204. Also the first clutch 210 is engaged. No drive is yet transmitted at this time, because the second clutch 213 and the third clutch 214 are still disengaged, ie. the first clutching assembly 301 is still completely disengaged. Next, the second clutch 213 is smoothly engaged, while keeping the third, fourth, fifth, and sixth clutches 214, 241, 242, and 244 still disengaged. At this time, rotational power is transmitted from the crankshaft 101 through the first clutch 210 and the fluid torque converter 205 and the second clutch 213 and the first one way clutch 212 to the first driving gear wheel shaft 201; but no rotational power is transmitted to the second driving gear wheel shaft 202, because the fourth clutch 241 remains disengaged, and because also the fifth clutch 242 remains disengaged, and no rotational power is transmitted to the third driving gear wheel shaft 203 either, because the sixth clutch 244 remains disengaged (and of course the third one way clutch 243 is not engaged). From the first driving gear wheel shaft 201, this rotational power is transmitted via the first speed driving gear 221 to the first speed driven gear 231 in constant mesh therewith which transmits said rotation via the splines 252 and the sleeve 253 of the first speed synchronizer 250 engaged thereto to the driven gear wheel shaft 204, which outputs rotational power as explained above. Thus the vehicle is driven away from rest and operates in the first speed stage; and the per se well known cushioning effect of the fluid torque converter 205 is effective for mediating this starting off action, because said fluid torque converter 205 is located in this rotational force transmission path for the first speed stage.

If, during running in the first speed stage, engine braking is currently required, for example when the accelerator pedal of the vehicle is released, then the third clutch 214 is engaged, while otherwise it is disengaged. If the third clutch 214 is engaged in engine overrunning condition, so as to bypass the action of the first one way clutch 212, rotational power can be transmitted in the reverse direction to the one described above via this third clutch 214 from the driven gear wheel shaft 204 to the crankshaft 101 in order to provide engine braking, and otherwise during engine overrunning condition the first one way clutch 212 runs free or overruns, thus not providing any engine braking and allowing the vehicle to free wheel or coast.

During steady running in the first speed stage the second/fourth synchronizer sleeve 264 of the second-/fourth synchronizer 260 is set to its intermediate position by said control system, so that neither the second speed driven gear wheel 232 nor the fourth speed driven gear wheel 234 is rotationally connected to the driven gear wheel shaft 204; and also the third/fifth synchronizer sleeve 274 of the third/fifth synchronizer 270 is set to its intermediate position by said control system, so that neither the third speed driven gear wheel 233 nor the fifth speed driven gear wheel 235 is rotationally connected to the driven gear wheel shaft 204; however, as a preparatory action to engaging the second speed stage, in fact the second/fourth synchronizer sleeve 264 may be set to its leftwardly displaced position by the above mentioned transmission control system, so as rotationally to couple the second speed driven gear wheel 232 with the driven gear wheel shaft 204. This will cause no particular operational problem, because at this time the fourth clutch 241 and the fifth clutch 242 are still disengaged, and accordingly no rotational power is being supplied to the second driving gear wheel shaft 202.

Thus the gear transmission mechanism according to the twentieth preferred embodiment of the present invention functions in its first speed stage. By the way, the shifting from the first speed stage to the neutral speed stage is accomplished simply by disengaging the second clutch 213 (and the third clutch 214 if it is engaged), and by returning the first speed synchronizer 250 and the second/fourth synchronizer 260 to their intermediate or disengaged positions, if either of them is not there yet.

Upshifting from First Speed to Second Speed Stage

In order to shift up from the first speed stage into the second speed stage, first, as a preparatory action as mentioned above, the second/fourth synchronizer sleeve 264 of the second/fourth synchronizer 260 is moved to its leftwardly displaced position by the transmission control system, so as rotationally to couple the second speed driven gear wheel 232 with the driven gear wheel shaft 204. No drive is yet transmitted at this time, because the fourth clutch 241 (and of course the fifth clutch 242 also) is still disengaged. Further, also as a preparatory action, the third clutch 214 is disengaged, if in fact it was previously engaged. Next, in order to actually perform the upshift, which of course will be during an engine drive condition and not during an engine overrunning condition, the fourth clutch 241 is smoothly engaged, while keeping the third clutch 214 still disengaged. As will be shortly explained, it is not necessary yet at this time to disengage the second clutch 213, and hence no particular complicated mutual control of the second clutch 213 and the fourth clutch 241 is required for the upshifting; this is a particular good feature of the present invention.

As the fourth clutch 241 becomes engaged, rotational power starts to be transmitted from the crankshaft 101 through the fourth clutch 241 and the second one way clutch 240 to the second driving gear wheel shaft 2. It should be specially noted that the torque converter 205 is not involved in this rotational force transmission path, which instead only utilizes the outer casing 305 of the multiple clutching mechanism 304. From the second driving gear wheel shaft 2, this rotational power is transmitted to the second speed driven gear 232 fixedly mounted thereon which transmits said rotation via the splines 262 and the second/fourth synchronizer 260 engaged thereto to the driven gear wheel shaft 204, thus outputting rotational power; and at this time automatically the first one way clutch 212 starts to run free or overrun, since as will be easily understood by one of ordinary skill in the transmission art based upon the foregoing explanation the rotational speed (in the predetermined rotational direction) of its power input member 212a now becomes less relative to the rotational speed of its power output member 212b. Accordingly no question of locking up of the transmission can occur, provided that the third clutch 214 is definitely disengaged before the fourth clutch 241 starts to be engaged to start the upshifting. Thus the vehicle comes to operate in the second speed stage. At a convenient time, during steady running in the second speed stage, the first speed synchronizer sleeve 253 of the first speed synchronizer 250 may be returned to the intermediate position, so as to stop the first one way clutch 212 from free wheeling and so as to preserve the life of said first one way clutch 212; and also the second clutch 213 is disengaged; but this returning of the sleeve 253 is not actually urgent. Further, if it is anticipated that the first speed stage will not soon again be engaged, then the first clutch 210 is disengaged, which causes the supply of rotational power to the pump impeller 206 of the torque converter 205 to be terminated, thus completely terminating power loss in said torque converter 205, which is very beneficial with regard to fuel economy and vehicle operation as a whole.

If, during running in the second speed stage, engine braking is currently required, for example when the accelerator pedal of the vehicle is released, then the fifth clutch 242 is engaged, while otherwise it is disengaged. If the fifth clutch 242 is engaged in engine overrunning condition, so as to bypass the action of the second one way clutch 240, rotational power can be transmitted in the reverse direction to the one described above via this fifth clutch 242 from the driven gear wheel shaft 204 to the crankshaft 101 in order to provide engine braking, and otherwise during engine overrunning condition the second one way clutch 240 runs free or overruns, thus not providing any engine braking and allowing the vehicle to free wheel or coast.

Further, during steady running in the second speed stage the synchronizer sleeve 253 of the first speed synchronizer 250 is set to its intermediate position by said control system, so that the first speed driven gear wheel 231 is not rotationally connected to the driven gear wheel shaft 204; however, as a preparatory action to engaging the first speed stage in fact the first speed synchronizer sleeve 253 may be set to its leftwardly displaced position by the above mentioned transmission control system, so as rotationally to couple the first speed driven gear wheel 231 with the driven gear wheel shaft 204. In this case, the first clutch 210 is also engaged, as a preparatory action. Also, during such steady running in the second speed stage, generally the synchronizer sleeve 274 of the third/fifth synchronizer 270 is set to its intermediate position by said control system, so that neither the third speed driven gear wheel 233 nor the fifth speed driven gear wheel 235 is rotationally connected to the driven gear wheel shaft 204; however, as a preparatory action to engaging the third speed stage in fact the synchronizer sleeve 274 may be set to its leftwardly displaced position by the above mentioned transmission control system, so as rotationally to couple the third speed driven gear wheel 233 with the driven gear wheel shaft 204. Neither of these actions will cause any particular operational problem, because at this time the second clutch 213 and the sixth clutch 244 are still disengaged; and in the case of a downshift to first speed stage in any case the first one way clutch 212 could operate to run free, even if the second clutch 213 were engaged.

Downshifting from Second Speed Stage to First Speed Stage

During steady running in the second speed stage the first speed synchronizer sleeve 253 of the first speed synchronizer 250 is kept at its intermediate position by said control system, so that the first speed driven gear wheel 231 is not rotationally connected to the driven gear wheel shaft 204; however, as a preparatory action to engaging the first speed stage when downshifting thereto from the second speed stage, the first speed synchronizer sleeve 253 is set to its leftwardly displaced position by the transmission control system, so as rotationally to couple the first speed driven gear wheel 231 with the driven gear wheel shaft 204. This will cause no particular operational problem, because at this time the second clutch 213 is still disengaged. Next, also as a preparatory action, with of course the third clutch 214 still disengaged, the second clutch 213 is engaged. As before, as explained above, this will cause the first one way clutch 212 to run free or overrun. Also the first clutch 210 is engaged, again as a preparatory action, if in fact it has previously been disengaged.

Next, in order to actually perform the downshift, which may either be during engine drive condition in the case of a kick down type downshift or may be in engine overruning condition in the case of an engine braking desirable type downshift, simply the fourth clutch 241 is smoothly disengaged, and the fifth clutch 242 is disengaged if it is engaged, while keeping the third clutch 214 still disengaged. Since at this time the second clutch 213 is already engaged, hence no particular complicated mutual control of the second clutch 213 and the fourth clutch 241 is required for the downshifting; this is another particular good feature of the present invention.

As the fourth clutch 241 becomes disengaged, if this is a case of a kick down type downshift, then the rotational speed of the crankshaft 101 will quickly increase to a rotational speed at which the first one way clutch 212 will stop running free, so that now rotational power starts to be transmitted from the crankshaft 101 through the first clutch 210 and the torque converter 210 and the second clutch 213 and the first one way clutch 212 to the first driving gear wheel shaft 201, and thence via the first speed driving gear 221 to the first speed driven gear 231 engaged therewith which transmits said rotation via the splines 252 and the first speed synchronizer 250 engaged thereto to the driven gear wheel shaft 204, thus outputting rotational power, now at a gearing ratio appropriate to the first speed stage.

On the other hand, as the fourth clutch 241 becomes disengaged, if this is not a case of a kick down type downshift, but is a case of a power off type downshift, then at this time automatically the first one way clutch 212 continues to run free or overrun, and the vehicle is allowed to free wheel or coast. Now, if engine braking is required after the downshift to the first speed stage, which typically will be the case in the case of a power off type downshift, then the first or bypass clutch 214 which bypasses the first one way clutch 212 is smoothly engaged, and accordingly the coasting or free running operational condition of the vehicle is quickly transformed into an engine braking condition. The ability to provide engine braking in the first speed stage is a consequence of the provision of the first or bypass clutch 214, i.e. is a consequence of the capability of the first clutching assembly 301 to be locked up in both rotational directions, and is a particular good feature of the present invention.

Thus the vehicle comes to operate in the first speed stage. At a convenient time, during steady running in the first speed stage, the synchronizer sleeve 264 of the second/fourth synchronizer 260 may be returned to the intermediate position, so as to stop the fourth clutch 241 from slipping and so as to preserve the life of said fourth clutch 241.

Upshifting from Second Speed Stage to Third Speed Stage

In order to shift up from the second speed stage into the third speed stage, first, as a preparatory action as mentioned above, the synchronizer sleeve 274 of the third/fifth synchronizer 270 is moved to its leftwardly displaced position by the transmission control system, so as rotationally to couple the third speed driven gear wheel 233 with the driven gear wheel shaft 204. No drive is yet transmitted at this time, because the sixth clutch 244 is still disengaged. Next, in order to actually perform the upshift, which of course will be during engine drive condition and not during an engine overrunning condition, the sixth clutch 244 is smoothly engaged, while keeping the fourth clutch 241 still engaged, and after of course disengaging the fifth clutch 242 if it was engaged previously. It is not necessary yet at this time to disengage the fourth clutch 241, and hence no particular complicated mutual control of the sixth clutch 244 and the fourth clutch 241 is required for the upshifting; this is another particular good feature of the present invention. As the sixth clutch 244 becomes engaged, rotational power starts to be transmitted from the crankshaft 101 through the sixth clutch 244 and the third one way clutch 243 to the third driving gear wheel shaft 203. From the third driving gear wheel shaft 203, this rotational power is transmitted via the third speed driving gear 223 to the third speed driven gear 233 engaged therewith which transmits said rotation via the splines 272 and the third/fifth synchronizer 270 engaged thereto to the driven gear wheel shaft 204, thus outputting rotational power at a gear ratio appropriate to the third speed stage; and at this time automatically the second one way clutch 240 starts to run free or overrun, since as will be easily understood by one of ordinary skill in the transmission art based upon the foregoing explanation the rotational speed (in the predetermined rotational direction) of its power input member 240a now becomes less relative to the rotational speed of its power output member 240b. Accordingly no question of locking up of the transmission can occur. Thus the vehicle comes to operate in the third speed stage. At a convenient time, during steady running in the third speed stage, the synchronizer sleeve 264 of the second/fourth synchronizer 260 may be returned to the intermediate position, so as to stop the second one way clutch 240 from free wheeling and so as to preserve the life of said second one way clutch 240; and also the fourth clutch 241 is disengaged.

During steady running in the third speed stage the synchronizer sleeve 264 of the second/fourth synchronizer 260 is set to its intermediate position by said control system, so that neither the second speed driven gear wheel 232 nor the fourth speed driven gear wheel 242 is rotationally connected to the driven gear wheel shaft 204; however, as a preparatory action to engaging the second speed stage or the fourth speed stage, respectively, in fact the second/fourth synchronizer sleeve 264 may be set to its leftwardly or its rightwardly displaced position by the above mentioned transmission control system, so as rotationally to couple, respectively, either the second speed driven gear wheel 232 or the fourth speed driven gear wheel 242 with the driven gear wheel shaft 204. Neither of these actions will cause any particular operational problem, because at this time the fourth clutch 241 (and of course the fifth clutch 242) is still disengaged; and in the case of a downshift to second speed stage in any case the second one way clutch 240 could operate to run free, even if the fourth clutch 241 were engaged.

During running in the third speed stage, engine braking is not available, because no bypass clutch is available for the third one way clutch 243; however, this may not particularly be a disadvantage in actual operation, depending upon circumstances.

Downshifting from Third Speed Stage to Second Speed Stage

During steady running in the third speed stage the synchronizer sleeve 264 of the second/fourth synchronizer 260 is kept at its intermediate position by said control system, so that neither the second speed driven gear wheel 232 nor the fourth speed driven gear wheel 242 is rotationally connected to the driven gear wheel shaft 204; however, as a preparatory action to engaging the second speed stage when downshifting thereto from the third speed stage, the second/fourth synchronizer 260 is set to its leftwardly displaced position by the transmission control system, so as rotationally to couple the second speed driven gear wheel 232 with the driven gear wheel shaft 204. This will cause no particular operational problem, because at this time the fourth clutch 241 is still disengaged, and of course so is the fifth clutch 242. Next, also as a preparatory action, the fourth clutch 241 is engaged. As before, as explained above, this will cause the second one way clutch 240 to run free or overrun.

Next, in order to actually perform the downshift, which may either be during engine drive condition in the case of a kick down type downshift or may be in engine overrunning condition in the case of a reducing road speed type downshift, simply the sixth clutch 244 is smoothly disengaged. Since at this time the fourth clutch 241 is already engaged, hence no particular complicated mutual control of the sixth clutch 244 and the fourth clutch 241 is required for the downshifting; this is another particular good feature of the present invention.

As the sixth clutch 244 becomes disengaged, if this is a case of a kick down type downshift, then the rotational speed of the internal combustion engine 100 will quickly increase to a rotational speed at which the second one way clutch 240 will stop running free, so that now rotational power starts to be transmitted from the crankshaft 101 through the fourth clutch 241 and the second one way clutch 240 to the second driving gear wheel shaft 202, and thence via the second speed driving gear 222 to the second speed driven gear 232 engaged therewith which transmits said rotation via the splines 262 and the second/fourth synchronizer 260 engaged thereto to the driven gear wheel shaft 204, thus outputting rotational power, now at a gearing ratio appropriate to the second speed stage.

On the other hand, as the sixth clutch 244 becomes disengaged, if this is not a case of a kick down type downshift, but is a case of a power off type downshift, then at this time automatically the second one way clutch 240 continues to run free or overrun, and the vehicle is allowed to free wheel or coast. As explained above, engine braking may be available, in this twentieth preferred embodiment, in the second speed stage, by subsequently engaging the fifth clutch 242.

Thus the vehicle comes to operate in the second speed stage. At a convenient time, during steady running in the second speed stage, the synchronizer sleeve 274 of the third/fifth synchronizer 270 may be returned to the intermediate position, so as to stop the sixth clutch 244 from slipping and so as to preserve the life of said sixth clutch 244.

Upshifting from Third Speed Stage to Fourth Speed Stage

In order to shift up from the third speed stage into the fourth speed stage, first, as a preparatory action as mentioned above, the second/fourth synchronizer sleeve 264 of the second/fourth synchronizer 260 is moved to its rightwardly displaced position by the transmission control system, so as rotationally to couple the fourth speed driven gear wheel 234 with the driven gear wheel shaft 204. No drive is yet transmitted at this time, because the fourth clutch 241 (and of course the fifth clutch 242) is still disengaged. Next, in order to actually perform the upshift, which of course will be during engine drive condition and not during an engine overrunning condition, the fourth clutch 241 is smoothly engaged. As will be shortly explained, it is not necessary yet at this time to disengage the sixth clutch 244, and hence no particular complicated mutual control of the sixth clutch 244 and the fourth clutch 241 is required for the upshifting; this is yet another particular good feature of the present invention. As the fourth clutch 241 becomes engaged, rotational power starts to be transmitted from the crankshaft 101 through the fourth clutch 241 and the second one way clutch 240 to the second driving gear wheel shaft 202. From the second driving gear wheel shaft 202, this rotational power is transmitted directly via fourth speed driving gear wheel 224 and the fourth speed driven gear wheel 234 engaged therewith and via the second/fourth synchronizer 260 engaged thereto to the driven gear wheel shaft 204, thus outputting rotational power at a gearing ratio now appropriate to the fourth speed stage; and at this time automatically the third one way clutch 243 starts to run free or overrun, since as will be easily understood by one of ordinary skill in the transmission art based upon the foregoing explanation the rotational speed (in the predetermined rotational direction) of its power input member 243a now becomes less relative to the rotational speed of its power output member 243b. Accordingly no question of locking up of the transmission can occur. Thus the vehicle comes to operate in the fourth speed stage. At a convenient time, during steady running in the fourth speed stage, the synchronizer sleeve 274 of the third/fifth synchronizer 270 may be returned to the intermediate position, so as to stop the third one way clutch 243 from free wheeling and so as to preserve the life of said third one way clutch 243; and also the sixth clutch 244 is disengaged.

If, during running in the fourth speed stage, engine braking is currently required, for example when the accelerator pedal of the vehicle is released, then the fifth clutch 242 is engaged, while otherwise it is disengaged. If the fifth clutch 242 is engaged in engine overrunning condition, so as to bypass the action of the second one way clutch 240, rotational power can be transmitted in the reverse direction to the one described above via this fifth clutch 242 from the driven gear wheel shaft 204 to the crankshaft 101 in order to provide engine braking, and otherwise during engine overrunning condition the second one way clutch 240 runs free or overruns, thus not providing any engine braking and allowing the vehicle to free wheel or coast.

Further, during steady running in the fourth speed stage the synchronizer sleeve 274 of the third/fifth synchronizer 270 is set to its intermediate position by said control system, so that neither the third speed driven gear wheel 233 nor the fifth speed driven gear wheel 235 is rotationally connected to the driven gear wheel shaft 204; however, as a preparatory action to engaging the third speed stage, in fact that third/fifth synchronizer sleeve 274 may be set to its leftwardly displaced position by the above mentioned transmission control system, so as rotationally to couple the third speed driven gear wheel 233 with the driven gear wheel shaft 204. Alternatively, as a preparatory action to engaging the fifth speed stage, in fact that third/fifth synchronizer sleeve 274 may be set to its rightwardly displaced position by the above mentioned transmission control system, so as rotationally to couple the fifth speed driven gear wheel 235 with the driven gear wheel shaft 204. Neither of these actions will cause any particular operational problem, because at this time the sixth clutch 244 is still disengaged; and in any case in the case of a prospective downshift to the third speed stage the third one way clutch 243 could operate to run free, even if the sixth clutch 244 were engaged.

Downshifting from Fourth Speed Stage to Third Speed Stage

During steady running in the fourth speed stage the first/third synchronizer sleeve 274 of the third/fifth synchronizer 270 is kept at its intermediate position by said control system, so that the third speed driven gear wheel 233 is not rotationally connected to the driven gear wheel shaft 204; however, as mentioned above as a preparatory action to engaging the third speed stage when downshifting thereto from the fourth speed stage, the third/fifth synchronizer sleeve 274 of the third/fifth synchronizer 270 is set to its leftwardly displaced position by the transmission control system, so as rotationally to couple the third speed driven gear wheel 233 with the driven gear wheel shaft 204. This will cause no particular operational problem, because at this time the sixth clutch 244 is still disengaged. Next, also as a preparatory action, the sixth clutch 244 is engaged. As before, as explained above, this will cause the third one way clutch 243 to run free or overrun.

Next, in order to actually perform the downshift, which may either be during engine drive condition in the case of a kick down type downshift or may be in engine overrunning condition in the case of an engine braking desirable type downshift, simply the fourth clutch 241 is smoothly disengaged, while of course keeping the fifth clutch 242 disengaged. Since at this time the sixth clutch 244 is already engaged, hence no particular complicated mutual control of the sixth clutch 244 and the fourth clutch 241 is required for the downshifting; this is yet another particular good feature of the present invention.

As the fourth clutch 241 becomes disengaged, if this is a case of a kick down type downshift, then the rotational speed of the internal combustion engine 100 will quickly increase to a rotational speed at which the third one way clutch 243 will stop running free, so that now rotational power starts to be transmitted from the crankshaft 101 through the sixth clutch 244 and the third one way clutch 243 to the third driving gear wheel shaft 203, and thence via the third speed driving gear 223 to the third speed driven gear 233 engaged therewith which transmits said rotation via the splines 272 and the third/fifth synchronizer 270 engaged thereto to the driven gear wheel shaft 204, now outputting rotational power at a gearing ratio appropriate to the third speed stage.

On the other hand, as the fourth clutch 241 becomes disengaged, if this is not a case of a kick down type downshift, but is a case of a power off type downshift, then at this time automatically the third one way clutch 243 continues to run free or overrun, and the vehicle is allowed to free wheel or coast. Since engine braking is not available in the third speed stage, this condition will continue.

Thus the vehicle comes to operate in the third speed stage. At a convenient time, during steady running in the third speed stage, the synchronizer sleeve 264 of the second/fourth synchronizer 260 may be returned to the intermediate position, so as to stop the fourth clutch 241 from slipping and so as to preserve the life of said fourth clutch 241.

Upshifting from Fourth Speed Stage to Fifth Speed Stage

In order to shift up from the fourth speed stage into the fifth speed stage, first, as a preparatory action as mentioned above, the synchronizer sleeve 274 of the third/fifth synchronizer 270 is moved to its rightwardly displaced position by the transmission control system, so as rotationally to couple the fifth speed driven gear wheel 235 with the driven gear wheel shaft 204. No drive is yet transmitted at this time, because the sixth clutch 244 is still disengaged. Next, in order to actually perform the upshift, which of course will be during engine drive condition and not during an engine overrunning condition, the sixth clutch 244 is smoothly engaged, while keeping the fourth clutch 241 still engaged, and after of course disengaging the fifth clutch 242 if it was engaged previously. It is not necessary yet at this time to disengage the fourth clutch 241, and hence no particular complicated mutual control of the sixth clutch 244 and the fourth clutch 241 is required for the upshifting; this is another particular good feature of the present invention. As the sixth clutch 244 becomes engaged, rotational power starts to be transmitted from the crankshaft 101 through the sixth clutch 244 and the third one way clutch 243 to the third driving gear wheel shaft 203. From the third driving gear wheel shaft 203, this rotational power is transmitted via the fifth speed driving gear 225 to the fifth speed driven gear 235 engaged therewith which transmits said rotation via the splines 273 and the third/fifth synchronizer 270 engaged thereto to the driven gear wheel shaft 204, thus outputting rotational power at a gear ratio appropriate to the fifth speed stage; and at this time automatically the second one way clucth 240 starts to run free or overrun, since as will be easily understood by one of ordinary skill in the transmission art based upon the foregoing explanation the rotational speed (in the predetermined rotational direction) of its power input member 240a now becomes less relative to the rotational speed of its power output member 240b. Accordingly no question of locking up of the transmission can occur, provided that at this time the fifth clutch 242 is definitely disengaged as specified above. Thus the vehicle comes to operate in the fifth speed stage. At a convenient time, during steady running in the fifth speed stage, the synchronizer sleeve 264 of the second/fourth synchronizer 260 may be returned to the intermediate position, so as to stop the second one way clutch 240 from free wheeling and so as to preserve the life of said second one way clutch 240; and also the fourth clutch 241 is disengaged.

During steady running in the fifth speed stage the synchronizer sleeve 264 of the second/fourth synchronizer 260 is set to its intermediate position by said control system, so that neither the second speed driven gear wheel 232 nor the fourth speed driven gear wheel 234 is rotationally connected to the driven gear wheel shaft 204; however, as a preparatory action to engaging the fourth speed stage, in fact the second/fourth synchronizer sleeve 264 may be set to its rightwardly displaced position by the above mentioned transmission control system, so as rotationally to couple the fourth speed driven gear wheel 234 with the driven gear wheel shaft 204. This action will not cause any particular operational problem, because at this time the fourth clutch 241 (and of course the fifth clutch 244) is still disengaged; and in any case the second one way clutch 240 could operate to run free, even if the fourth clutch 241 were engaged.

During running in the fifth speed stage, engine braking is not available, because no bypass clutch is available for the third one way clutch 243; however, this may not particularly be a disadvantage in actual operation, depending upon circumstances.

Downshifting from Fifth Speed Stage to Fourth Speed Stage

During steady running in the fifth speed stage the synchronizer sleeve 264 of the second/fourth synchronizer 260 is kept at its intermediate position by said control system, so that the fourth speed driven gear wheel 234 is not rotationally connected to the driven gear wheel shaft 204; however, as a preparatory action to engaging the fourth speed stage when downshifting thereto from the fifth speed stage, the second/fourth synchronizer 260 is set to its rightwardly displaced position by the transmission control system, so as rotationally to couple the fourth speed driven gear wheel 234 with the driven gear wheel shaft 204. This will cause no particular operational problem, because at this time the fourth clutch 241 is still disengaged, and of course so is the fifth clutch 244. Next, also as a preparatory action, the fourth clutch 241 is engaged. As before, as explained above, this will cause the second one way clutch 240 to run free or overrun.

Next, in order to actually perform the downshift, which may either be during engine drive condition in the case of a kick down type downshift or may be in engine overrunning condition in the case of a reducing road speed type downshift, simply the sixth clutch 244 is smoothly disengaged. Since at this time the fourth clutch 241 is already engaged, hence no particular complicated mutual control of the sixth clutch 244 and the fourth clutch 241 is required for the downshifting; this is another particular good feature of the present invention.

As the sixth clutch 244 becomes disengaged, if this is a case of a kick down type downshift, then the rotational speed of the internal combustion engine 100 will quickly increase to a rotational speed at which the second one way clutch 240 will stop running free, so that now rotational power starts to be transmitted from the crankshaft 101 through the fourth clutch 241 and the second one way clutch 240 to the second driving gear wheel shaft 202, and thence via the fourth speed driving gear 222 to the fourth speed driven gear 232 engaged therewith which transmits said rotation via the splines 263 and the second/fourth synchronizer 260 engaged thereto to the driven gear wheel shaft 204, thus outputting rotational power, now at a gearing ratio appropriate to the fourth speed stage.

On the other hand, as the sixth clutch 244 becomes disengaged, if this is not a case of a kick down type downshift, but is a case of a power off type downshift, then at this time automatically the second one way clutch 240 continues to run free or overrun, and the vehicle is allowed to free wheel or coast. As explained above, engine braking may be available, in this twentieth preferred embodiment, in the fourth speed stage, by subsequently engaging the fifth clutch 242.

Thus the vehicle comes to operate in the fourth speed stage. At a convenient time, during steady running in the fourth speed stage, the synchronizer sleeve 274 of the third/fifth synchronizer 270 may be returned to the intermediate position, so as to stop the sixth clutch 244 from slipping and so as to preserve the life of said sixth clutch 244.

Reverse Speed Stage

In the reverse speed stage, the first speed synchronizer sleeve 253 of the first speed synchronizer 250 is set to its intermediate position by the above mentioned transmission control system, the second/fourth synchronizer sleeve 264 of the second/fourth synchronizer 260 is set to its intermediate position by said control system, the third/fifth synchronizer sleeve 274 of the third/fifth synchronizer 270 is set to its intermediate position by said control system, and the the reverse idler gear 228 is shifted in the rightwards direction along the reverse idler gear shaft 227 by the abovementioned control system via a fork or the like of a per se well known sort, so that said reverse idler gear 228 engages both with the reverse speed driving gear 226 fixed on the first driving gear wheel shaft 201 and also with the reverse speed driven gear 236 fixedly mounted on the driven gear wheel shaft 204. Further, the first clutch 210, the second clutch 213, and the third clutch 214 are engaged, while the fourth clutch 241 and the fifth clutch 242 and the sixth clutch 244 are disengaged. Thus, the rotation of the crankshaft 101 is transmitted via the first clutch 210, the torque converter 205, and either the third clutch 214 or the second clutch 213 and the first one way clutch 212 to the first driving gear wheel shaft 201, and thence is transmitted via the reverse driving gear 226 and the reverse idler gear 228 and the reverse driven gear 236 to the driven gear wheel shaft 204, thus rotating this driven gear wheel shaft 204 in the reverse rotational sense to that rotational sense in which said member was rotated in all the other speed stages whose operation has been explained above, since one more gear wheel, the reverse idler gear 228, is involved in the rotational force transmission path. Thus reverse rotational driving power is transmitted to the driven gear wheel shaft 204. Thus the gear transmission mechanism according to the twentieth preferred embodiment of the present invention functions in its reverse speed stage. The third clutch 214 is kept engaged at all times during this reverse speed stage operation, because engine braking is very important at this time, and in order to prolong the operational life of the first one way clutch 212. When the vehicle is driven away backwards from rest and operates in the reverse speed stage, the per se well known cushioning effect of the fluid torque converter 205 is effective for mediating this reverse speed starting off action, because said fluid torque converter 205 is located in this rotational force transmission path for the reverse speed stage, as it was in the case of the first speed stage.

Summary of the Twentieth Preferred Embodiment

According to this functioning of the twentieth preferred embodiment, described above, during the engagement of any one of the speed stages, it is possible to prepare for the engagement of the next speed stage required, in other words to make preliminary preparations for the engagement of the next higher or the next lower speed stage. This is again possible because alternate speed stages are provided by different ones of the three different power transmission systems which are provided in this twentieth preferred embodiment between the crankshaft 101 and the driven gear wheel shaft 204, and thus the power transmission system relating to the next speed stage can be prepared for the subsequent engagement of the next speed stage while still the current speed stage is being engaged; and after this preparation the actual shifting between speed stages can be performed by altering the engagement conditions of the first, second, and third clutching assemblies 301, 302, and 303. Further, because of the provision of the first, second, and third one way clutches 212, 240, and 243, i.e. because these first, second, and third clutching assemblies 301, 302, and 303 have the function of providing one way transmission of rotational power in a certain operational mode, it is not necessary to operate the clutching assemblies 301, 302, and 303 together in any closely related fashion, and accordingly timing problems with regard to simultaneous operation of these clutching assemblies 301, 302, and 303 again do not arise. These features are similar to the same features in the first through nineteenth preferred embodiments, shown, although they are obtained by a rather different construction. Thus, both in the case of an upshift and in the case of a power on downshift or a so called kick down type downshift, this change between speed stages is accomplished smartly and positively, as is desirable. Further, because of the provision of the operational mode, for both the first and second clutching assemblies 301 and 302, in this twentieth preferred embodiment, of transmission of rotational power in both rotational directions, i.e. because of the provision of the third clutch 214 which bypasses the second one way clutch 213 and of the fifth clutch 242 which bypasses the fourth one way clutch 241, thus, in the case of a power off or engine braking required type downshift, engine braking is made available in those speed stages of the transmission mechanism which are provided by the power transmission systems associated with those first and second clutching assemblies 301 and 302, i.e. in the first, second, and third (and reverse) speed stages.

Now, this twentieth preferred embodiment has the following particular advantages.

First, similarly to the eighth through the eleventh preferred embodiments described above, the clutching assemblies 301, 302, and 303 are all located between the rest of the transmission mechanism and the internal combustion engine 100. This is important because the diameters of the first through sixth clutches 210, 213, 214, 241, 242, and 244 may be required to be considerably large; and in particular may be required to be large compared to the diameters of the various gear wheels of the gear transmission mechanism. Now, in the case of a front engined rear wheel drive vehicle, where the transmission is typically mounted under the firewall or bulkhead separating the engine room from the passenger compartment thereof, typically there is considerable space available at the front end of the transmission where it is attached to the engine, but very little space available at the rear end of the transmission where it is attached to the propeller shaft. In such a construction, therefore, it is particularly beneficial for the various clutching elements, which as explained above are the elements of particularly large diameter, to be concentrated together at the front end of the transmission, as in the shown twentieth preferred embodiment; this is extremely helpful for fitting the transmission in place without causing any undesirable hump in the transmission tunnel formed along the floor of the vehicle, and without any such constraint occurring as that the entire transmission should be forced to be mounted forward of the bulkhead, for example. Accordingly, this twentieth preferred embodiment has particularly good mountability.

Next, a particularly important beneficial feature of this twentieth preferred embodiment is that the torque converter 205 is provided only in the rotational force transmission path which includes the first clutching assembly 301, i.e. in the rotational force transmission path of the first power transmission system which provides the first and reverse speed stages only; and the torque of the internal combustion engine 100 is otherwise transmitted directly via the outer casing 305 of the multi clutching mechanism 304 to the power input member of the relevant clutch, i.e. of the fourth, fifth, or sixth clutch 241, 242, or 244, bypassing said torque converter 205. Since the action of this torque converter 205 is for providing smooth starting off from rest, which is of course only performed in the first and the reverse speed stages, this means that the torque cushioning action of the torque converter 205 is only available when it is required. Further, the provision of the cutoff clutch or first clutch 210 between the outer casing 305 of the multi clutching mechanism 304 and the pump impeller 206 of the torque converter 205 ensures that in other speed stages than the first and reverse speed stages no rotational power at all need be expended in uselessly rotating said torque converter 205.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE I

| ASSEMBLY | SPEED STAGE | 1 | 2 | 3 | 4 | R |
|---|---|---|---|---|---|---|
| 4 | CLUTCH 5 | E | D/e | E | D/e | E |
| | ONE WAY CLUTCH 6 | A | O | A | O | A |
| | CLUTCH 7 | B | D | B | D | B |
| 9 | CLUTCH 11 | D/e | E | D/e | E | D/e |
| | ONE WAY CLUTCH 12 | O | A | O | A | O |
| | CLUTCH 13 | D | B | D | B | D |
| 50 | SPLINES 52 | E | D/e | D | D | D |
| | SPLINES 53 | D | D/e | E | D/e | D |
| 60 | SPLINES 62 | D/e | E | D/e | D | D |
| | SPLINES 63 | D | D | D/e | E | D |

TABLE II

| AS-SEM-BLY | SPEED STAGE | 1 | 2 | 3 | 4 | 5 | R |
|---|---|---|---|---|---|---|---|
| 304 | CLUTCH 210 | E | D/e | D | D | D | E |
| | CLUTCH 213 | E | D/e | D | D | D | E |
| 301 | ONE WAY CLUTCH 212 | A | O | O | O | O | A |
| | CLUTCH 214 | B | D | D | D | D | B |
| | CLUTCH 241 | D/e | E | D/e | E | D/e | D |
| 302 | ONE WAY CLUTCH 240 | O | A | O | A | O | O |
| | CLUTCH 242 | D | B | D | B | D | D |
| | CLUTCH 244 | D | D/e | E | D/e | E | D |
| 303 | ONE WAY | O | O | A | O | A | O |

TABLE II-continued

| AS-SEM-BLY | SPEED STAGE | 1 | 2 | 3 | 4 | 5 | R |
|---|---|---|---|---|---|---|---|
| | CLUTCH 243 | | | | | | |
| 250 | SPLINES 252 | E | D/e | D | D | D | D |
| | SPLINES 262 | D/e | E | D/e | D | D | D |
| 260 | SPLINES 263 | D | D | D/e | E | D/e | D |
| 270 | SPLINES 272 | D | D/e | E | D/e | D | D |
| | SPLINES 273 | D | D | D | D/e | E | D |

What is claimed is:

1. A transmission mechanism comprising: an input shaft; an output shaft; a first on-off clutch; a second on-off clutch; a first one way clutch; a second one way clutch; a first gear train having a first reduction gear ratio; a second gear train having a second reduction gear ratio smaller than said first reduction gear ratio; a third gear train having a third reduction gear ratio smaller than said second reduction gear ratio; a fourth gear train having a fourth reduction gear ratio smaller than said third reduction gear ratio; a first synchronizer which connects said input shaft and said output shaft via a series connection of said first on-off clutch, said first one way clutch, and said first gear train when said first synchronizer is shifted to a first side of a neutral position thereof so as to transmit rotational power from said input shaft to said output shaft in a normal rotational direction and which connects said input shaft and said output shaft via a series connection of said first on-off clutch, said first one way clutch, and said third gear train when said first synchronizer is shifted to a second side of said neutral position so as to transmit rotational power from said input shaft to said output shaft in said normal rotational direction; and a second synchronizer which connects said input shaft and said output shaft via a series connection of said second on-off clutch, said second one way clutch, and said second gear train when said second synchronizer is shifted to a first side of a neutral position thereof so as to transmit rotational power from said input shaft to said output shaft in said normal rotational direction and which connects said input shaft and said output shaft via a series connection of said second on-off clutch, said second one way clutch, and said fourth gear train when said second synchronizer is shifted to a second side of said neutral position of said second synchronizer so as to transmit rotational power from said input shaft to said output shaft in said normal rotational direction.

2. A transmission mechanism according to claim 1, further comprising a third on-off clutch arranged in parallel with said first one way clutch.

3. A transmission mechanism according to claim 1, further comprising a third on-off clutch arranged in parallel with said second one way clutch.

4. A transmission mechanism according to claim 1, further comprising a third on-off clutch arranged in parallel with said first one way clutch, and a fourth on-off clutch arranged in parallel with said second one way clutch.

5. A transmission according to claim 1, wherein a first and a second intermediate shaft are provided co-axially around said input shaft, said input shaft and said first and second intermediate shafts being arranged in parallel with said output shaft, said first and third gear trains each comprising two mutually meshing gears, one mounted on said first intermediate shaft and the other being mounted on said output shaft, said second and fourth gear trains comprising two mutually meshing gears, one being mounted on said second intermediate shaft and the other being mounted on said output shaft.

6. A transmission mechanism according to claim 5, wherein said gears mounted on said first and second intermediate shafts are each torque-transmittingly connected to said first and second intermediate shafts, respectively, while said gears mounted on said output shaft are rotatable relative to said output shaft and are each selectively torque-transmittingly connected to said output shaft by said first and second synchronizer, respectively.

* * * * *

UNITED STATES PATENT AND TRADEMARK OFFICE
CERTIFICATE OF CORRECTION

PATENT NO. : 4,576,063

DATED : March 18, 1986

INVENTOR(S) : T. Akashi, et al.

It is certified that error appears in the above-identified patent and that said Letters Patent is hereby corrected as shown below:

ABSTRACT, line 13, after "Thus" insert a comma.

Column 2, line 35, change "are" to --is--.

Column 2, line 36, change "unuly" to --unduly--.

Column 7, line 29, omit the word "such" at the beginning of the line.

Column 8, line 14, change "similarly" to --similar--.

Column 8, line 17, change "input" to --output--.

Column 8, line 24, change "disengaged, when" to --disengaged, and when--.

Column 8, line 25, after the word "disengaged" insert a comma.

Column 8, line 35, change "devic 37" to --device 37--.

Column 9, line 43, change "32" to --34--.

Column 9, line 60, change "fixed a differen-" to --fixed differen---.

UNITED STATES PATENT AND TRADEMARK OFFICE
CERTIFICATE OF CORRECTION

PATENT NO. : 4,576,063

DATED : March 18, 1986

INVENTOR(S) : T. Akashi, et al.

It is certified that error appears in the above-identified patent and that said Letters Patent is hereby corrected as shown below:

Column 10, line 8, between the words "other" and "wheels" insert the word --gear--.

Column 10, line 33, change "towards" to --leftwards--.

Column 10, line 58, omit "reverse idler gear 27 on the" in that line only.

Column 11, line 20, change "over running" to --overrunning--.

Column 11, line 21, change "this preferred" to --this first preferred--.

Column 11, line 57, after "stage" insert a comma.

Column 13, line 45, after "explanation" insert a comma

Column 14, line 15, change "stage in fact" to --stage, in fact--.

Column 15, line 64, change "thereto the" to --thereto to the--.

Column 16, line 2, after "explanation" insert a comma.

UNITED STATES PATENT AND TRADEMARK OFFICE
CERTIFICATE OF CORRECTION

PATENT NO. : 4,576,063

DATED : March 18, 1986

INVENTOR(S) : T. Akashi, et al.

It is certified that error appears in the above-identified patent and that said Letters Patent is hereby corrected as shown below:

Column 16, line 50, change "like" to --as--.

Column 18, line 19, after "explanation" insert a comma.

Column 20, line 15, omit the word "the" at the end of the line.

Column 21, line 14, between "this" and "preferred" insert the word --first--.

Column 21, line 35, change "trasmission" to --transmission--.

Column 22, line 16, after "before" insert a comma.

Column 28, line 6, change "sixthe" to --sixth--.

Column 29, line 11, change "an" to --a--.

Column 29, line 49, change "engagable" to --engageable--.

Column 32, line 49, change "engagable" to --engageable--.

UNITED STATES PATENT AND TRADEMARK OFFICE
CERTIFICATE OF CORRECTION

PATENT NO. : 4,576,063

DATED : March 18, 1986

INVENTOR(S) : T. Akashi, et al.

It is certified that error appears in the above-identified patent and that said Letters Patent is hereby corrected as shown below:

Column 33, line 14, change "engagable" to --engageable--.

Column 33, line 33, change "shaft 3 there is" to --shaft 3, there is--.

Column 33, line 58, change "over running" to --overrunning--.

Column 34, line 46, change "mechanical" to --mechanism--.

Column 35, line 37, after "embodiment" insert a comma.

Column 37, line 10, change "engagable" to --engageable--.

Column 38, line 46, between "the" and "rotational" omit the word "signed".

Column 39, line 37, change "direction" to --directions-

Column 41, line 34, after "only" insert a comma.

UNITED STATES PATENT AND TRADEMARK OFFICE
CERTIFICATE OF CORRECTION

PATENT NO. : 4,576,063
DATED : March 18, 1986
INVENTOR(S) : T. Akashi, et al.

It is certified that error appears in the above-identified patent and that said Letters Patent is hereby corrected as shown below:

Column 42, line 5, between "is" and "fourteenth" insert --a--.

Column 45, line 38, change "an" to --a--.

Column 46, line 34, change "previsouly" to --previously--.

Column 46, line 36, change "are" to --is--.

Column 49, line 19, change "224" to --222--.

Column 49, line 60, change "engagable" to --engageable--.

Column 49, line 61, change "gable" to --geable--.

Column 50, line 16, change "engaga-" to --engagea---.

Column 50, line 41, change "engagable" to --engageable--.

Column 51, line 57, change "indicated" to --indicates--.

Column 51, line 60, omit the word "while" at the beginning of the line.

UNITED STATES PATENT AND TRADEMARK OFFICE
CERTIFICATE OF CORRECTION

PATENT NO. : 4,576,063
DATED : March 18, 1986
INVENTOR(S) : T. Akashi, et al.

It is certified that error appears in the above-identified patent and that said Letters Patent is hereby corrected as shown below:

Column 54, line 34, after "explanation" insert a comma.

Column 59, line 16, after "explanation" insert a comma.

Column 59, line 51, change "that" to --the--.

Column 59, line 57, change "that" to --the--.

Column 61, line 30, change "clucth" to --clutch--.

Column 61, line 33, after "explanation" insert a comma.

Column 63, line 67, change "the" to --that--.

Column 65, line 23, after "stages" insert a comma.

Column 66, line 22, change "fourth gear reduction" to --fourth reduction--.

Signed and Sealed this

Eighteenth Day of November, 1986

*Attest:*

DONALD J. QUIGG

*Attesting Officer*  *Commissioner of Patents and Trademarks*